United States Patent
Suermann et al.

(10) Patent No.: US 6,858,268 B2
(45) Date of Patent: Feb. 22, 2005

(54) LIQUID-CRYSTALLINE MEDIUM AND LIQUID-CRYSTAL DISPLAY HAVING HIGH TWIST

(75) Inventors: Juliane Suermann, Darmstadt (DE); Meike Krumwiede, Rodgau (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/633,490

(22) Filed: Aug. 4, 2003

(65) Prior Publication Data

US 2004/0089843 A1 May 13, 2004

(30) Foreign Application Priority Data

Aug. 3, 2002 (DE) ......................................... 102 35 558

(51) Int. Cl.⁷ ........................ C09K 19/52; C09K 19/30; C09K 19/12
(52) U.S. Cl. ................ 428/1.1; 252/299.01; 252/299.5; 252/299.63; 252/299.66; 252/299.67
(58) Field of Search ......................... 252/299.01, 299.7, 252/299.5, 299.63, 299.66, 299.67; 428/1.1

(56) References Cited

U.S. PATENT DOCUMENTS 5,327,273 A * 7/1994 Beresnev et al. ............ 349/100
5,776,366 A * 7/1998 Tomi et al. ............. 252/299.63

FOREIGN PATENT DOCUMENTS

DE 10058474 * 7/2001
DE 10221751 * 12/2002

OTHER PUBLICATIONS

Dewent abstract DE–10221751, 2002.*
Derwent abstract DE–10058474, 2001.*

* cited by examiner

*Primary Examiner*—Shean C. Wu
(74) *Attorney, Agent, or Firm*—Millen, White, Zelano, Branigan, P.C.

(57) ABSTRACT

The present invention relates to a liquid-crystalline medium having high twist, to the use thereof for electro-optical purposes, and to displays containing this medium.

22 Claims, No Drawings

LIQUID-CRYSTALLINE MEDIUM AND LIQUID-CRYSTAL DISPLAY HAVING HIGH TWIST

The present invention relates to a liquid-crystalline medium having high twist, to the use thereof for electro-optical purposes, and to displays containing this medium.

Liquid-crystal displays are known from the prior art. The commonest display devices are based on the Schadt-Helfrich effect and contain a liquid-crystal medium having a twisted nematic structure, such as, for example, TN ("twisted nematic") cells having twist angles of typically 90° and STN ("super-twisted nematic") cells having twist angles of typically from 180 to 270°. Also known are ferroelectric liquid-crystal displays which contain a liquid-crystal medium having a twisted smectic structure. The twisted structure in these displays is usually achieved by addition of one or more chiral dopants to a nematic or smectic liquid-crystal medium.

Also known are liquid-crystal displays which contain liquid-crystal (LC) media having a chiral nematic or cholesteric structure. These media have significantly higher twist compared with the media from TN and STN cells.

Cholesteric liquid crystals exhibit selective reflection of circular-polarized light, with the direction of rotation of the light vector corresponding to the direction of rotation of the cholesteric helix. The reflection wavelength λ is given by the pitch p of the cholesteric helix and the mean birefringence n of the cholesteric liquid crystal in accordance with equation (1):

$$\lambda = n \cdot p \quad (1)$$

The terms "chiral nematic" and "cholesteric" are used alongside one another in the prior art. "Chiral nematic" frequently denotes LC materials consisting of a nematic host mixture which has been doped with an optically active component which induces a helically twisted superstructure. By contrast, "cholesteric" frequently denotes chiral LC materials, for example cholesteryl derivatives, which have a "natural" cholesteric phase having a helical twist. The two terms are also used in parallel to denote the same thing. In the present application, the term "cholesteric" is used for both above-mentioned types of LC material, with this term being intended to cover the widest meaning of "chiral nematic" and "cholesteric" in each case.

Examples of customary cholesteric liquid-crystal (CLC) displays are the so-called SSCT ("surface stabilized cholesteric texture") and PSCT ("polymer stabilized cholesteric texture") displays. SSCT and PSCT displays usually contain a CLC medium which has, for example in the initial state, a planar structure which reflects light having a certain wavelength, and can be switched into a focally conical, light-scattering structure by application of an electrical alternating-voltage pulse, or vice versa. On application of a stronger voltage pulse, the CLC medium is converted into a homeotropic, transparent state, from where it relaxes into the planar state after rapid switching-off of the voltage or into the focally conical state after slow switching-off.

The planar alignment of the CLC medium in the initial state, i.e. before application of a voltage, is achieved in SSCT displays by, for example, surface treatment of the cell walls. In PSCT displays, the CLC medium additionally comprises a phase-separated polymer or polymer network which stabilizes the structure of the CLC medium in the respective addressed state.

SSCT and PSCT displays generally do not require backlighting. In the planar state, the CLC medium in a pixel exhibits selective light reflection of a certain wavelength in accordance with the above equation (1), meaning that the pixel appears in the corresponding reflection color, for example in front of a black background. The reflection color disappears on changing into the focally conical, scattering or homeotropic, transparent state.

SSCT and PSCT displays are bistable, i.e. the respective state is retained after the electric field has been switched off and is only converted back into the initial state by application of a fresh field. In order to produce a pixel, a short voltage pulse is therefore sufficient, in contrast, for example, to electro-optical TN or STN displays, in which the LC medium in an addressed pixel immediately returns to the initial state after the electric field has been switched off, meaning that maintenance of the addressing voltage is necessary for durable production of a pixel.

For the above-mentioned reasons, CLC displays have significantly lower power consumption compared with TN or STN displays. In addition, they exhibit only slight viewing-angle dependence, or none at all, in the scattering state. In addition, they do not require active-matrix addressing as in the case of TN displays, but instead can be operated by the simpler multiplex or passive-matrix method.

WO 92/19695 and U.S. Pat. No. 5,384,067 describe, for example, a PSCT display containing a CLC medium having positive dielectric anisotropy and up to 10% by weight of a phase-separated polymer network which is dispersed in the liquid-crystal material. U.S. Pat. No. 5,453,863 describes, for example, an SSCT display containing a polymer-free CLC medium having positive dielectric anisotropy.

Further displays disclosed in the prior art in which CLC materials are used are the so-called flexoelectric displays, in particular those operated in "uniformly lying helix mode" (ULH mode). The flexoelectric effect and CLC materials which exhibit this effect have been described, for example, by Chandrasekhar in "Liquid Crystals", 2nd Edition, Cambridge University Press (1992), P. G. deGennes et al. in "The Physics of Liquid Crystals", 2nd Edition, Oxford Science Publications (1995), Patel and Meyer, Phys. Rev. Lett. 58 (15), 1538–1540 (1987) and Rudquist et al., Liq. Cryst. 22 (4), 445–449 (1997).

Flexoelectric CLC materials typically have an asymmetrical molecular structure and a strong dipole moment. On application of an electric field perpendicular to the cholesteric helix axis, the permanent dipoles are aligned in the direction of the field. At the same time, the LC director is distorted owing to the asymmetrical molecular structure, while the alignment of the cholesteric helix axis remains unchanged. This results in macroscopic polarization of the CLC material in the field direction and in a shift of the optical axis relative to the helix axis.

Flexoelectric displays are usually operated in so-called "uniformly lying helix" (ULH) mode, as described, for example, in P. Rudquist et al., Liq. Cryst. 23 (4), 503 (1997). To this end, a layer of a flexoelectric CLC material having high twist and short helix pitch, typically in the range from 0.2 μm to 1.0 μm, in particular less than 0.5 μm, between two transparent parallel electrodes is aligned in such a way that the cholesteric helix axis is aligned parallel to the electrodes and the CLC layer has a macroscopically uniform alignment. On application of an electric field to the cell perpendicular to the CLC layer, the LC director and thus the optical axis of the sample rotate in the layer plane. If the CLC layer is introduced between two linear polarizers, this results in a change in the transmission of linear-polarized light in the CLC material, which can be utilized in electro-optical displays. The flexoelectric effect is distinguished, inter alia, by very fast response times, typically from 6 µs to 100 µs, and by good contrast with a large number of grey shades.

Flexoelectric displays can be operated as transmissive or reflective displays, with active-matrix addressing or in multiplex or passive-matrix mode.

CLC materials having high twist for use in flexoelectric displays are described, for example, in EP 0 971 016 and GB 2,356,629. EP 0 971 016 proposes for this purpose chiral liquid-crystalline estradiol derivatives, and GB 2,356,629 proposes so-called bismesogenic compounds containing two mesogenic groups connected by flexible hydrocarbon chains in combination with chiral dopants.

A CLC medium for the above-mentioned displays can be prepared, for example, by doping a nematic LC mixture chiral dopant having a high twisting power. The pitch p of the induced cholesteric helix is then given by the concentration c and the helical twisting power HTP of the chiral dopant in accordance with equation (2):

$$p = (HTP \cdot c)^{-1} \qquad (2)$$

It is also possible to use two or more dopants, for example in order to compensate for the temperature dependence of the HTP of the individual dopants and thus to achieve low temperature dependence of the helix pitch and the reflection wavelength of the CLC medium.

For use in the above-mentioned displays, the chiral dopants should have the highest possible helical twisting power and low temperature dependence, high stability and good solubility in the liquid-crystalline host phase. In addition, they should have as little adverse effect as possible on the liquid-crystalline and electro-optical properties of the liquid-crystalline host phase. A high helical twisting power of the dopants is desired, inter alia for achieving small pitches, for example in cholesteric displays, but also in order to be able to reduce the concentration of the dopant. This achieves firstly a reduction in potential impairment of the properties of the liquid-crystal medium by the dopant and secondly increases the latitude regarding the solubility of the dopant, also enabling, for example, dopants of low solubility to be used.

For use in flexoelectric displays, CLC materials should additionally have a sufficiently strong flexoelectric effect.

In general, CLC materials for use in the above-mentioned displays must have good chemical and thermal stability and good stability to electric fields and electromagnetic radiation. Furthermore, the liquid-crystal materials should have a broad cholesteric liquid-crystal phase having a high clearing point, sufficiently high birefringence, high positive dielectric anisotropy and low rotational viscosity.

The CLC materials should in addition be of such a nature that different reflection wavelengths, in particular in the visible region, can be achieved by simple and targeted variation. Furthermore, they should have low temperature dependence of the reflection wavelength.

Since liquid crystals are generally used in the form of mixtures of a plurality of components, it is important that the components are readily miscible with one another. Further properties, such as the dielectric anisotropy and optical anisotropy, have to meet different requirements depending on the cell type.

However, it is not possible to achieve favorable values for all the above-mentioned parameters using the media available from the prior art.

EP 0 450 025 describes, for example, a cholesteric liquid-crystal mixture consisting of a nematic liquid crystal comprising two or more chiral dopants. However, the mixtures shown therein have only low clearing points. In addition, they comprise a high proportion of 26% of chiral dopants. However, high concentrations of dopant generally result in an impairment of the liquid-crystalline and electro-optical properties of the CLC medium.

The materials known from the prior art for flexoelectric and CLC displays often do not have sufficiently broad LC phases, sufficiently low viscosity values and sufficiently high values of the dielectric anisotropy. In addition, they require high switching voltages and often do not have birefringence values matched to the requisite LC layer thickness.

Thus, for example for many CLC displays, a CLC medium having high birefringence $\Delta n$ is necessary in order to achieve high reflectivity, while other CLC displays, for example displays whose priority is high color saturation (multicolor CLC displays), require a low value of $\Delta n$. However, it has been found that a lowering of the birefringence while simultaneously retaining the high polarity of the CLC medium which is necessary for low switching voltages cannot be achieved to an adequate extent using the CLC media known from the prior art.

There is thus a great demand for CLC media having high twist, a large working-temperature range, short response times, a low threshold voltage, low temperature dependence of the reflection wavelength and in particular low values of the birefringence which do not have the disadvantages of the media known from the prior art, or only do so to a lesser extent.

The invention has an object of providing CLC media, in particular for use in flexoelectric displays, CLC displays, such as SSCT and PSCT displays, and other bistable CLC displays which have the above-mentioned required properties and do not have the disadvantages of the media known from the prior art, or only do so to a lesser extent.

Upon further study of the specification and appended claims, further objects and advantages of this invention will become apparent to those skilled in the art.

It has been found that these and other objects can be achieved if media according to the invention are used in displays of this type.

The invention relates to a liquid-crystalline medium having a helically twisted structure comprising a nematic component and an optically active component, characterized in that the optically active component comprises one or more chiral compounds whose helical twisting power and concentration are selected in such a way that the helix pitch of the medium is $\leq 1$ µm, and the medium has a birefringence $\Delta n$ of $\leq 0.16$.

Particular preference is given to CLC media having birefringence values $\Delta n$ of $\leq 0.15$, in particular from 0.08 to 0.15, very particularly preferably from 0.09 to 0.14, and to CLC media having a dielectric anisotropy $\Delta \varepsilon$ of $\geq 5$, in particular $\geq 10$, very particularly preferably $\geq 15$.

The invention furthermore relates to a liquid-crystalline medium having a helically twisted structure comprising a nematic component and an optically active component, characterized in that the optically active component comprises one or more chiral compounds whose helical twisting power and concentration are selected in such a way that the helix pitch of the medium is $\leq 1$ µm, and the nematic component comprises one or more compounds of the formula I

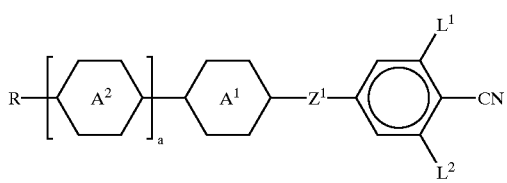

and one or more compounds of the formula II

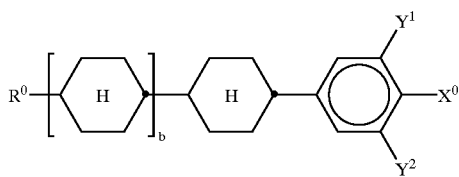

in which

R and R⁰ are each, independently of one another, H or an alkyl or alkenyl radical having from 1 to 15 carbon atoms which is unsubstituted, monosubstituted by CN or $CF_3$ or at least monosubstituted by halogen, where, in addition, one or more $CH_2$ groups in these radicals may each, independently of one another, be replaced by

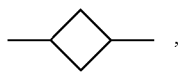

—O—, —S—, —CO—, —CO—O—, —O—CO—, —O—CO—O— or —C≡C— in such a way that O atoms are not linked directly to one another,

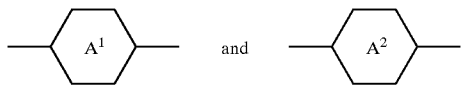

are each, independently of one another,

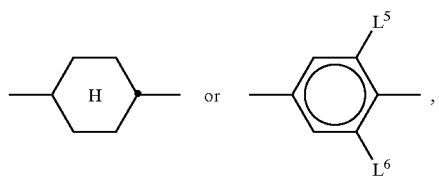

$L^1$, $L^2$, $L^5$ and $L^6$ are each, independently of one another, H or F, $Z^1$ is —COO— or, if at least one of the radicals $A^1$ and $A^2$ is trans-1,4-cyclohexylene, is alternatively —$CH_2CH_2$— or a single bond, $Y^1$ and $Y^2$ are each, independently of one another, H or F, $X^0$ is F, Cl, CN, halogenated alkyl, alkenyl or alkoxy having from 1 to 6 carbon atoms, and a and b are each, independently of one another, 0 or 1.

The invention furthermore relates to the use of the CLC media according to the invention for electro-optical purposes, in particular in bistable CLC displays, CLC displays, such as SSCT and PSCT displays, and in flexoelectric displays.

The invention furthermore relates to an electro-optical display, in particular a bistable, CLC, SSCT, PSCT or flexoelectric display, having two plane-parallel outer plates which, together with a frame, form a cell, and a CLC medium located in the cell, where the CLC medium is a medium according to Claim 1.

Surprisingly, it has been found that it is possible to prepare a CLC medium in accordance with the present invention having a reflection wavelength in the visible region and/or a cholesteric phase at room temperature which has moderate to low birefringence values and at the same time has sufficiently high values of the dielectric anisotropy Δ∈. In the CLC media according to the invention, this is achieved, in particular, through the use of compounds of the formulae I and II together with highly twisting chiral dopants as described below.

Thus, the use of the compounds of the formulae I and II in the mixtures for CLC displays according to the invention results in high polarity, i.e. low threshold voltages. In addition, the CLC media according to the invention, on use in CLC displays, exhibit excellent properties with respect to color saturation and UV stability through the addition of compounds of the formula II. Surprisingly, the achievement of high polarity, which is necessary for acceptable switching voltages, is not adversely affected here.

Furthermore, the mixtures according to the invention are distinguished by the following advantages:

they have a broad cholesteric phase range, in particular at low temperatures, and a high clearing point, they have high UV stability.

The compounds of the formulae I and II above, and of formula III1 and III2 below have a broad range of applications. Depending on the choice of substituents, these compounds can serve as base materials of which liquid-crystalline media are predominantly composed; however, it is also possible to add compounds of the formulae I and II to liquid-crystalline base materials from other classes of compound in order, for example, to modify the dielectric and/or optical anisotropy of a dielectric of this type and/or to optimise its threshold voltage and/or its viscosity. In the pure state, the compounds of the formulae I, II and III are colorless and form liquid-crystalline mesophases in a temperature range which is favorably located for electro-optical use. They are stable chemically, thermally and to light.

Particular preference is given to compounds of the formula I in which at least one of the radicals $A^1$ and $A^2$ is trans-1,4-cyclohexylene and/or $Z^1$ is —COO—.

The compounds of the formula I are preferably selected from the following formulae:

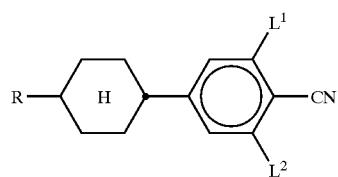

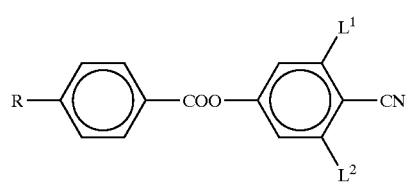

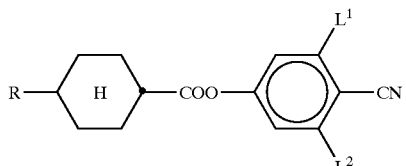

Ic

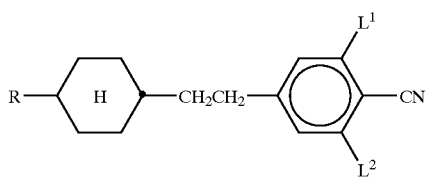

Id

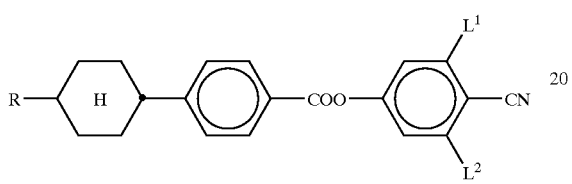

Ie

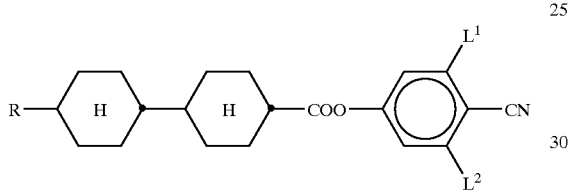

If in which R is as defined in the formula I, and $L^1$ and $L^2$ are each, independently of one another, H or F, R in these compounds is particularly preferably alkyl or alkoxy having from 1 to 8 carbon atoms.

Particular preference is given to mixtures which comprise one or more compounds of the formula Ia, Ib or Ie, in particular those in which $L^1$ and/or $L^2$ are F.

Preference is furthermore given to mixtures which comprise one or more compounds of the formula If in which $L^2$ is H and $L^1$ is H or F, in particular F.

The compounds of the formula II are preferably selected from the following formulae:

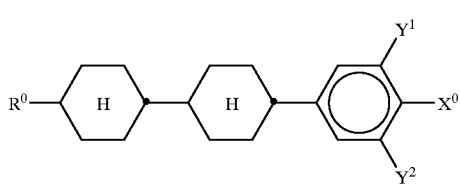

IIa

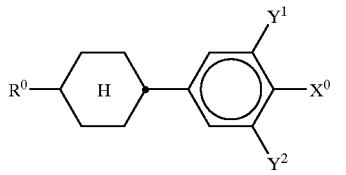

IIb in which $R^0$ and $X^0$ are as defined in the formula II, $R^0$ is particularly preferably n-alkyl having from 1 to 8 carbon atoms or alkenyl having from 2 to 7 carbon atoms, and $X^0$ is particularly preferably F, Cl, $CF_3$, $OCF_3$ or $OCHF_2$.

Particular preference is given to compounds of the formula IIa, in particular those in which $X^0$ is F and $Y^1$ and $Y^2$ are H or F, in particular are both F.

Besides the compounds of the formulae I and II, the mixtures according to the invention preferably comprise one or more alkenyl compounds selected from the formulae III1 and III2:

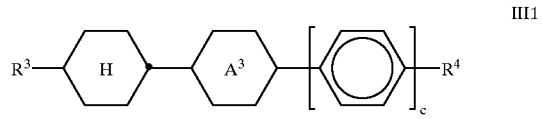

III1

III2

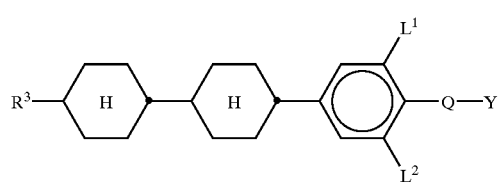

in which $A^3$ is 1,4-phenylene or trans-1,4-cyclohexylene, c is 0 or 1, $R^3$ is an alkenyl group having from 2 to 7 carbon atoms, $R^4$ is an alkyl, alkoxy or alkenyl group having from 1 to 12 carbon atoms, in which, in addition, one or two non-adjacent $CH_2$ groups may be replaced by —O—, —CH=CH—, —C≡C—, —CO—, —OCO— or —COO— in such a way that O atoms are not linked directly to one another, Q is $CF_2$, $OCF_2$, CFH, OCFH or a single bond, Y is F or Cl, and $L^1$ and $L^2$ are each, independently of one another, H or F.

Particular preference is given to compounds of the formula III1 in which c is 1. Further preferred compounds of the formula III1 are selected from the following formulae:

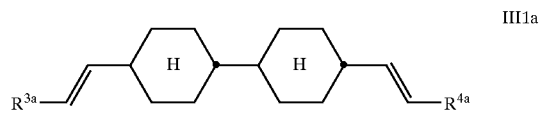

III1a

III1b

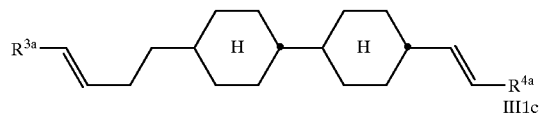

III1c

III1d

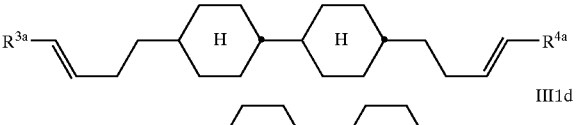

III1e

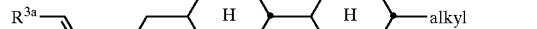

III1f

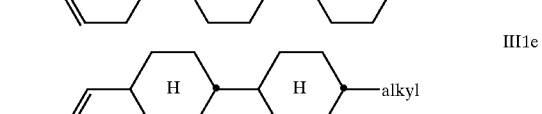

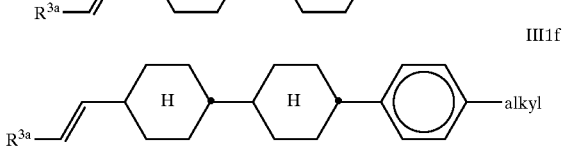

-continued

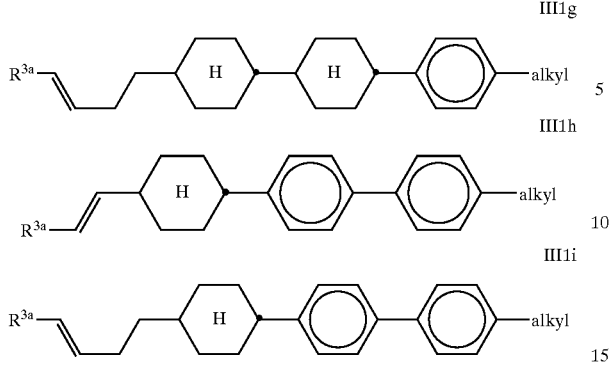

in which $R^{3a}$ and $R^{4a}$ are each, independently of one another, H, $CH_3$, $C_2H_5$ or n-$C_3H_7$, and alkyl is an alkyl group having from 1 to 8 carbon atoms.

Particular preference is given to compounds of the formula III1a, in particular those in which $R^{3a}$ and $R^{4a}$ are $CH_3$, compounds of the formula III1e, in particular those in which $R^{3a}$ is H, and compounds of the formulae III1f, III1g, III1h and III1i, in particular those in which $R^{3a}$ is H or $CH_3$.

Particularly preferred compounds of the formula III2 are those in which $L^1$ and/or $L^2$ are F and Q—Y is F or $OCF_3$. Further preferred compounds of the formula III2 are those in which $R^3$ is 1E-alkenyl or 3E-alkenyl having from 2 to 7 carbon atoms, in particular 2, 3 or 4 carbon atoms. Further preferred compounds of the formula III2 are those of the formula III2a

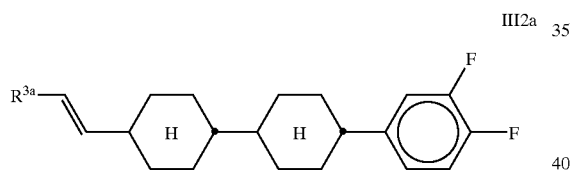

in which $R^{3a}$, is H, $CH_3$, $C_2H_5$ or n-$C_3H_7$, in particular H or $CH_3$.

The use of compounds of the formulae III1 and III2 in the liquid-crystal mixtures according to the invention results in particularly low values of the rotational viscosity and in CLC displays having fast response times, in particular at low temperatures.

Besides the compounds of the formulae I and II, preferred liquid-crystal mixtures preferably comprise one or more compounds selected from the group consisting of the bicyclic compounds of the following formulae:

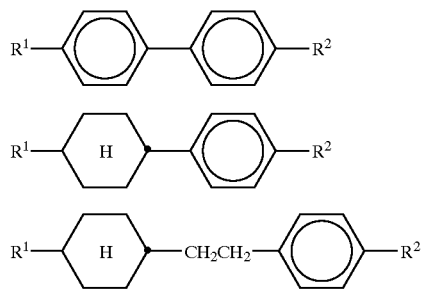

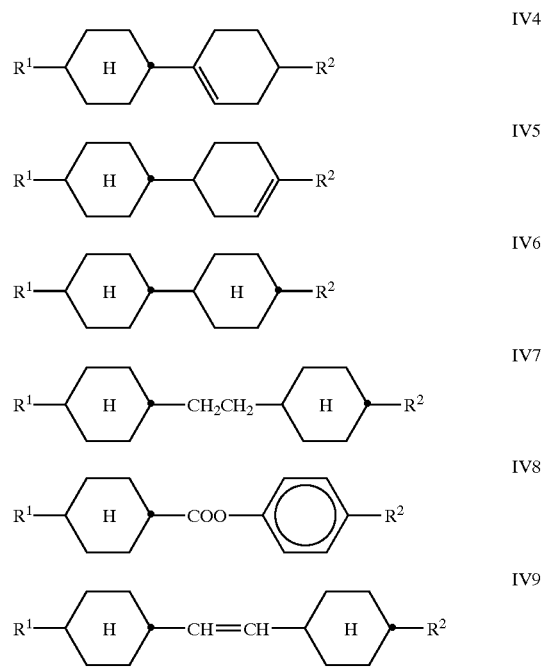

and/or one or more compounds selected from the group consisting of the tricyclic compounds of the following formulae:

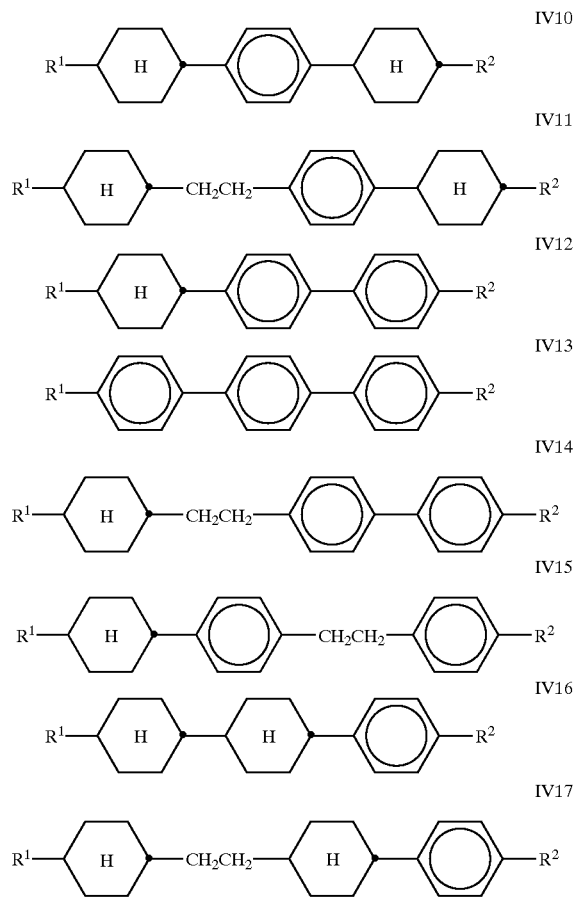

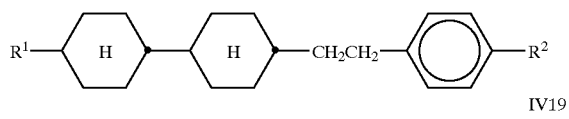
IV18

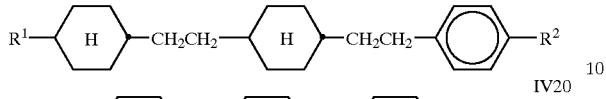
IV19

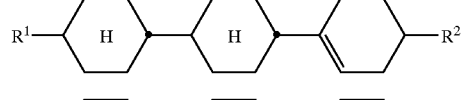
IV20

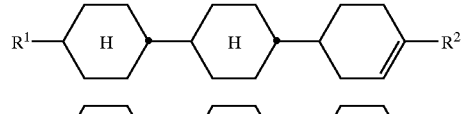
IV21

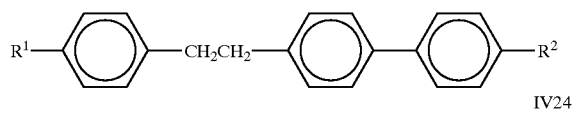
IV22

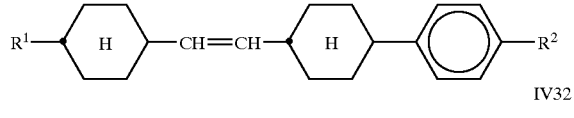
IV23

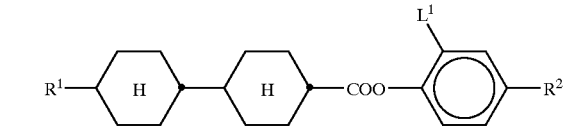
IV24

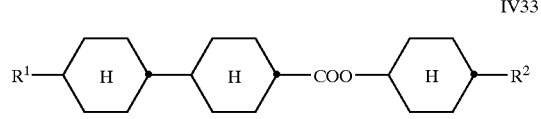
IV32

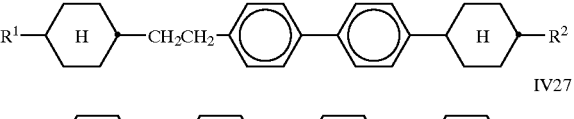
IV33

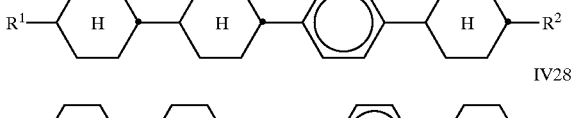

and/or one or more compounds selected from the group consisting of the tetracyclic compounds of the following formulae:

IV25

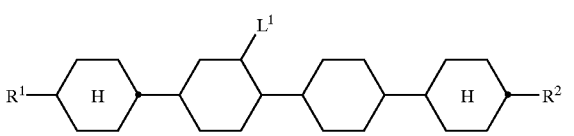

IV26

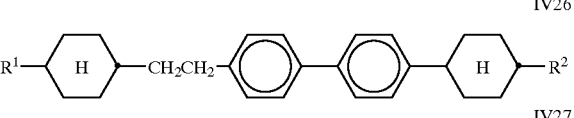

IV27

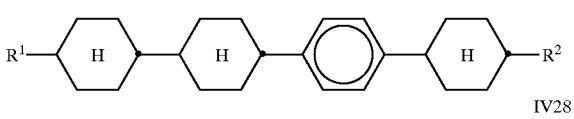

IV28

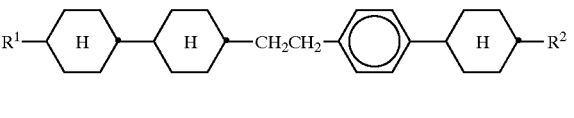

IV29

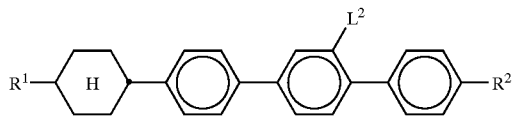

IV30

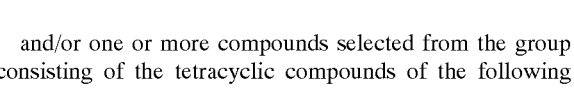

IV31

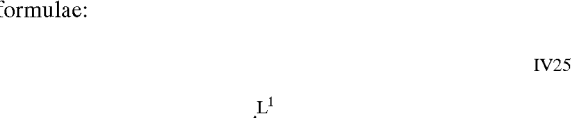

in which $R^1$ and $R^2$ are as defined in the formula II, and are preferably each, independently of one another, an alkyl, alkoxy or alkenyl group having from 1 to 12 carbon atoms, in which, in addition, one or two non-adjacent $CH_2$ groups may be replaced by —O—, —CH=CH—, —C≡C—, —CO—, —OCO— or —COO— in such a way that O atoms are not linked directly to one another, and $L^1$ is H or F.

The 1,4-phenylene groups in IV10 to IV19 and IV23 to IV32 may each, independently of one another, also be monosubstituted or polysubstituted by fluorine.

Particular preference is given to compounds of the formulae IV25 to IV31 in which $R^1$ is alkyl and $R^2$ is alkyl or alkoxy, in particular alkoxy, each having from 1 to 7 carbon atoms. Preference is furthermore given to compounds of the formulae IV25 and IV31 in which $L^1$ is F. Very particular preference is given to compounds of the formulae IV25 and IV27.

$R^1$ and $R^2$ in the compounds of the formulae IV1 to IV30 are particularly preferably straight-chain alkyl or alkoxy having from 1 to 12 carbon atoms.

In a further preferred embodiment, the mixtures according to the invention preferably comprise, besides the compounds of the formulae I and II, one or more compounds of the formulae V1 and/or V2

V1

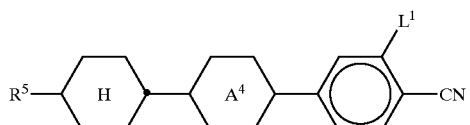

V2

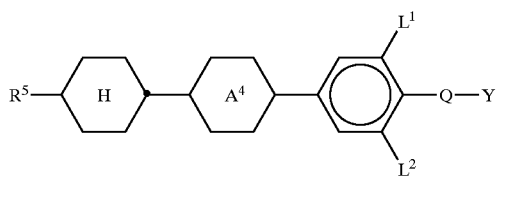

in which
$A^4$ is 1,4-phenylene, which may also be fluorinated in the 3- and/or 5-position, or, in the formula V2, is alternatively trans-1,4-cyclohexylene,
$R^5$ is an alkyl, alkoxy or alkenyl group having from 1 to 12 carbon atoms, in which, in addition, one or two non-adjacent $CH_2$ groups may be replaced by —O—, —CH=CH—, —C≡C—, —CO—, —OCO— or —COO— in such a way that O atoms are not linked directly to one another, Q is CF$_2$, OCF$_2$, CFH, OCFH or a single bond, Y is F or Cl, and L$^1$ and L$^2$ are each, independently of one another, H or F.

Particular preference is given to compounds of the formulae V1 and V2 in which A$^4$ is 1,4-phenylene.

Further preferred compounds of the formulae V1 and V2 are selected from the following formulae:

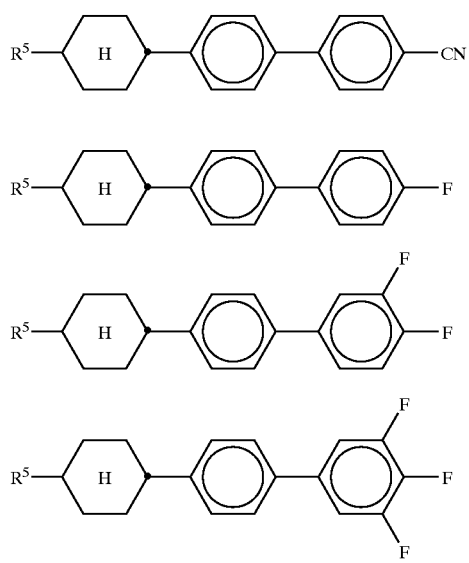

V1a

V2a

V2b

V2c in which R$^5$ is as defined above and is preferably alkyl or alkoxy having from 1 to 8 carbon atoms.

Particular preference is given to compounds of the formulae V1a and V2b.

The optically active component comprises one or more chiral dopants whose helical twisting power and concentration are selected in such a way that the helix pitch of the LC medium is less than or equal to 1 μm.

The helix pitch of the medium is preferably from 130 nm to 1000 nm, in particular from 200 nm to 750 nm, particularly preferably from 300 nm to 450 nm.

The helix pitch is preferably selected in such a way that the medium reflects light in the visible wavelength range. The term "visible wavelength range" or "visible spectrum" typically covers the wavelength range from 400 to 800 nm. Above and below, however, this term is also intended to include the wavelength range from 200 to 1200 nm, including the UV and infrared (IR) range, and the far UV and far IR range.

The reflection wavelength of the LC medium according to the invention is preferably in the range from 200 to 1500 nm, in particular from 300 to 1200 nm, particularly preferably from 350 to 900 nm, very particularly preferably from 400 to 800 nm. Preference is furthermore given to LC media having a reflection wavelength of from 400 to 700 nm, in particular from 400 to 600 nm.

The wavelength values indicated above and below relate to the half-value width of the reflection band, unless stated otherwise.

The ratio d/p between the layer thickness of the liquid-crystal cell d (separation of the outer plates) in a CLC display according to the invention and the natural helix pitch p of the LC medium is preferably greater than 1, in particular in the range from 2 to 20, particularly preferably from 3 to 15, very particularly preferably from 4 to 10.

The proportion of the optically active component in the LC medium according to the invention is preferably ≦20%, in particular ≦10%, particularly preferably from 0.01 to 7%, very particularly preferably from 0.1 to 5%. The optically active component preferably comprises from 1 to 6, in particular 1, 2, 3 or 4, chiral compounds.

The chiral dopants should preferably have a high helical twisting power (HTP) and low temperature dependence. They should furthermore have good solubility in the nematic component and not impair the liquid-crystalline properties of the LC medium, or only do so to a small extent. They can have the same or opposite directions of rotation and have the same or opposite temperature dependence of the twist.

Particular preference is given to dopants having an HTP of 20 μm$^{-1}$ or more, in particular 40 μm$^{-1}$ or more, particularly preferably 70 μm$^{-1}$ or more.

For the optically active component, a multiplicity of chiral dopants, some of which are commercially available, is available to the person skilled in the art, such as, for example, cholesteryl nonanoate, R/S-811, R/S-1011, R/S-2011 or CB15 (Merck KGaA, Darmstadt).

Particularly suitable dopants are compounds which contain one or more chiral radicals and one or more mesogenic groups or one or more aromatic or alicyclic groups which form a mesogenic group with the chiral radical.

Examples of suitable chiral radicals are, for example, chiral branched hydrocarbon radicals, chiral ethanediols, binaphthols or dioxolanes, furthermore monovalent or polyvalent chiral radicals selected from the group consisting of sugar derivatives, sugar alcohols, sugar acids, lactic acids, chiral substituted glycols, steroid derivatives, terpene derivatives, amino acids or sequences of a few, preferably 1–5, amino acids.

Preferred chiral radicals are sugar derivatives, such as glucose, mannose, galactose, fructose, arabinose and dextrose; sugar alcohols, such as, for example, sorbitol, mannitol, iditol, galactitol or anhydro derivatives thereof, in particular dianhydrohexitols, such as dianhydrosorbide (1,4:3,6-dianhydro-D-sorbide and isosorbide), dianhydromannitol (isosorbitol) or dianhydroiditol (isoiditol); sugar acids, such as, for example, gluconic acid, gulonic acid and ketogulonic acid; chiral substituted glycol radicals, such as, for example, mono- or oligoethylene or -propylene glycols in which one or more CH$_2$ groups are substituted by alkyl or alkoxy; amino acids, such as, for example, alanine, valine, phenylglycine or phenylalanine, or sequences of from 1 to 5 of these amino acids; steroid derivatives, such as, for example, cholesteryl or cholic acid radicals; terpene derivatives, such as, for example, menthyl, neomenthyl, campheyl, pineyl, terpineyl, isolongifolyl, fenchyl, carreyl, myrthenyl, nopyl, geraniyl, linaloyl, neryl, citronellyl or dihydrocitronellyl.

Suitable chiral radicals and mesogenic chiral compounds are described, for example, in DE 34 25 503, DE 35 34 777, DE 35 34 778, DE 35 34 779 and DE 35 34 780, DE-A-43 42 280, EP-A-1 038 941 and DE-A-195 41 820.

Preferred dopants are selected from the formulae VII to IX

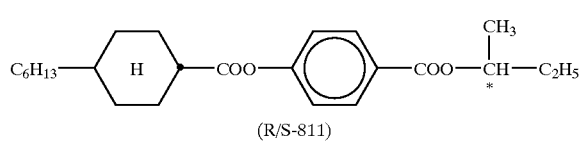
(R/S-811)

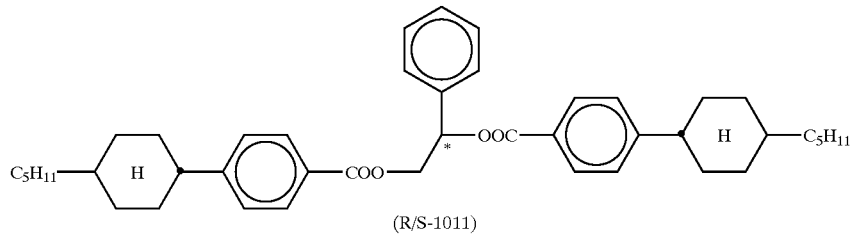
(R/S-1011)

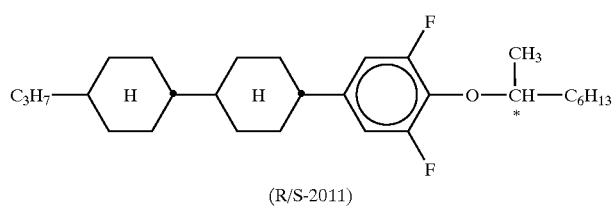
(R/S-2011)

derivatives of isosorbide, isomannitol or isoiditol, in particular dianhydrosorbide derivatives of the formula X:

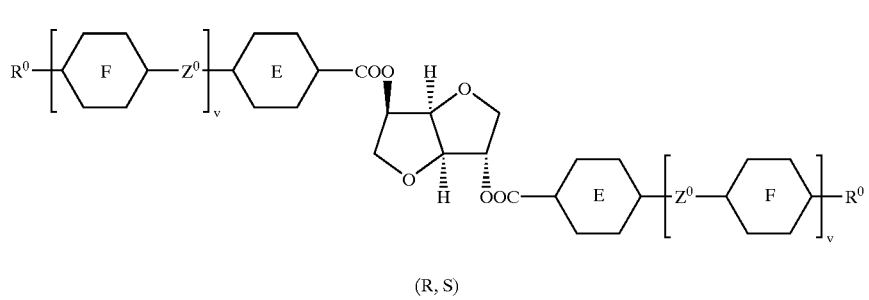
(R, S)

and chiral ethanediols, such as, for example, diphenylethanediol (hydrobenzoin), in particular mesogenic hydrobenzoin derivatives of the formula XI:

including the (R,S), (S,R), (R,R) and (S,S) enantiomers, none of which are shown, in which E and F are each, independently of one another, 1,4-phenylene, which may also be monosubstituted, disubstituted or trisubstituted by L, or 1,4-cyclohexylene,

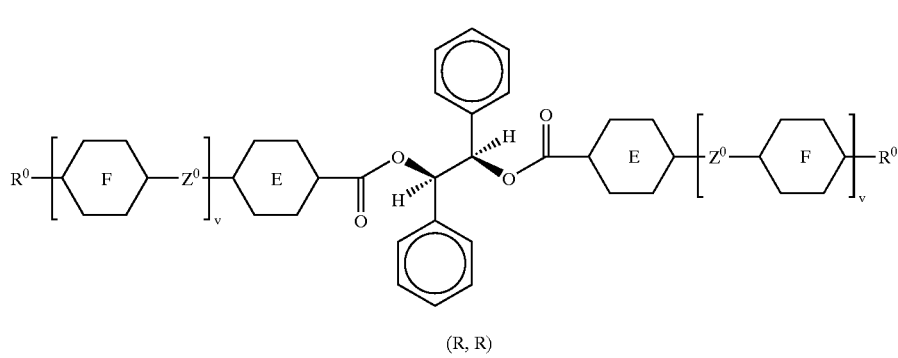
(R, R)

L is H, F, Cl, CN or optionally halogenated alkyl, alkoxy, alkyl-carbonyl, alkoxycarbonyl or alkoxycarbonyloxy having 1–7 carbon atoms, v is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1–12 carbon atoms.

The compounds of the formula X are described in WO 98/00428. The compounds of the formula XI are described in GB-A-2,328,207.

Particularly preferred dopants are chiral binaphthyl derivatives, as described in WO 02/94805, chiral binaphthol acetal derivatives, as described in WO 02/34739, chiral TADDOL derivatives, as described in WO 02/06265, and chiral dopants having at least one fluorinated bridging group and a terminal or central chiral group, as described in WO 02/06196 and WO 02/06195.

The chiral binaphthyl derivatives of WO 02/94805 conform to the formula XII:

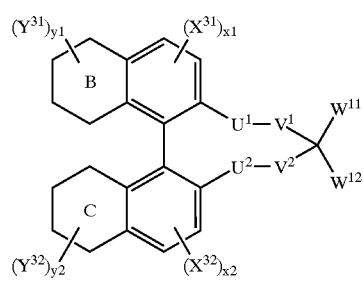

XII in which the individual radicals, independently of one another, have the following meanings:

$X^{31}$, $X^{32}$, $Y^{31}$ and $Y^{32}$ are each, independently of one another, H, F, Cl, Br, I, CN, SCN, SF$_5$, straight-chain or branched alkyl having up to 25 carbon atoms, which may be unsubstituted or monosubstituted or polysubstituted by F, Cl, Br, I or CN, and in which, in addition, one or more non-adjacent CH$_2$ groups may each, independently of one another, be replaced by —O—, —S—, —NH—, —NR$^{00}$—, —CO—, —COO—, —OCO—, —OCO—O—, —S—CO—, —CO—S—, —CH=CH— or —C≡C— in such a way that O and/or S atoms are not linked directly to one another, a polymerizable group, or cycloalkyl or aryl having up to 20 carbon atoms, which may also be monosubstituted or polysubstituted by L or a polymerizable group, $R^{00}$ is H or alkyl having from 1 to 4 carbon atoms, x1 and x2 are each, independently of one another, 0, 1 or 2, y1 and y2 are each, independently of one another, 0, 1, 2, 3 or 4, B and C are each, independently of one another, an aromatic or partially or fully saturated aliphatic six-membered ring, in which one or more CH groups may be replaced by N and one or more CH$_2$ groups may be replaced by O and/or S, one of the radicals $W^{11}$ and $W^{22}$ is —$Z^{11}$—$A^{11}$—($Z^{22}$—$A^{22}$)$_m$—$R^{31}$ and the other is $R^{32}$ or $A^{33}$, or both radicals $W^{11}$ and $W^{22}$ are —$Z^{11}$—$A^{11}$—($Z^{22}$—$A^{22}$)$_m$—$R^{31}$, where $W^1$ and $W^2$ are not simultaneously H, or

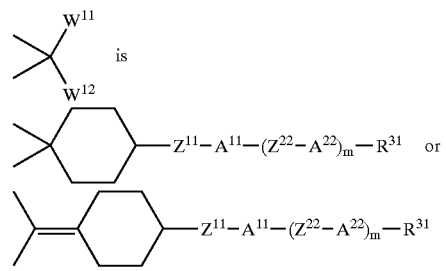

$U^1$ and $U^2$ are each, independently of one another, CH$_2$, O, S, CO or CS, $V^1$ and $V^2$ are each, independently of one another, (CH$_2$)$_n$, in which up to four non-adjacent CH$_2$ groups may be replaced by O and/or S, and one of the radicals $V^1$ and $V^2$ or, if

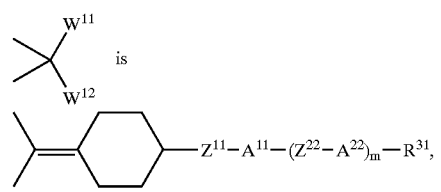

one or both radicals $V^1$ and $V^2$ are alternatively a single bond, n is an integer from 1 to 7, $Z^{11}$ and $Z^{22}$ are each, independently of one another, —O—, —S—, —CO—, —COO—, —OCO—, —O—COO—, —CO—NR$^{00}$—, —NR$^{00}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CH=N—, —N=CH—, —N=N—, —CF=CH—, —CH=CF—, —CF=CF—, —C≡C—, —CH=CH—COO—, —OCO—CH=CH— or a single bond, $A^{11}$, $A^{22}$ and $A^{33}$ are each, independently of one another, 1,4-phenylene, in which, in addition, one or more CH groups may be replaced by N, 1,4-cyclohexylene, in which, in addition, one or more nonadjacent CH$_2$ groups may be replaced by O and/or S, 1,3-dioxolane-4,5-diyl, 1,4-cyclohexenylene, 1,4-bicyclo[2.2.2]-octylene, piperidine-1,4-diyl, naphthalene-2,6-diyl, decahydronaphthalene-2,6-diyl or 1,2,3,4-tetrahydronaphthalene-2,6-diyl, where all these groups may be unsubstituted or monosubstituted or polysubstituted by L, and $A^{11}$ is alternatively a single bond, L is halogen, CN, NO$_2$ or an alkyl, alkoxy, alkylcarbonyl or alkoxycarbonyl group having from 1 to 7 carbon atoms, in which one or more H atoms may be replaced by F or Cl, m is in each case, independently of one another, 0, 1, 2 or 3, and $R^{31}$ and $R^{32}$ are each, independently of one another, H, F, Cl, Br, I, CN, SCN, OH, SF$_5$, straight-chain or branched alkyl having up to 25 carbon atoms, which may be unsubstituted or monosubstituted or polysubstituted by F, Cl, Br, I or CN, and in which, in addition, one or more non-adjacent CH$_2$ groups may each, independently of one another, be replaced by —O—, —S—, —NH—, —NR$^{00}$—, —CO—, —COO—, —OCO—, —OCO—O—, —S—CO—, —CO—S—, —CH═CH— or —C≡C— in such a way that O and/or S atoms are not linked directly to one another, or a polymerizable group.

Particular preference is given to compounds of the formula XII in which at least one, preferably both, radicals B and C are an aromatic ring, at least one, preferably both, radicals B and C contain two saturated carbon atoms, at least one, preferably both, radicals B and C contain four saturated carbon atoms, at least one, preferably both, radicals $U^1$ and $U^2$ are O, $V^1$ and $V^2$ are $(CH_2)_n$, in which n is 1, 2, 3 or 4, and preferably one of the radicals $V^1$ and $V^2$ is $CH_2$ and the other is $CH_2$ or $(CH_2)_2$, one of the radicals $V^1$ and $V^2$ is $CH_2$ and the other is a single bond, at least one of the radicals $Z^{11}$ and $Z^{22}$ is —CF$_2$O—, —OCF$_2$— or —CF$_2$CF$_2$—, $Z^{11}$ is a single bond, at least one of the radicals $Z^{11}$ and $Z^{22}$ is —CF$_2$O—, —OCF$_2$—, —CF$_2$CF$_2$— or —CF═CF— and the other is —COO—, —OCO—, —CH$_2$—CH$_2$— or a single bond, at least one of the radicals $Z^{11}$ and $Z^{22}$ is —C≡C—,

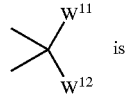 is

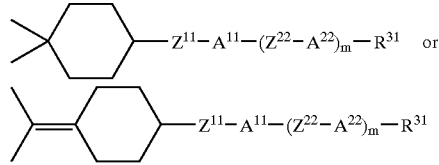

and m is 0 or 1, in particular 0, preferably m is 0 and $A^1$ is a single bond, $W^{11}$ is $R^{32}$ or $A^{33}$, in particular H or F, and $W^{22}$ is $Z^{11}$—$A^{11}$—$(Z^{22}$—$A^{22})_m$—$R^{31}$, in which m is 1 or 2, $x^1$ and $x^2$ are 1, $y^1$ and $y^2$ are 1, $x^1$, $x^2$, $y^1$ and $y^2$ are 0, at least one, preferably one or two, of the radicals $X^{31}$, $X^{32}$, $Y^{31}$ and $Y^{32}$ are or contain a polymerizable group, $R^{31}$ is a polymerizable group, $R^{31}$ is straight-chain alkyl having from 1 to 12 carbon atoms, in which, in addition, one or more H atoms may be replaced by F or CN, and in which, in addition, one or more non-adjacent CH$_2$ groups may each, independently of one another, be replaced by —O—, —S—, —NH—, —N(CH$_3$)—, —CO—, —COO—, —OCO—, —OCO—O—, —S—CO—, —CO—S—, —CH═CH— or —C≡C— in such a way that O and/or S atoms are not linked directly to one another, particularly preferably alkyl or alkoxy having from 1 to 12 carbon atoms, $X^{31}$, $X^{32}$, $Y^{31}$, $Y^{32}$ and $R^{32}$ are selected from H, F and straight-chain alkyl having from 1 to 12 carbon atoms, in which, in addition, one or more H atoms may be replaced by F or CN, and in which, in addition, one or more non-adjacent CH$_2$ groups may each, independently of one another, be replaced by —O—, —S—, —NH—, —N(CH$_3$)—, —CO—, —COO—, —OCO—, —OCO—O—, —S—CO—, —CO—S—, —CH═CH— or —C≡C— in such a way that O and/or S atoms are not linked directly to one another, and are particularly preferably H, F or alkyl or alkoxy having from 1 to 12 carbon atoms, $X^{31}$, $X^{32}$, $Y^{31}$ and $Y^{32}$ are selected from aryl, preferably phenyl, which is unsubstituted or monosubstituted or polysubstituted by L, preferably monosubstituted in the 4-position, L is F, Cl, CN or optionally fluorinated alkyl, alkoxy, alkylcarbonyl or alkoxycarbonyl having from 1 to 7 carbon atoms, L is F, Cl, CN, NO$_2$, CH$_3$, C$_2$H$_5$, OCH$_3$, OC$_2$H$_5$, COCH$_3$, COC$_2$H$_5$, CF$_3$, CHF$_2$, CH$_2$F, OCF$_3$ OCHF$_2$, OCH$_2$F or OC$_2$F$_5$, $A^{33}$ is 1,4-phenylene or 1,4-cyclohexylene, which may, in addition, also be substituted by up to 5, preferably 1, 2 or 3, F or Cl atoms, CN or NO$_2$ groups or alkyl, alkoxy, alkylcarbonyl or alkoxycarbonyl groups having from 1 to 4 carbon atoms, in which, in addition, one or more H atoms may be replaced by F or Cl, $A^{11}$ and $A^{22}$ are selected from 1,4-phenylene and trans-1,4-cyclohexylene, which may be unsubstituted or substituted by up to 4 radicals L, the mesogenic group $Z^{11}$—$A^{11}$—$(Z^{22}$—$A^{22})_m$ contains one, two or three five- or six-membered rings, the mesogenic group $Z^{11}$—$A^{11}$—$(Z^{22}$—$A^{22})_m$ is bicyclohexyl, biphenyl, phenylcyclohexyl, cyclohexylphenyl or biphenylcyclohexyl, in which the phenyl rings may also be substituted by one or two F atoms.

The mesogenic group —$Z^{11}$—$A^{11}$—$(Z^{22}$—$A^{22})_m$ in the formula XII is preferably selected from the following subformulae or mirror images thereof. In these, Phe denotes 1,4-phenylene, which is optionally substituted by one or more groups L, and Cyc denotes 1,4-cyclohexylene. Z is in each case, independently, as defined above for $Z^{11}$.

-Phe-

-Cyc-

-Phe-Z-Phe-

-Phe-Z-Cyc-

-Cyc-Z-Cyc-

-Phe-Z-Phe-Z-Phe-

-Phe-Z-Phe-Z-Cyc-

-Phe-Z-Cyc-Z-Phe-

-Cyc-Z-Phe-Z-Cyc-

-Cyc-Z-Cyc-Z-Phe-

-Cyc-Z-Cyc-Z-Cyc-

L is preferably F, Cl, CN, NO$_2$, CH$_3$, C$_2$H$_5$, OCH$_3$, OC$_2$H$_5$, COCH$_3$, COC$_2$H$_5$, CF$_3$, CHF$_2$, CH$_2$F, OCF$_3$ OCHF$_2$, OCH$_2$F, OC$_2$F$_5$, in particular F, Cl, CN, CH$_3$, CHF$_2$, C$_2$H$_5$, OCH$_3$, OCHF$_2$, CF$_3$ or OCF$_3$, very particularly preferably F, CH$_3$, CF$_3$, OCH$_3$, OCHF$_2$ or OCF$_3$.

The polymerizable group is preferably selected from the formula P—Sp—X, in which P is $CH_2=CW^1—COO—$,

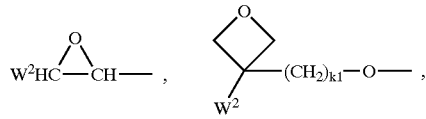

$CH_2=CW^2—(O)_{k1}—$, $CH_3—CH=CH—O—$, $HO—CW^2W^3—$, $HS—CW^2W^3—$, $HW^2N—$, $HO—CW^2W^3—NH—$, $CH_2=CW^1—CO—NH—$, $CH_2=CH—(COO)_{k1}$-Phe-$(O)_{k2}—$, Phe-$CH=CH—$, $HOOC—$, $OCN—$ or $W^4W^5W^6Si$,

Sp is a spacer group having from 1 to 25 carbon atoms or a single bond,

X is —O—, —S—, —OCH$_2$—, —CH$_2$O—, —CO—, —COO—, —OCO—, —OCO—O—, —CO—N(R$^{00}$)—, —N(R$^{00}$)—CO—, —OCH$_2$—, —CH$_2$O—, —SCH$_2$—, —CH$_2$S—, —CH=CH—COO—, —OOC—CH=CH— or a single bond, and $W^1$ is H, Cl, CN, phenyl or alkyl having from 1 to 5 carbon atoms, in particular H, Cl or CH$_3$, $W^2$ and $W^3$, independently of one another, are H or alkyl having from 1 to 5 carbon atoms, in particular methyl, ethyl or n-propyl, $W^4$, $W^5$ and $W^6$, independently of one another, are Cl, oxaalkyl or oxacarbonylalkyl having from 1 to 5 carbon atoms, Phe is 1,4-phenylene, k1 and k2, independently of one another, are 0 or 1, and $R^{00}$ is H or alkyl having from 1 to 4 carbon atoms.

P is preferably a vinyl, acrylate, methacrylate, propenyl ether or epoxy group, in particular an acrylate or methacrylate group.

Sp is preferably chiral or achiral, straight-chain or branched alkylene having from 1 to 20, preferably from 1 to 12, carbon atoms, in which, in addition, one or more non-adjacent CH$_2$ groups may be replaced by —O—, —S—, —NH—, —N(CH$_3$)—, —CO—, —O—CO—, —S—CO—, —O—COO—, —CO—S—, —CO—O—, —CH(halogen)-, —CH(CN)—, —CH=CH— or —C≡C— in such a way that O atoms are not linked directly to one another.

Typical spacer groups are, for example, —(CH$_2$)$_p$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, in which p is an integer from 2 to 12, and r is an integer from 1 to 3.

Preferred spacer groups are, for example, ethylene, propylene, butylene, pentylene, hexylene, heptylene, octylene, nonylene, decylene, undecylene, dodecylene, octadecylene, ethylenoxyethylene, methylenoxybutylene, ethylenethioethylene, ethylene-N-methyliminoethylene, 1-methylalkylene, ethenylene, propenylene and butenylene.

Particularly preferred compounds of the formula XII are the following:

XIIa
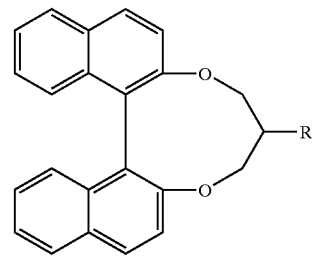

XIIb
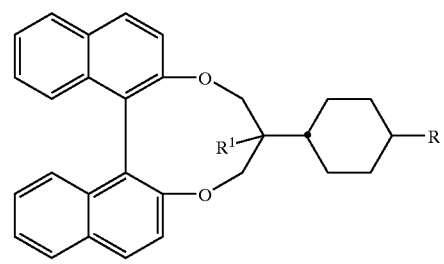

XIIc
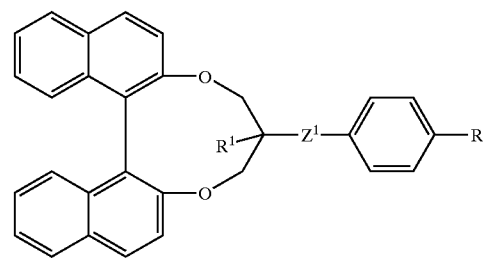

XIId
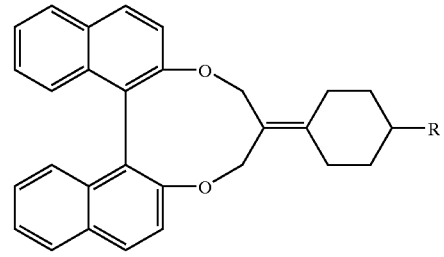

XIIe
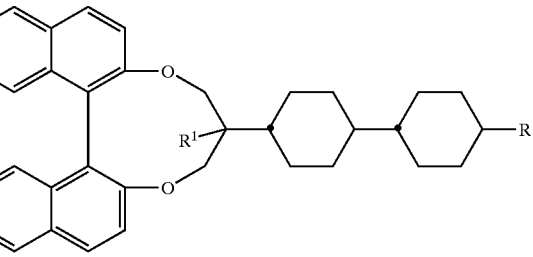

XIIf
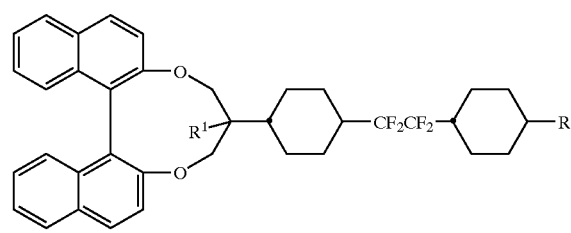

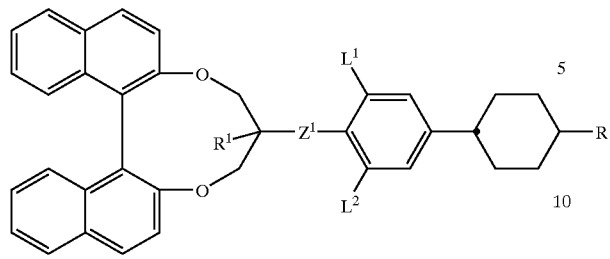
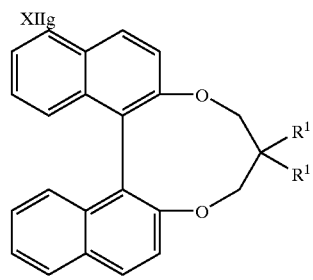
XIIo
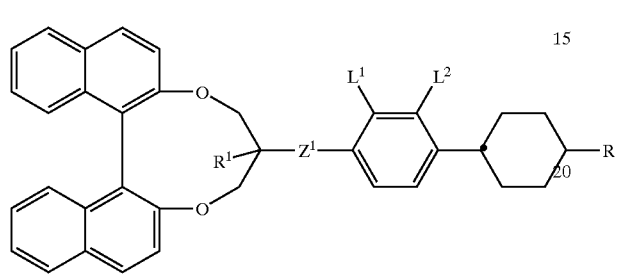
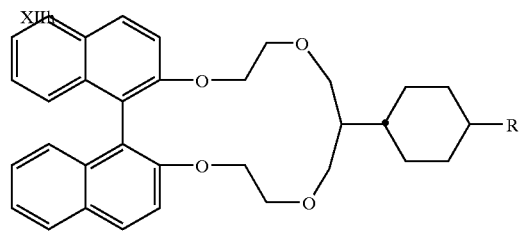
XIIp
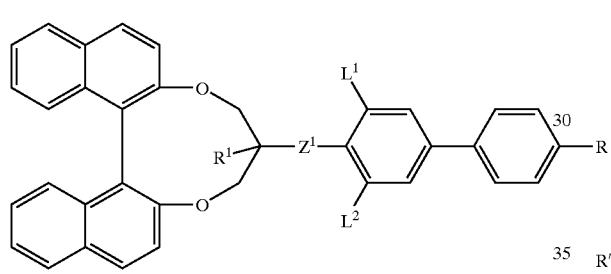
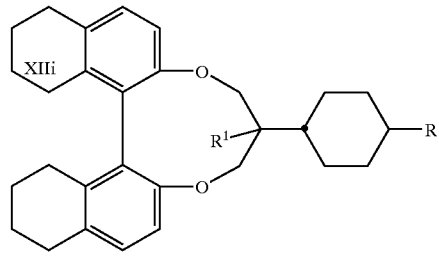
XIIq
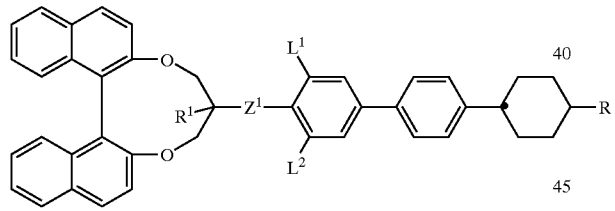
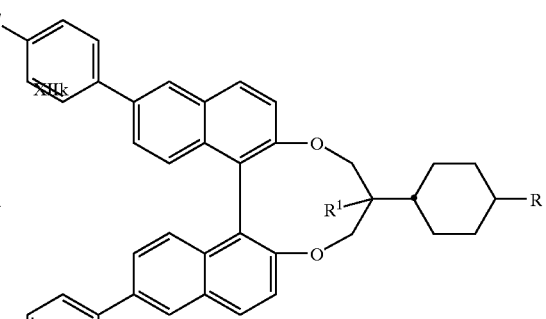
XIIr
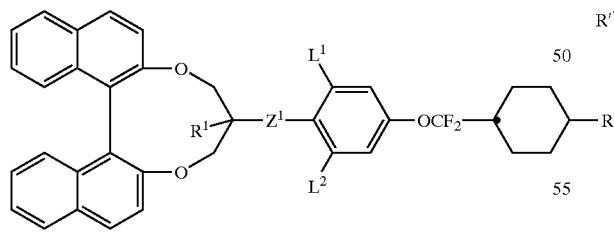
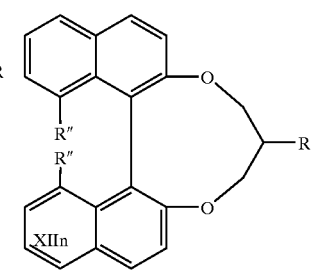
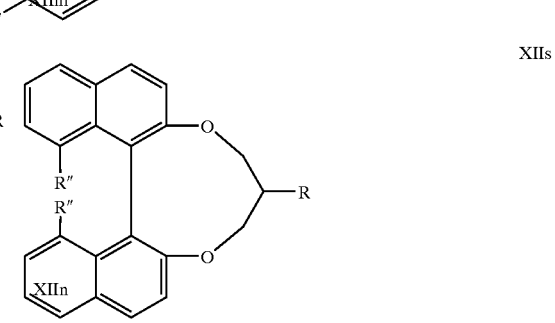
XIIs
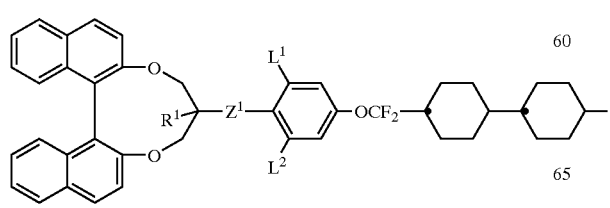

XIIt

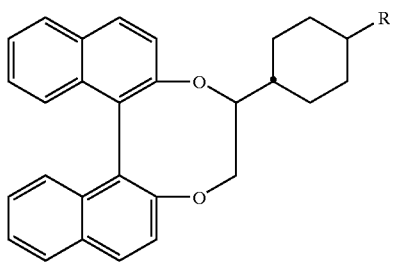

XIIu

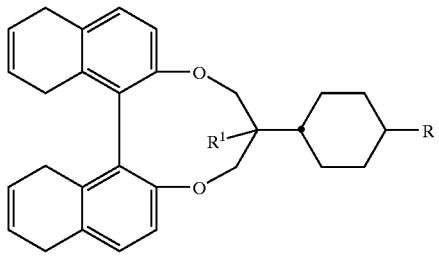

XIIv

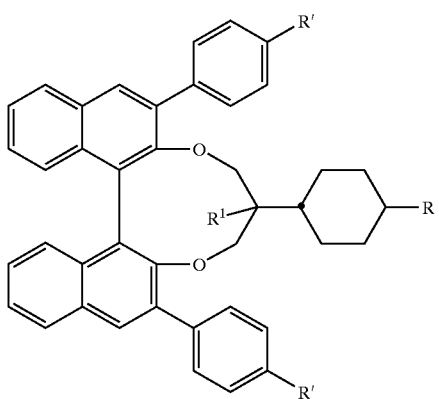

in which $Z^1$ has one of the meanings of $Z^{11}$ in the formula XII, R, R', R" and $R^1$ have one of the meanings of $R^{31}$ in the formula XII, and $L^1$ and $L^2$ are H or have one of the meanings of L in the formula XII.

In these preferred formulae, $L^1$ and $L^2$ are preferably H or F, $R^1$ is H or F, R' and R" are preferably H, F, alkyl or alkoxy having from 1 to 12 carbon atoms or P—Sp—X—, and R" is particularly preferably $CH_3$.

Very particular preference is given to compounds of the following formulae:

XIIb1

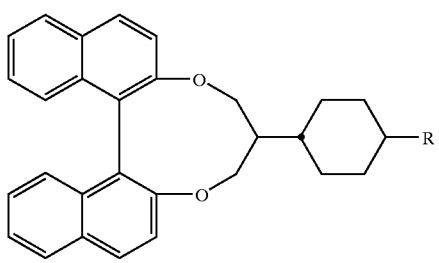

XIIc1

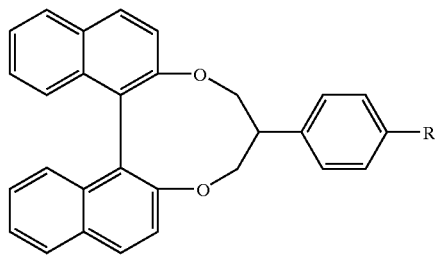

XIIc2

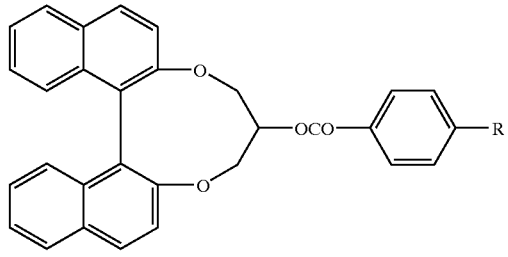

in which R, X, Sp and P are as defined above.

The chiral binaphthol acetal derivatives of WO 02/34739 conform to the formula XIII:

XIII

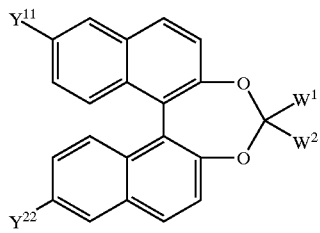

in which the individual radicals have the following meanings:

$Y^{11}$ and $Y^{22}$ are each, independently of one another, H, F, Cl, Br, I, CN, SCN, $SF_5$ or chiral or achiral alkyl having up to 30 carbon atoms, which may be unsubstituted or monosubstituted or polysubstituted by F, Cl, Br, I or CN, and in which one or more non-adjacent $CH_2$ groups may each, independently of one another, be replaced by —O—, —S—, —NH—, —N($CH_3$)—, —CO—, —COO—, —OCO—, —OCO—O—, —S—CO—, —CO—S—, —CH=CH— or —C≡C— in such a way that O atoms are not linked directly to one another, or a polymerizable group, one of the radicals $W^1$ and $W^2$ is —$Z^{11}$—$A^{11}$13 ($Z^{22}$—$A^{22}$)$_m$—$R^{11}$ and the other is H, $R^{22}$ or $A^{33}$, or both radicals $W^1$ and $W^2$ are —$Z^1$—$A^1$—($Z^2$—$A^2$)$_m$—R, where $W^1$ and $W^2$ are not simultaneously H, or

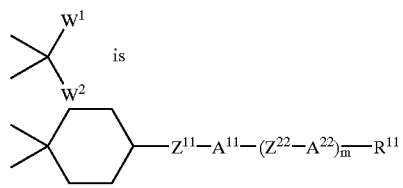

is

—$Z^{11}$—$A^{11}$—($Z^{22}$—$A^{22}$)$_{\overline{m}}$—$R^{11}$ $Z^{11}$ and $Z^{22}$ are each, independently of one another, —O—, —S—, —CO—, —COO—, —OCO—, —O—COO—, —CO—N($R^{00}$)—, —N($R^{00}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CH=N—, —N=CH—, —N=N—, —CF=CH—, —CH=CF—, —CF=CF—, —C≡C—, —CH=CH—COO—, —OCO—CH=CH— or a single bond, $R^{00}$ is H or alkyl having from 1 to 4 carbon atoms, $A^{11}$, $A^{22}$ and $A^{33}$ are each, independently of one another, 1,4-phenylene, in which, in addition, one or more CH groups may be replaced by N, 1,4-cyclohexylene, in which, in addition, one or more non-adjacent CH$_2$ groups may be replaced by O and/or S, 1,3-dioxolane-4,5-diyl, 1,4-cyclohexenylene, 1,4-bicyclo[2.2.2]-octylene, piperidine-1,4-diyl, naphthalene-2,6-diyl, decahydronaphthalene-2,6-diyl or 1,2,3,4-tetrahydronaphthalene-2,6-diyl, where all these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms may be replaced by F or Cl, and $A^{11}$ is alternatively a single bond, m is 0, 1, 2 or 3, and $R^{11}$ and $R^{22}$ are each, independently of one another, as defined for $Y^{11}$.

Particular preference is given to compounds of the formula XIII in which $Y^{11}$ and $Y^{22}$ are H, at least one of the radicals $Z^{11}$ and $Z^{22}$ is —CF$_2$O—, —OCF$_2$— or —CF$_2$CF$_2$—, one of the radicals $Z^{11}$ and $Z^{22}$ is —CF$_2$O—, —OCF$_2$—, —CF$_2$CF$_2$— or —CF=CF— and the other is —COO—, —OCO—, —CH$_2$—CH$_2$— or a single bond,

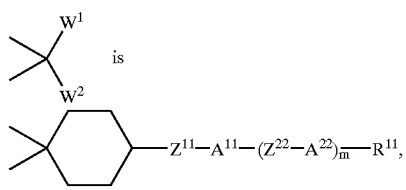

and m is 0 or 1, in particular 0, m is 0 and $A^{11}$ is a single bond, $W^1$ is H, $R^{22}$ or $A^{33}$ and $W^2$ is 13 $Z^{11}$—$A^{11}$—($Z^{22}$—$A^{22}$)$_m$—$R^{11}$, and m is 1 or 2.

—$Z^{11}$—$A^{11}$—($Z^{22}$—$A^{22}$)$_m$ in the formula XIII is preferably a mesogenic group selected from the following subformulae or mirror images thereof. In these, Phe denotes 1,4-phenylene, which is optionally substituted by one or more groups L, and Cyc denotes 1,4-cyclohexylene. Z in each case, independently, has one of the meanings given above for $Z^{11}$. L is F, Cl, CN or optionally fluorinated alkyl, alkoxy, alkylcarbonyl or alkoxycarbonyl having from 1 to 4 carbon atoms.

-Phe-
-Cyc-
-Phe-Z-Phe-
-Phe-Z-Cyc-
-Cyc-Z-Cyc-
-Phe-Z-Phe-Z-Phe-
-Phe-Z-Phe-Z-Cyc-
-Phe-Z-Cyc-Z-Phe-
-Cyc-Z-Phe-Z-Cyc-
-Cyc-Z-Cyc-Z-Phe-
-Cyc-Z-Cyc-Z-Cyc-

L is preferably F, Cl, CN, NO$_2$, CH$_3$, C$_2$H$_5$, OCH$_3$, OC$_2$H$_5$, COCH$_3$, COC$_2$H$_5$, CF$_3$, CHF$_2$, CH$_2$F, OCF$_3$ OCHF$_2$, OCH$_2$F, OC$_2$F$_5$, in particular F, Cl, CN, CH$_3$, CHF$_2$, C$_2$H$_5$, OCH$_3$, OCHF$_2$, CF$_3$ or OCF$_3$, very particularly preferably F, CH$_3$, CF$_3$, OCH$_3$, OCHF$_2$ or OCF$_3$.

In a further preferred embodiment, $Y^1$, $Y^2$ and/or $R^{11}$ in the formula XII are a polymerizable group P—Sp—X, in which P is CH$_2$=CW—COO—, WCH=CH—(O)$_k$—,

or CH$_2$=CH—phenyl-(O)$_k$—, W is H, CH$_3$ or Cl, and k is 0 or 1,

Sp is a spacer group having from 1 to 25 carbon atoms or a single bond,

X is —O—, —S—, —OCH$_2$—, —CH$_2$O—, —CO—, —COO—, —OCO—, —OCO—O, —CO—N($R^{00}$)—, —N($R^{00}$)—CO—, —OCH$_2$—, —CH$_2$O—, —SCH$_2$—, —CH$_2$S—, —CH=CH—COO—, —OOC—CH=CH— or a single bond, and $R^{00}$ is H or alkyl having from 1 to 4 carbon atoms.

P is preferably a vinyl, acrylate, methacrylate, propenyl ether or epoxy group, in particular an acrylate or methacrylate group.

Sp is preferably chiral or achiral, straight-chain or branched alkylene having from 1 to 20, preferably from 1 to 12, carbon atoms, in which, in addition, one or more non-adjacent CH$_2$ groups may be replaced by —O—, —S—, —NH—, —N(CH$_3$)—, —CO—, —O—CO—, —S—CO—, —O—COO—, —CO—S—, —CO—O—, —CH(halogen)—, —CH(CN)—, —CH=CH— or —C≡C— in such a way that O atoms are not linked directly to one another.

Typical spacer groups are, for example, —(CH$_2$)$_p$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$—, in which p is an integer from 2 to 12, and r is an integer from 1 to 3.

Preferred spacer groups are, for example, ethylene, propylene, butylene, pentylene, hexylene, heptylene, octylene, nonylene, decylene, undecylene, dodecylene, octadecylene, ethylenoxyethylene, methylenoxybutylene, ethylenethioethylene, ethylene-N-methyl-iminoethylene, 1-methylalkylene, ethenylene, propenylene and butenylene.

Particularly preferred compounds of the formula XIII are the following:

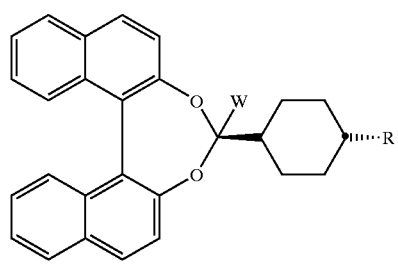 XIIIa
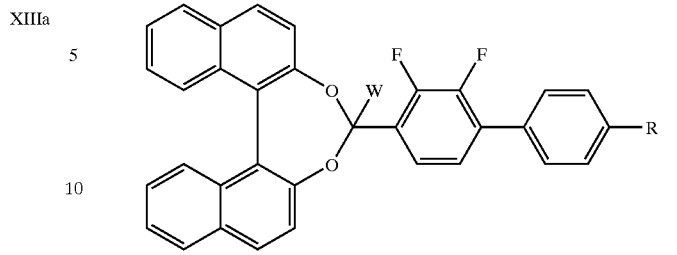 XIIIf
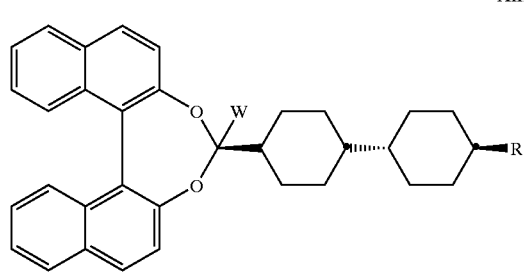 XIIIb
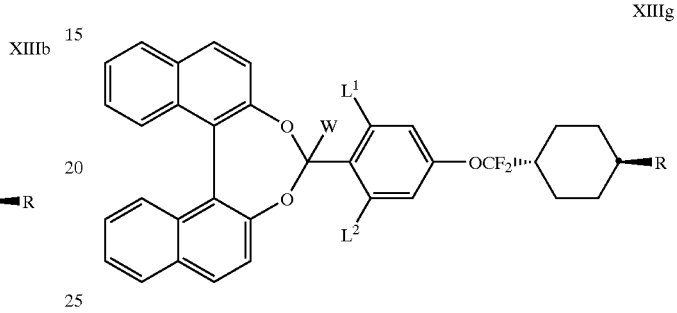 XIIIg
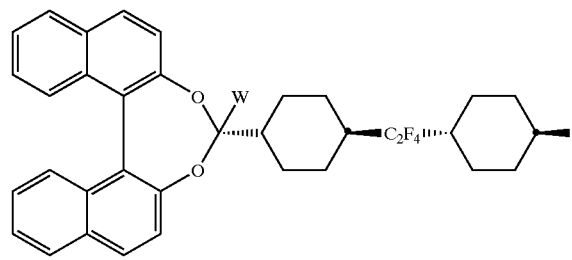 XIIIc
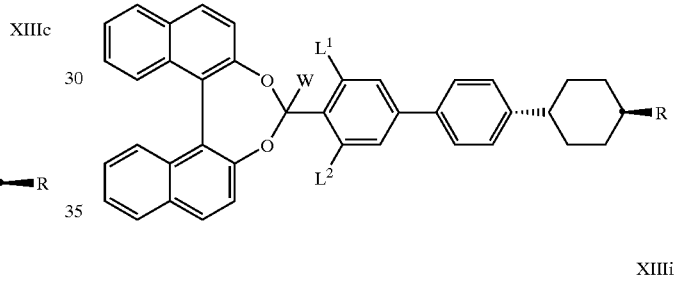 XIIIh
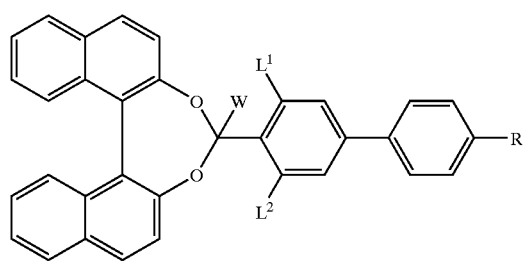 XIIId
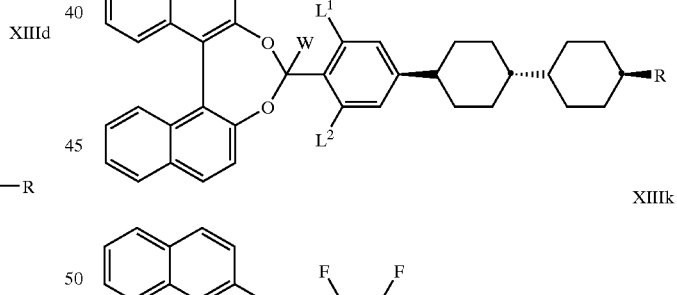 XIIIi
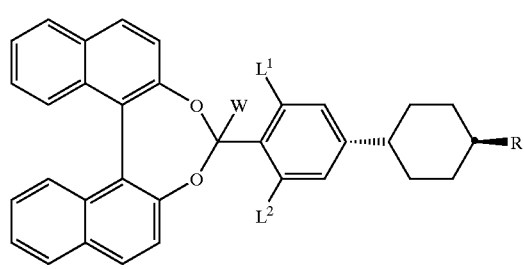 XIIIe
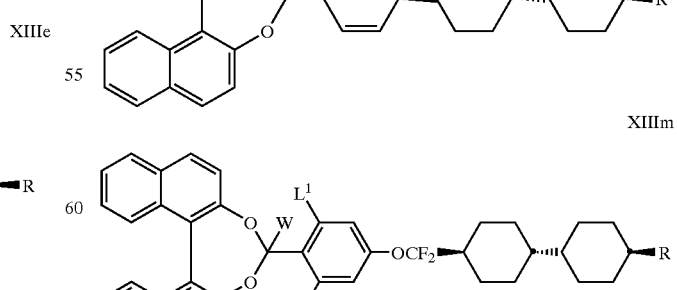 XIIIk
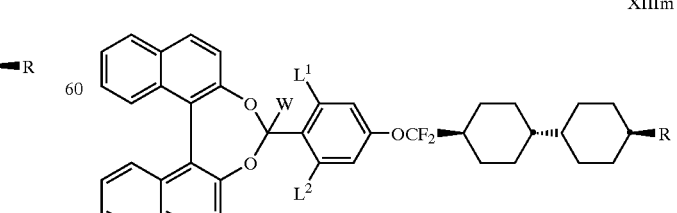 XIIIm -continued

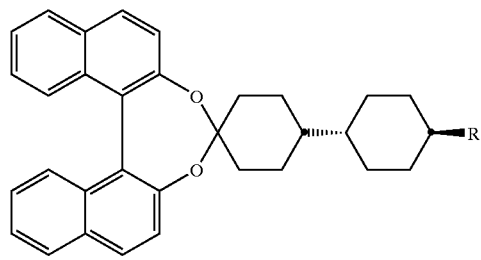

XIIIn

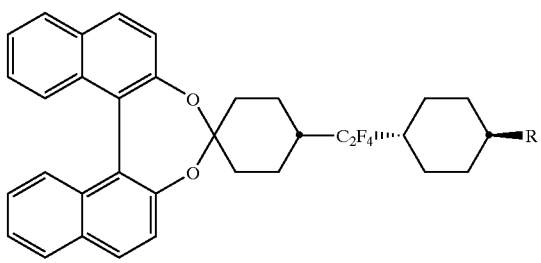

XIIIo

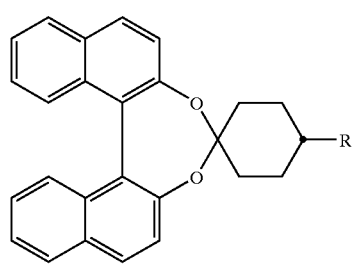

XIIIp

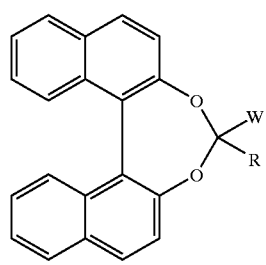

XIIIq in which R is as defined for $R^{11}$ in the formula XIII, $L^1$ and $L^2$ are H or F, and W is H, F, alkyl or alkoxy having from 1 to 12 carbon atoms, cyclohexyl or phenyl, which may also be monosubstituted to tetrasubstituted by L, as defined above. Particular preference is given to compounds of the above—mentioned formulae in which W is H or F, in particular H.

The chiral TADDOL derivatives of WO 02/06265 conform to the formula XIV

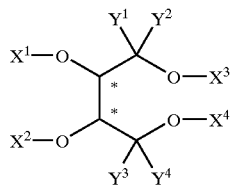

XIV in which $X^1$ and $X^2$ are H, or together form a bivalent radical selected from the group consisting of —CH$_2$—, —CHR$^{11}$—, —CR$^{11}{}_2$—, —SiR$^{11}{}_2$— and 1,1-cycloalkylidene, $X^3$ and $X^4$ have one of the meanings indicated for $X^1$ and $X^2$, $Y^1$, $Y^2$, $Y^3$ and $Y^4$ may be identical or different and are each, independently of one another, $R^{11}$, A or M—$R^{22}$, A is a cyclic group, M is a mesogenic group, and $R^{11}$ and $R^{22}$ are each, independently of one another, H, F, Cl, Br, CN, SCN, SF$_5$ or chiral or achiral alkyl having up to 30 carbon atoms, which may be unsubstituted or monosubstituted or polysubstituted by F, Cl, Br, I or CN, and in which one or more non-adjacent CH$_2$ groups may each, independently of one another, be replaced by —O—, —S—, —NH—, —N(CH$_3$)—, —CO—, —COO—, —OCO—, —OCO—O—, —S—CO—, —CO—S—, —CH=CH— or —C≡C— in such a way that O atoms are not linked directly to one another, or are a polymerizable group, where at least one of the radicals $Y^1$, $Y^2$, $Y^3$ and $Y^4$ is M—$R^{22}$.

Particular preference is given to compounds of the formula XIV in which $Y^1$, $Y^2$, $Y^3$ and $Y^4$ are identical radicals, $Y^1$=$Y^3$ and $Y^2$=$Y^4$, one, two, three or four of the radicals $Y^1$, $Y^2$, $Y^3$ and $Y^4$ are M—$R^{22}$, in particular those in which all radicals $Y^1$ to $Y^4$ are M—$R^{22}$, and those in which $Y^1$ and $Y^3$ are M—$R^{22}$ and $Y^2$ and $Y^4$ are A, $X^1$ and $X^2$ together are a bivalent radical —CH$_2$—, —CHR$^{11}$— or —CR$^{11}{}_2$—, in which $R^{11}$ is preferably alkyl having from 1 to 8 carbon atoms, in particular methyl, ethyl or propyl, $X^1$ and $X^2$ together are a 1,1-cycloalkylidene radical, in particular 1,1-cyclopentylidene or 1,1-cyclohexylidene, $X^3$ and $X^4$ are H, $R^{22}$ is different from H.

The cyclic group A in the formula XIV is preferably phenyl, in which, in addition, one or more CH groups may be replaced by N, cyclohexyl, in which, in addition, one or two non-adjacent CH$_2$ groups may be replaced by O and/or S, 1,3-dioxolan—2-yl, cyclohexenyl, bicyclo[2.2.2] octylene, piperidin-1- or -4-yl, naphthalen-2- or -6-yl, decahydronaphthalen-2- or -6-yl or 1,2,3,4-tetrahydronaphthalen-2- or -6-yl, where all these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms may be replaced by F or Cl, particularly preferably phenyl or cyclohexyl.

The mesogenic group M is preferably

—$A^{11}$—($Z^{11}$—$A^{22}$)$_m$— in which $A^{11}$ and $A^{22}$ are each, independently of one another, 1,4-phenylene, in which, in addition, one or more CH groups may be replaced by N, 1,4-cyclohexylene, in which, in addition, one or two non-adjacent CH$_2$ groups may be replaced by O and/or S, 1,3-dioxolane-4,5-diyl, cyclohexenylene, bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where all these groups are unsubstituted or monosubstituted or polysubstituted by halogen, CN or NO₂ or alkyl, alkoxy, alkylcarbonyl or alkoxycarbonyl having from 1 to 7 carbon atoms, in which one or more H atoms may be replaced by F or Cl, $Z^{11}$ is in each case, independently of one another, —O—, —S—, —CO—, —COO—, —OCO—, —O—COO—, —CO—N($R^{00}$)—, —N($R^{00}$)—CO—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CH—, —CF=CH—, —CH=CF—, —CF=CF—, —C≡C—, —CH=CH—COO—, —OCO—CH=CH— or a single bond, $R^{00}$ is H or alkyl having from 1 to 4 carbon atoms, and m is 1, 2, 3 or 4.

M in the formula XIV is preferably a mesogenic group selected from the following sub-formulae. In these sub-formulae, Phe denotes 1,4-phenylene, which is optionally substituted by one or more groups L, and Cyc denotes 1,4-cyclohexylene. Z in each case, independently, has one of the meanings indicated above for $Z^{11}$. L is F, Cl, CN or optionally fluorinated alkyl, alkoxy, alkylcarbonyl or alkoxycarbonyl having from 1 to 4 carbon atoms.

-Phe-Z-Phe-
-Phe-Z-Cyc-
-Cyc-Z-Cyc-
-Phe-Z-Phe-Z-Phe-
-Phe-Z-Phe-Z-Cyc-
-Phe-Z-Cyc-Z-Phe-
-Cyc-Z-Phe-Z-Cyc-
-Cyc-Z-Cyc-Z-Phe-
-Cyc-Z-Cyc-Z-Cyc-

L is preferably F, Cl, CN, NO₂, CH₃, C₂H₅, OCH₃, OC₂H₅, COCH₃, COC₂H₅, CF₃, CHF₂, CH₂F, OCF₃ OCHF₂, OCH₂F, OC₂F₅, in particular F, Cl, CN, CH₃, C₂H₅, OCH₃, CF₃ or OCF₃, particularly preferably F, CH₃, CF₃, OCH₃ or OCF₃.

In a further preferred embodiment, $Y^1$, $Y^2$ or R in the formula XIV is a polymerizable group P—Sp—X as indicated above.

Particularly preferred compounds of the formula XIV are the following:

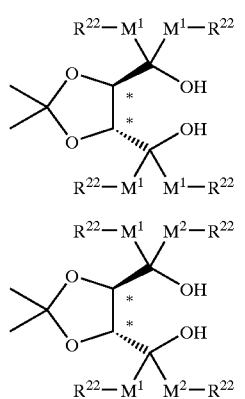

XIV-1

XIV-2 in which $R^{22}$ is as defined in the formula XIV, and $M^1$ and $M^2$ are different mesogenic groups having one of the meanings as indicated above for M.

Particularly preferred compounds of the formula XIV and of the preferred sub-formulae are those in which $M^1$—$R^{22}$ and $M^2$—$R^{22}$ are a group selected from the following formulae:

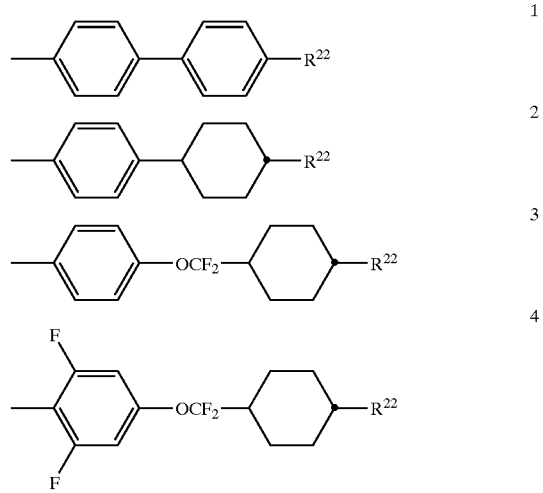

in which $R^{22}$ has one of the meanings indicated in the formula XIV, and the phenyl rings may also be mono-substituted to tetrasubstituted by L, as defined above.

The chiral dopants containing a fluorinated bridging group and a terminal chiral group of WO 02/06196 conform to the formula XV $$R^{11}\text{—}X^{11}\text{—}A^{11}\text{—}(Z^{11}\text{—}A^{22})_m X^{22}\text{—}R^{22} \qquad \text{XV}$$

in which $R^{11}$ and $R^{22}$ are each, independently of one another, H, F, Cl, Br, CN, SCN, SF₅, or chiral or achiral alkyl having up to 30 carbon atoms, which may be unsubstituted or monosubstituted or polysubstituted by F, Cl, Br, I or CN, and in which one or more non-adjacent CH₂ groups may each, independently of one another, be replaced by —O—, —S—, —NH—, —N(CH₃)—, —CO—, —COO—, —OCO—, —OCO—O—, —S—CO—, —CO—S—, —CH=CH—or —C≡C— in such a way that O atoms are not linked directly to one another, a chiral radical containing one or more aromatic or aliphatic ring groups, which may also contain fused or spiro-linked rings and one or more heteroatoms, or a polymerizable group, $X^{11}$ and $X^{22}$ are each, independently of one another, —CF₂O—, —OCF₂—, —CF₂S—, —SCF₂—, —CF₂CH₂—, —CH₂CF₂—, —CF₂CF₂—, —CF=CH—, —CH=CF—, —CF=CF— or a single bond, $Z^{11}$ is in each case, independently of one another, —O—, —S—, —CO—, —COO—, —OCO—, —O—COO—, —CO—N($R^{00}$)—, —N($R^{00}$)—CO—, —OCH₂—, —CH₂O—, —SCH₂—, —CH₂S—, —CF₂O—, —OCF₂—, —CF₂S—, —SCF₂—, —CH₂CH₂—, —CF₂CH₂—, —CH₂CF₂—, —CF₂CF₂—, —CH=CH—, —CF=CH—, —CH=CF—, —CF=CF—, —C≡C—, —CH=CH—COO—, —OCO—CH=CH—or a single bond, $R^{00}$ is H or alkyl having from 1 to 4 carbon atoms, $A^{11}$ and $A^{22}$ are each, independently of one another, 1,4-phenylene, in which, in addition, one or more CH groups may be replaced by N, 1,4-cyclohexylene, in which, in addition, one or two non-adjacent CH₂ groups may be replaced by O and/or S, 1,3-dioxolane- 4,5-diyl, cyclohexenylene, bicyclo[2.2.2]octylene, piperidine-1,4-diyl, naphthalene-2,6-diyl, decahydronaphthalene-2,6-diyl or 1,2,3,4-tetrahydronaphthalene-2,6-diyl, where all these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms may be replaced by F or Cl, and m is 1, 2, 3, 4 or 5, in which at least one of the radicals $X^{11}$, $X^{22}$ and $Z^{11}$ is —CF$_2$O—, —OCF$_2$—, —CF$_2$S—, —SCF$_2$—, —CF$_2$CH$_2$—, —CF$_2$CF$_2$—, —CF=CH— or —CF=CF— and at least one of the radicals $R^{11}$ and $R^{22}$ is a chiral group.

If $R^{11}$ or $R^{22}$ in the formula XV is a chiral group, it is preferably selected from the following formula:

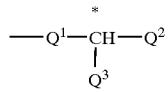

in which $Q^1$ is alkylene or alkylenoxy having from 1 to 9 carbon atoms or a single bond, $Q^2$ is alkyl or alkoxy having from 1 to 10 carbon atoms which is unsubstituted or monosubstituted or polysubstituted by F, Cl, Br or CN and in which, in addition, one or more non-adjacent CH$_2$ groups may each, independently of one another, be replaced by —C≡C—, —CH=CH—, —O—, —S—, —NH—, —N(CH$_3$)—, —CO—, —COO—, —OCO—, —OCO—O—, —S—CO— or —CO—S— in such a way that O atoms are not linked directly to one another, $Q^3$ is F, Cl, Br, CN or alkyl or alkoxy as defined for $Q^2$, but different from $Q^2$.

If $Q^1$ is alkylenoxy, the O atom is preferably adjacent to the chiral carbon atom.

Preferred chiral groups are 2-alkyl, 2-alkoxy, 2-methylalkyl, 2-methylalkoxy, 2-fluoroalkyl, 2-fluoroalkoxy, 2-(2-ethynyl)alkyl, 2-(2-ethynyl)alkoxy, 1,1,1-trifluoro-2-alkyl and 1,1,1-trifluoro-2-alkoxy.

Particularly preferred chiral groups are 2-butyl (=1-methylpropyl), 2-methylbutyl, 2-methylpentyl, 3-methylpentyl, 2-ethylhexyl, 2-propylpentyl, preferably 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chloropropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2oxy, 2-fluorooctyloxy, 2-fluorodecyloxy, 1,1,1-trifluoro-2-octyloxy, 1,1,1-trifluoro-2-octyl and 2-fluoromethyloctyloxy. Particular preference is given to 2-hexyl, 2-octyl, 2-octyloxy, 1,1,1-trifluoro-2-hexyl, 1,1,1-trifluoro-2-octyl and 1,1,1-trifluoro-2-octyloxy.

In a preferred embodiment, $R^{11}$ or $R^{22}$ is a chiral radical containing one or more aromatic or aliphatic ring groups, which may also contain fused or spiro-linked rings and one or more heteroatoms, in particular N and/or O atoms.

Preferred chiral radicals of this type are, for example, cholesteryl, terpenoid radicals, as described, for example, in WO 96/17901, preferably selected from menthyl, neomenthyl, campheyl, pineyl, terpineyl, isolongifolyl, fenchyl, carreyl, myrthenyl, nopyl, geraniyl, linaloyl, neryl, citronellyl and dihydrocitronellyl, in particular menthyl, menthone derivatives, such as, for example,

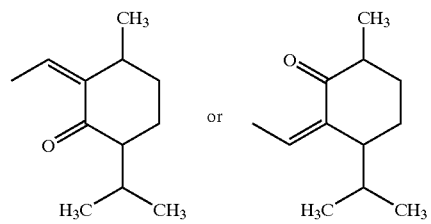

or terminal chiral sugar derivatives containing mono- or bicyclic pyranose or furanose groups, as described, for example, in WO 95/16007.

Particularly preferred compounds of the formula XV are the following:

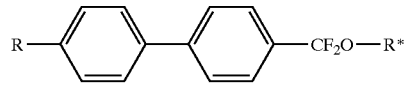

XV-1

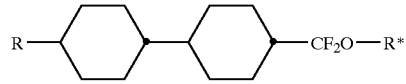

XV-2

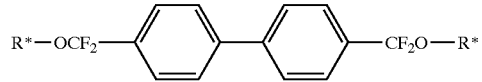

XV-3

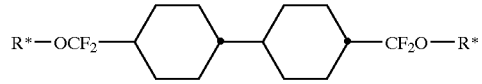

XV-4

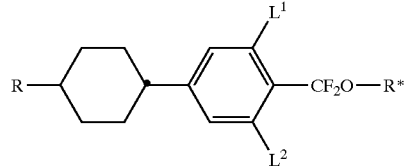

XV-5

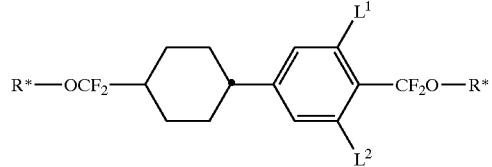

XV-6

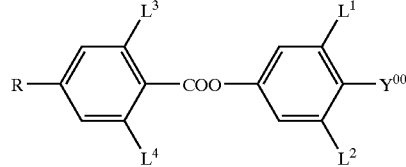

XV-7

XV-8
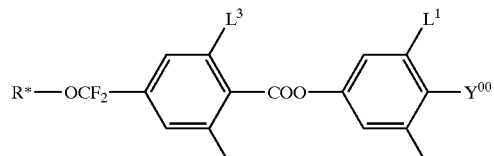
XV-9
XV-10
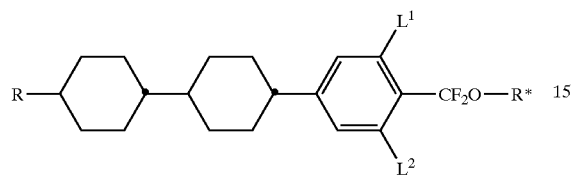
XV-11
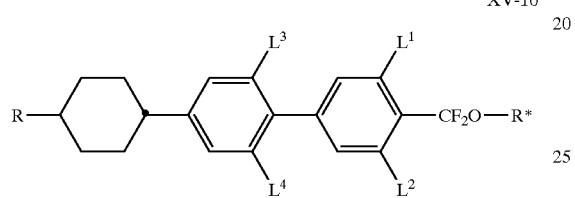
XV-12
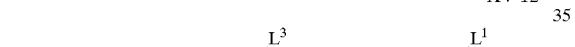
XV-13
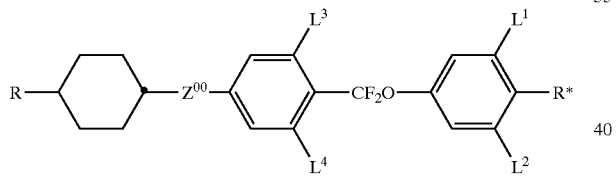
XV-14
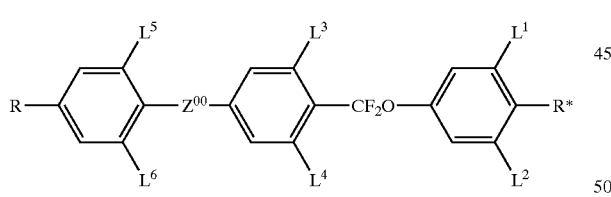
XV-15
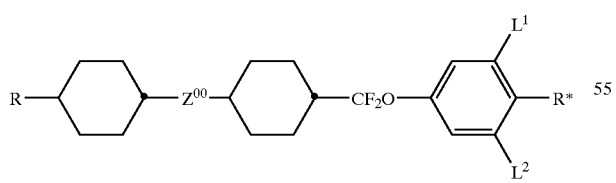
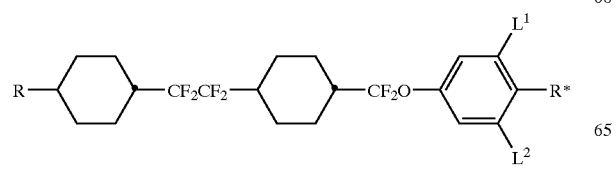
XV-16
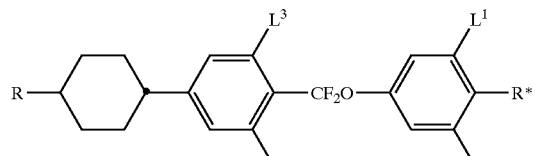
XV-17
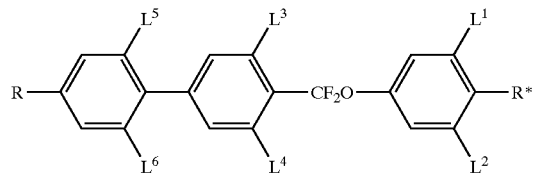
XV-18
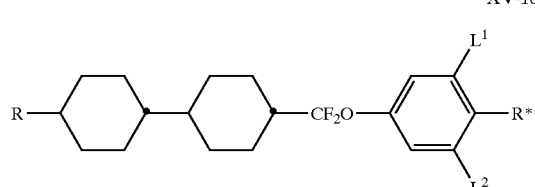
XV-19
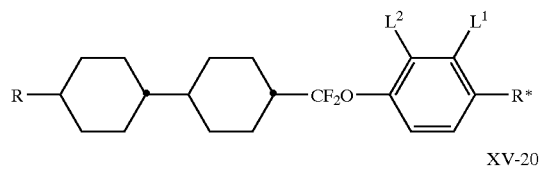
XV-20
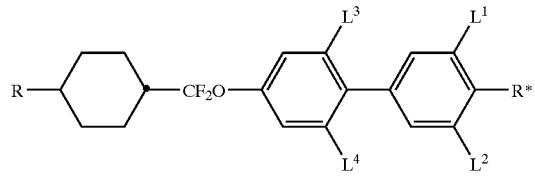
XV-21
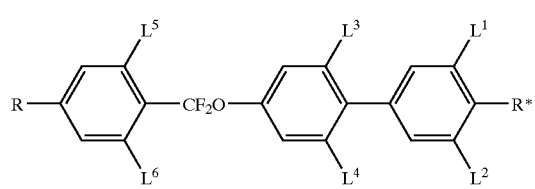
XV-22
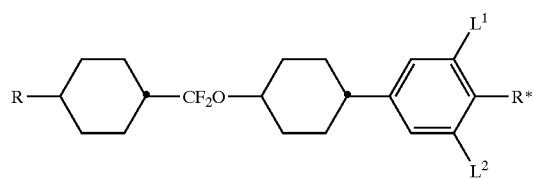
XV-23
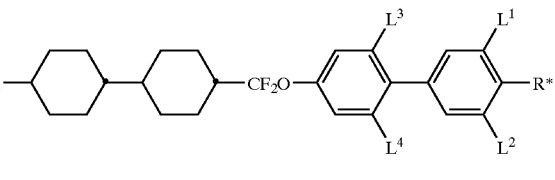

-continued

XV-24

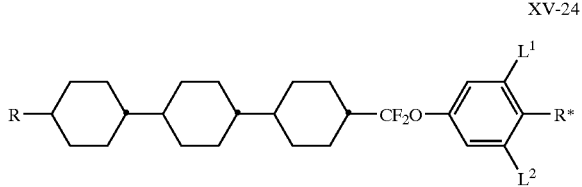

in which

R has one of the meanings indicated for $R^{11}$ in the formula XV,

R* is a chiral group having one of the meanings indicated for $R^{11}$ in the formula XV or having one of the preferred meanings indicated above, $Y^{00}$ is F, Cl, CN, $CF_3$, $CHF_2$, $CH_2F$, $OCF_3$, $OCHF_2$, $OCH_2F$, $C_2F_5$ or $OC_2F_5$, $Z^{00}$ is —COO—, —OCO—, —$CH_2CH_2$—, —$CF_2CF_2$—, —$CF_2O$— or —$OCF_2$—, and $L^1$, $L^2$, $L^3$, $L^4$, $L^5$ and $L^6$ are each, independently of one another, H or F.

Particular preference is given to compounds in which at least one, preferably both, radicals $L^1$ and $L^2$ are F. R is preferably an achiral group. R* is preferably

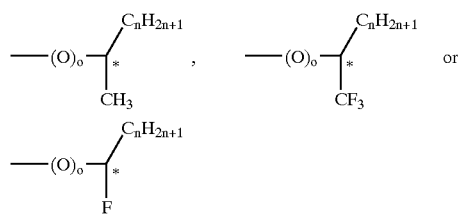

in which o is 0 or 1, and o is 0 if R* is adjacent to a $CF_2O$ group, and n is an integer from 2 to 12, preferably from 3 to 8, particularly preferably 4, 5 or 6. * denotes a chiral carbon atom.

The chiral dopants containing a fluorinated bridging group and a central chiral group of WO 02/06195 conform to the formula XVI:

$$R^{11}-X^{33}-(A^{11}-Z^{11})_m-G-(Z^{22}-A^{22})_n-X^{44}R^{22} \qquad XVI$$

in which $R^{11}$ and $R^{22}$ are each, independently of one another, H, F, Cl, Br, CN, SCN, $SF_5$ or chiral or achiral alkyl having up to 30 carbon atoms, which may be unsubstituted or monosubstituted or polysubstituted by F, Cl, Br, I or CN, and in which one or more non-adjacent $CH_2$ groups may each, independently of one another, be replaced by —O—, —S—, —NH—, —N($CH_3$)—, —CO—, —COO—, —OCO—, —OCO—O—, —S—CO—, —CO—S—, —CH=CH— or —C≡C— in such a way that O atoms are not linked directly to one another, or a polymerizable group, $X^{33}$, $X^{44}$, $Z^{11}$ and $Z^{22}$ are each, independently of one another, —O—, —S—, —CO—, —COO—, —OCO—, —O—COO—, —CO—N($R^{00}$)—, —N($R^{00}$)—CO—, —$OCH_2$—, —$CH_2O$—, —$SCH_2$—, —$CH_2S$—, —$CF_2O$—, —$OCF_2$—, —$CF_2S$—, —$SCF_2$—, —$CH_2CH_2$—, —$CF_2CH_2$—, —$CH_2CF_2$—, —$CF_2CF_2$—, —CH=CH—, —CF=CH—, —CH=CF—, —CF=CF—, —C≡C—, —CH=CH—COO—, —OCO—CH=CH— or a single bond, $R^{00}$ is H or alkyl having from 1 to 4 carbon atoms, $A^{11}$ and $A^{22}$ are each, independently of one another, 1,4-phenylene, in which, in addition, one or more CH groups may be replaced by N, 1,4-cyclohexylene, in which, in addition, one or two non-adjacent $CH_2$ groups may be replaced by O and/or S, 1,3-dioxolane-4,5-diyl, cyclohexenylene, bicyclo[2.2.2]octylene, piperidine-1,4-diyl, naphthalene-2,6-diyl, decahydronaphthalene-2,6-diyl or 1,2,3,4tetrahydronaphthalen-2,6-diyl, where all these groups are unsubstituted or monosubstituted or polysubstituted by halogen, CN or $NO_2$ or alkyl, alkoxy, alkylcarbonyl or alkoxycarbonyl having from 1 to 7 carbon atoms, in which one or more H atoms may be replaced by F or Cl, m and n are each, independently of one another, 1, 2, 3 or 4, and G is a bivalent chiral group, in which at least one of the radicals $X^{33}$, $X^{44}$, $Z^{11}$ and $Z^{22}$ is —$CF_2O$—, —$OCF_2$—, —$CF_2S$—, —$SCF_2$—, —$CF_2CH_2$—, —$CF_2CF_2$—, —CF=CH— or —CF=CF—.

G in the formula XVI is preferably a chiral bivalent group from the group consisting of sugar derivatives, binaphthyl derivatives and optically active glycols, in particular alkyl- or arylethane-1,2-diols. Of the sugar derivatives, mono- and bicyclic pentose and hexose groups are particularly preferred.

Particular preference is given to the following groups G:

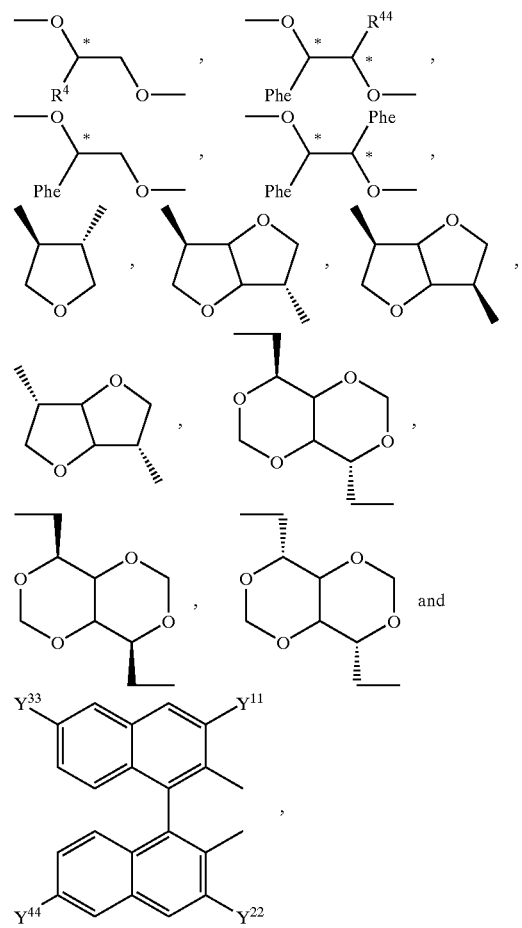

in which Phe is as defined above, $R^{44}$ is F or optionally fluorinated alkyl having from 1 to 4 carbon atoms, and $Y^{11}$, $Y^{22}$, $Y^{33}$ and $Y^{44}$ have one of the meanings indicated for $R^1$ in the formula XV.

G is preferably dianhydrohexitol, in particular,

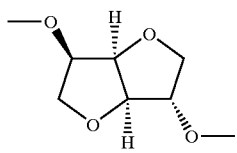

dianhydrosorbitol

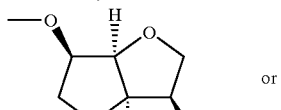  or dianhydromannitol

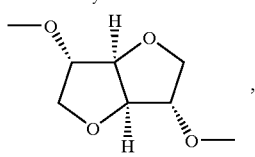  , dianhydroiditol particularly preferably dianhydrosorbitol, substituted ethanediol, such as:

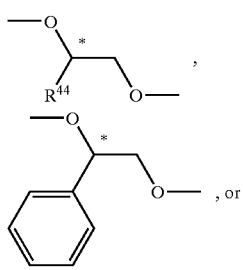

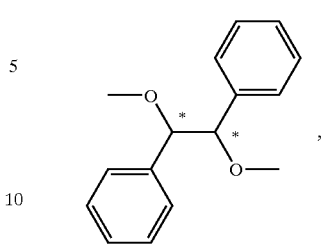

which $R^{44}$ is F, $CH_3$ or $CF_3$, or optionally substituted binaphthyl

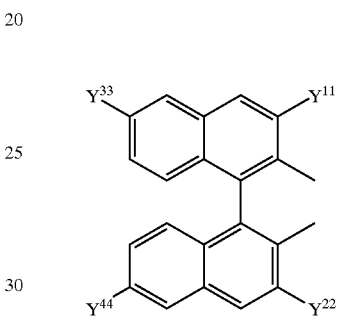

in which $Y^{11}$, $Y^{22}$, $Y^{33}$ and $Y^{44}$ are H, F or optionally fluorinated alkyl having from 1 to 8 carbon atoms.

Particularly preferred compounds of the formula XVI are the following:

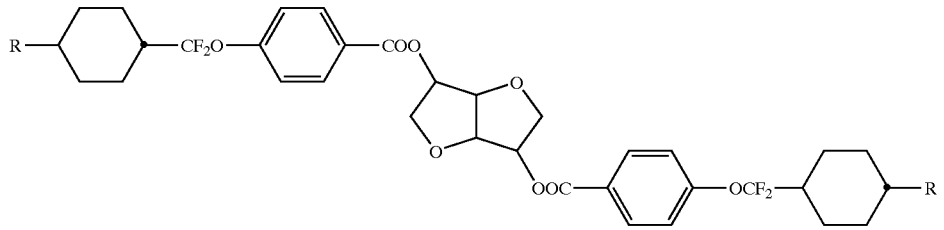

XVI-1

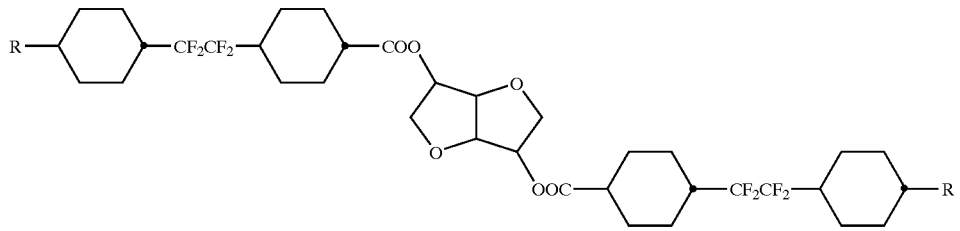

XVI-2

-continued
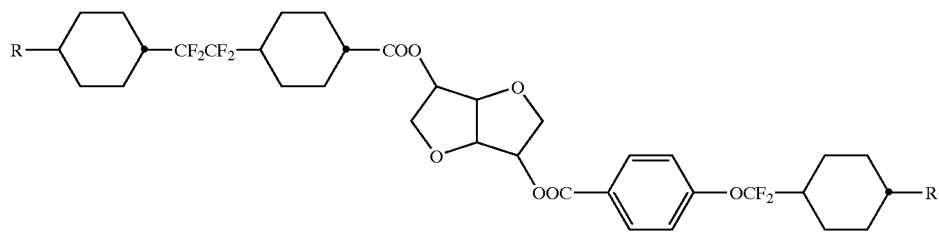
XVI-3
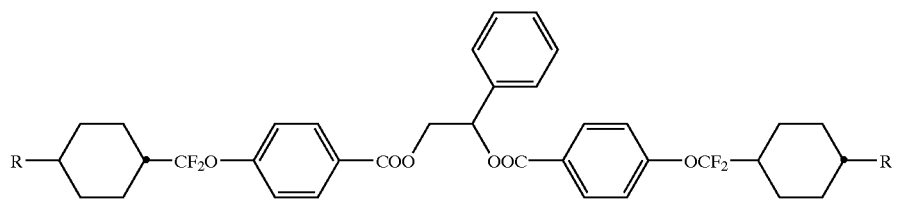
XVI-4
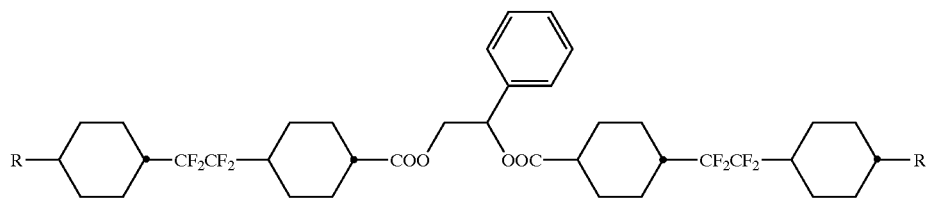
XVI-5
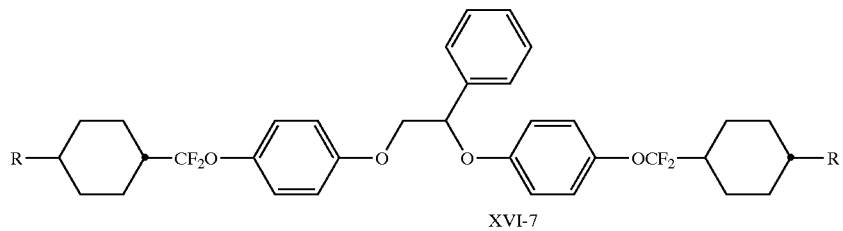
XVI-6
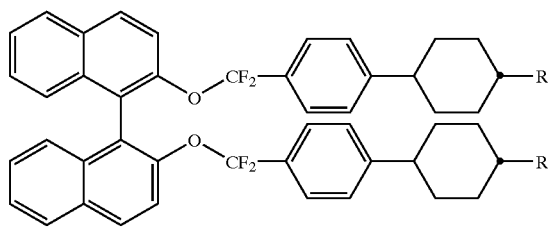
XVI-7
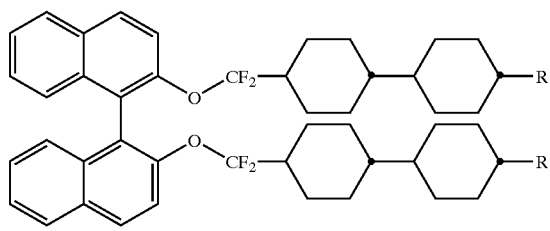
XVI-8
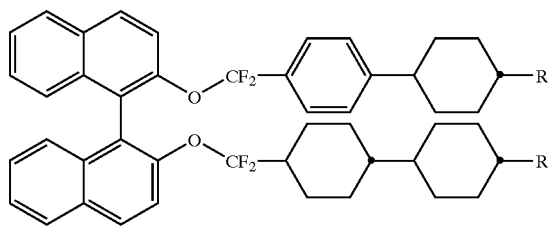
XVI-9

XVI-10

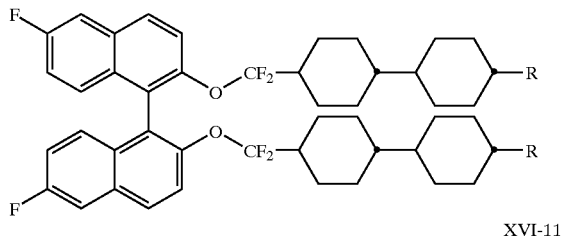

XVI-11

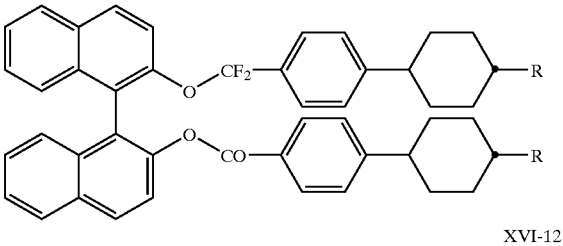

XVI-12

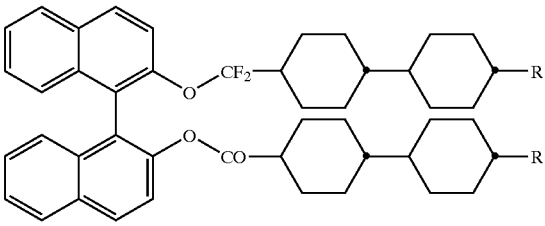

in which R has one of the meanings indicated for $R^{11}$ in the formula XVI, and the phenyl rings may also be mono-substituted to tetrasubstituted by L as defined above.

In particular, the dopants of the above-mentioned formulae X, XI, XII, XIII, XIV, XV and XVI exhibit good solubility in the nematic component and induce a cholesteric structure having high twist and low temperature dependence of the helix pitch and reflection wavelength. Even on use of only one of these dopants in small amounts, it is possible to achieve CLC media according to the invention having reflection colors in the visible wavelength range of high brightness and low temperature dependence which are suitable, in particular, for use in SSCT and PSCT displays.

This is an important advantage over the CLC media from the prior art, in which at least two dopants having opposite temperature dependence of the twist are usually required (for example one dopant having positive temperature dependence, i.e. an increase in twist with increasing temperature, and one dopant having negative temperature dependence) in order to achieve temperature compensation of the reflection wavelength. In addition, large amounts of dopants are frequently required in the known CLC media in order to achieve reflection in the visible region.

A particularly preferred embodiment of the invention therefore relates to a CLC medium and to a CLC display containing this medium, as described above and below, in which the chiral component comprises not more than one chiral compound, preferably in an amount of 15% or less, in particular 10% or less, particularly preferably 5% or less. The chiral compound in these media is particularly preferably selected from the formulae X, XI, XII, XIII, XIV, XV and XVI, including preferred sub-formulae thereof. A CLC medium of this preferred embodiment has low dependence of the reflection wavelength λ on the temperature T over a broad temperature range.

Particular preference is given to CLC media according to the invention having a temperature dependence $d\lambda/dT$ of 0.6 nm/° C. or less, in particular 0.3 nm/° C. or less, very particularly preferably 0.15 nm/° C. or less, preferably in the range between 0 and 50° C., in particular between −20 and 60° C., particularly preferably between −20 and 70° C., very particularly preferably in the range from −20° C. to a temperature of 10° C., in particular 5° C., below the clearing point.

Unless stated otherwise, $d\lambda/dT$ denotes the local gradient of the function $\lambda(T)$, where a nonlinear function $\lambda(T)$ is described to an approximation by a 2nd or 3rd order polynomial.

A further preferred embodiment relates to a CLC medium according to the invention which comprises one or more compounds containing at least one polymerizable group. CLC media of this type are particularly suitable for use, for example, in polymer gel or PSCT displays. The polymerizable compounds may be a constituent of the nematic and/or chiral component or form an additional component of the medium.

Suitable polymerizable compounds are known to the person skilled in the art and are described in the prior art. Particularly suitable are, for example, compounds containing a group P as described under the formula XII, in particular alkyl or aryl acrylates, methacrylates and epoxides. The polymerizable compounds may additionally also be mesogenic or liquid-crystalline. They may contain one or more, preferably two, polymerizable groups. Typical examples of non-mesogenic compounds containing two polymerizable groups are alkyl diacrylates or alkyl dimethacrylates containing alkyl groups having from 1 to 20 carbon atoms. Typical examples of non-mesogenic compounds containing more than two polymerizable groups are trimethylolpropane trimethacrylate and pentaerythritol tetraacrylate.

Preferred chiral polymerizable mesogenic compounds are compounds of the formulae XII to XVI containing one or more radicals containing a group P as defined under the formula XII.

Further suitable polymerizable compounds are described, for example, in WO 93/22397, EP 0 261 712, DE 195 04 224, WO 95/22586 and WO 97/00600. Typical examples of suitable polymerizable mesogenic compounds are given in the following list, which is intended to illustrate further the subject-matter of the present invention without restricting it:

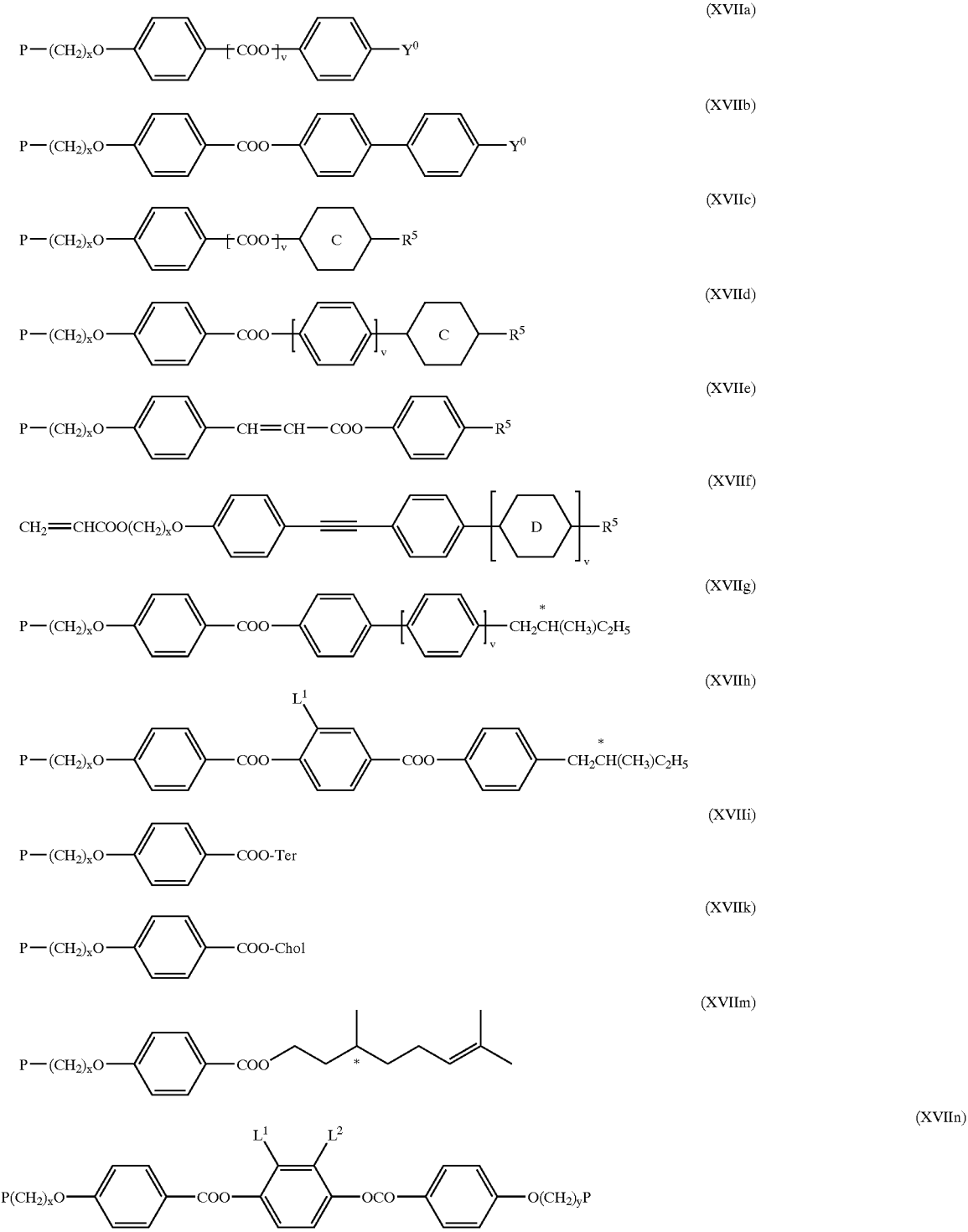

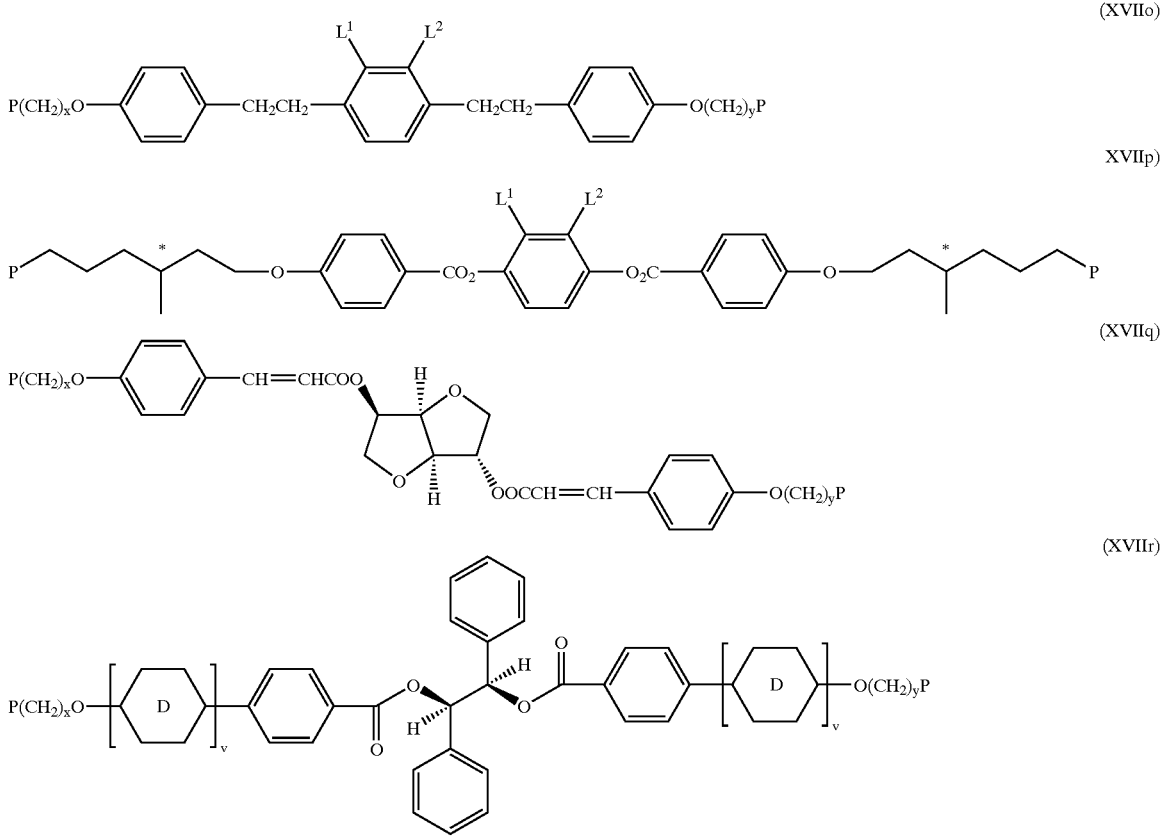

In this formulae, P is a polymerizable group as defined in the formula XII, x and y are identical or different integers from 1 to 12, C and D are 1,4-phenylene or 1,4-cyclohexylene, v is 0 or 1, $Y^0$ is a polar group, $R^5$ is a nonpolar alkyl or alkoxy group, Ter is a terpenoid radical, such as, for example, menthyl, Chol is a cholesteryl radical, and $L^1$ and $L^2$ are each, independently of one another, H, F, Cl, CN, OH, $NO_2$ or optionally halogenated alkyl, alkoxy, alkylcarbonyl or alkoxycarbonyl having from 1 to 7 carbon atoms.

The polar group $Y^0$ is preferably CN, $NO_2$, halogen, $OCH_3$, OCN, SCN, $COR^6$, $COOR^6$ or mono-, oligo- or polyfluorinated alkyl or alkoxy having from 1 to 4 carbon atoms. $R^6$ is optionally fluorinated alkyl having from 1 to 4, preferably 1, 2 or 3, carbon atoms. $Y^0$ is particularly preferably F, Cl, CN, $NO_2$, $OCH_3$, $COCH_3$, $COC_2H_5$, $COOCH_3$, $COOC_2H_5$, $CF_3$, $C_2F_5$, $OCF_3$, $OCHF_2$ or $OC_2F_5$, in particular F, Cl, CN, $OCH_3$ or $OCF_3$.

The nonpolar group $R^5$ is preferably alkyl having 1 or more, in particular from 1 to 15, carbon atoms or alkoxy having 2 or more, in particular from 2 to 15, carbon atoms.

The above-mentioned polymerizable compounds can be prepared by methods known per se, which are described in standard works of organic chemistry, such as, for example, Houben-Weyl, Methoden der organischen Chemie [Methods of Organic Chemistry], Thieme-Verlag, Stuttgart.

In the above-mentioned formulae I to XVII, the term "fluorinated alkyl or alkoxy having from 1 to 3 carbon atoms" is preferably $CF_3$, $OCF_3$, $CFH_2$, $OCFH_2$, $CF_2H$, $OCF_2H$, $C_2F_5$, $OC_2F_5$, $CFHCF_3$, $CFHCF_2H$, $CFHCFH_2$, $CH_2CF_3$, $CH_2CF_2H$, $CH_2CFH_2$, $CF_2CF_2H$, $CF_2CFH_2$, $OCFHCF_3$, $OCFHCF_2H$, $OCFHCFH_2$, $OCH_2CF_3$, $OCH_2CF_2H$, $OCH_2CFH_2$, $OCF_2CF_2H$, $OCF_2CFH_2$, $C_3F_7$ or $OC_3F_7$, in particular $CF_3$, $OCF_3$, $CF_2H$, $OCF_2H$, $C_2F_5$, $OC_2F_5$, $CFHCF_3$, $CFHCF_2H$, $CFHCFH_2$, $CF_2CF_2H$, $CF_2CFH_2$, $OCFHCF_3$, $OCFHCF_2H$, $OCFHCFH_2$, $OCF_2CF_2H$, $OCF_2CFH_2$, $C_3F_7$ or $OC_3F_7$, particularly preferably $OCF_3$ or $OCF_2H$.

The term "alkyl" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6.

Halogen is preferably F or Cl, in particular F.

If one of the above-mentioned radicals is an alkyl radical and/or an alkoxy radical, this may be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexyloxy or heptyloxy, furthermore methyl, octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If one of the above-mentioned radicals is an alkyl radical in which one $CH_2$ group has been replaced by —CH=CH—, this may be straight-chain or branched. It is preferably straight-chain and has from 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If one of the above-mentioned radicals is an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms.

Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 3-acetoxy-propyl, 3-propionyloxypropyl, 4-acetoxybutyl, methoxycarbonyl, ethoxycarbonyl, propoxycarbonyl, butoxycarbonyl, pentoxycarbonyl, methoxycarbonylmethyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If one of the above-mentioned radicals is an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 13 carbon atoms. Accordingly, it is in particular acryloyloxymethyl, 2-acryloyloxyethyl, 3-acryloyloxypropyl, 4-acryloyloxybutyl, 5-acryloyloxypentyl, 6-acryloyloxyhexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If one of the above-mentioned radicals is an alkyl or alkenyl radical which is monosubstituted by CN or $CF_3$, this radical is preferably straight-chain. The substitution by CN or $CF_3$ is in any desired position.

If one of the above-mentioned radicals is an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the CO-position.

Compounds containing branched wing groups may occasionally be of importance owing to better solubility in the conventional liquid-crystalline base materials. However, they may in particular be suitable as chiral dopants if they are optically active.

Branched groups of this type generally contain not more than one chain branch. Preferred branched radicals are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If one of the above-mentioned radicals is an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxycarbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)hexyl.

The invention furthermore relates to the use of the CLC media according to the invention for electro-optical purposes.

The invention furthermore also relates to an electro-optical display containing LC media according to the invention, in particular an SSCT or PSCT display having two plane-parallel outer plates which, together with a frame, form a cell, and a cholesteric liquid-crystal mixture located in the cell.

The structure of bistable SSCT and PSCT cells is described, for example, in WO 92/19695, WO 93/23496, U.S. Pat. No. 5,453,863 or U.S. Pat. No. 5,493,430.

The liquid-crystal mixtures according to the invention facilitate a significant broadening of the available parameter latitude. Thus, the achievable combinations of reflection wavelength, birefringence, clearing point, viscosity, thermal and UV stability and dielectric anisotropy far exceed previous materials from the prior art and make the media according to the invention particularly suitable for use in CLC displays.

The liquid-crystal mixtures according to the invention preferably have a cholesteric phase down to $-20°$ C. and preferably down to $-30°$ C., particularly preferably down to $-40°$ C., and clearing points above $70°$ C., preferably above $90°$ C., particularly preferably above $110°$ C. The dielectric anisotropy $\Delta\varepsilon$ is preferably $\geq 5$, in particular $\geq 10$, very particularly preferably $\geq 15$. The birefringence $\Delta n$ is preferably $\geq 0.08$, in particular $\geq 0.09$ and preferably $\leq 0.3$, in particular $\leq 0.16$, particularly preferably $\leq 0.15$, very particularly preferably $\leq 0.14$ and preferably between 0.09 and 0.14.

At the same time, the liquid-crystal mixtures according to the invention have low values for the viscosity and high values for the specific resistance, enabling excellent CLC displays to be achieved. In particular, the mixtures are characterized by low operating voltages.

It goes without saying that a suitable choice of the components of the mixtures according to the invention also enables higher clearing points (for example above 120° C.) to be achieved at higher threshold voltages or lower clearing points to be achieved at lower threshold voltages while retaining the other advantageous properties. Mixtures of greater $\Delta\in$ and thus lower thresholds can likewise be achieved with viscosities correspondingly increased only slightly.

The width of the cholesteric phase range is preferably at least 90° C., in particular at least 100° C. This range preferably extends at least from −20° to +60° C., particularly preferably at least from −20° to +70° C., very particularly preferably at least from −20° to +80° C.

The UV stability of the mixtures according to the invention is also considerably better, i.e. they exhibit a significantly smaller change in the reflection wavelength and operating voltage on UV exposure.

The individual compounds of the following formulae and their sub-formulae which can be used in the media according to the invention are either known or can be prepared analogously to the known compounds.

In particularly preferred embodiments, the mixtures comprise one or more compounds of the formulae Ia, Ib and/or Ie, in particular those in which $L^1$ and/or $L^2$ are F, from 1 to 9, in particular from 1 to 6, compounds of the formula I, from 7% to 80%, in particular from 40% to 70%, of one or more compounds of the formula I, one or more compounds of the formula IIa, in particular those in which $X^0$, $Y^1$ and $Y^2$ are F, from 5 to 50%, in particular from 10% to 30%, particularly preferably from 15 to 25%, of one or more compounds of the formula II, from 30 to 65% of one or more compounds of the formula I and from 5 to 40% of one or more compounds of the formula II, one or more alkenyl compounds of the formulae III1 and/or III2, preferably of the formulae III1e, III1f and III2a, in particular those in which $R^{3a}$ is H. The proportion of these compounds in the liquid-crystal mixtures is preferably from 0% to 50%, in particular from 5% to 25%, one or more compounds of the formulae IV25 and/or IV27, where L in the formula IV25 is H or F, particularly preferably F. The proportion of these compounds in the liquid-crystal mixtures is preferably from 0% to 50%, in particular from 5% to 15%, in total from 15 to 80% of compounds of the formulae II and III2, one or more dopants selected from the formulae VII, VIII and IX, one or more dopants selected from the formulae X and XI, one or more dopants selected from the formulae XII, XIII, XIV, XV and XVI, not more than one dopant, preferably selected from the formulae XII, XIII, XIV, XV and XVI, 10% or less, in particular from 0.01 to 7%, of the optically active component, a nematic component which essentially consists of compounds selected from the formulae I to VI2.

Through a suitable choice of the terminal radicals $R^1$, $R^2$, $R^3$, $R^4$, $R^5$, $X^0$ and Q—Y in the compounds of the formulae I to VI2, the addressing times, the threshold voltage and further properties can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $K_3$ (bend) and $K_1$ (splay) compared with alkyl or alkoxy radicals. 4-Alkenyl radicals, 3-alkenyl radicals and the like generally give lower threshold voltages and smaller values of $K_3/K_1$ compared with alkyl and alkoxy radicals.

A —$CH_2CH_2$— group in the bridging members $Z^1$, $Z^2$ and $Z^3$ generally results in higher values of $K_3/K_1$ compared with a single covalent bond. Higher values of $K_3/K_1$ facilitate, for example, a shorter reflection wavelength without a change in the dopant concentration owing to the higher HTP.

The optimum mixing ratio of the compounds of the formulae I to V2 depends substantially on the desired properties, on the choice of the components of the formulae I to V2 and on the choice of further components optionally present. Suitable mixing ratios within the above-mentioned range can easily be determined from case to case.

The total amount of compounds of the formulae I to V2 in the mixtures according to the invention is not crucial. The mixtures can therefore comprise one or more further components for the purpose of optimisation of various properties. However, the observed effect on the addressing times and threshold voltage is generally greater the higher the total concentration of compounds of the formulae I to V2.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and, after mixing, to remove the solvent again, for example by distillation.

The liquid-crystal mixtures according to the invention may also comprise further additives, such as, for example, one or more stabilizers or antioxidants.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is indicated. In individual cases, the acronym for the parent structure is followed, separated by a dash, by a code for the substituents $R^1$, $R^2$, $L^1$, $L^2$ and $L^3$:

| Code for $R^1$, $R^2$, $L^2$, $L^3$ | $R^1$ | $R^2$ | $L^1$ | $L^2$ | $L^3$ |
|---|---|---|---|---|---|
| nm | $C_nH_{2n+1}$ | $C_mH_{2m+1}$ | H | H | H |
| nOm | $C_nH_{2n+1}$ | $C_mH_{2m+1}$ | H | H | H |
| nO.m | $C_nH_{2n+1}$ | $OC_mH_{2m+1}$ | H | H | H |
| n | $C_nH_{2n+1}$ | CN | H | H | H |
| nN.F | $C_nH_{2n+1}$ | CN | H | H | F |

-continued

| Code for $R^1$, $R^2$, L, $L^2$, $L^3$ | $R^1$ | $R^2$ | $L^1$ | $L^2$ | $L^3$ |
|---|---|---|---|---|---|
| nN.F.F | $C_nH_{2n+1}$ | CN | H | F | F |
| nF | $C_nH_{2n+1}$ | F | H | H | H |
| nOF | $OC_nH_{2n+1}$ | F | H | H | H |
| nF.F | $C_nH_{2n+1}$ | F | H | H | F |
| nmF | $C_nH_{2n+1}$ | $C_mH_{2m+1}$ | F | H | H |
| nOCF$_3$/ nOT | $C_nH_{2n+1}$ | OCF$_3$ | H | H | H |
| n-Vm | $C_nH_{2n+1}$ | —CH=CH—$C_mH_{2m+1}$ | H | H | H |

| Code for $R^1$, $R^2$, L, $L^2$, $L^3$ | $R^1$ | $R^2$ | $L^1$ | $L^2$ | $L^3$ |
|---|---|---|---|---|---|
| nV-Vm | $C_nH_{2n+1}$—CH=CH— | —CH=CH—$C_mH_{2m+1}$ | H | H | H |

Preferred mixture components are shown in Tables A, B and C.

TABLE A ($L^1$, $L^2$, $L^3$ = H or F)

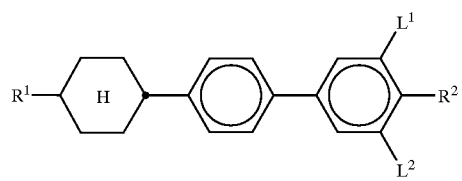

BCH

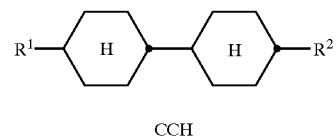

CCH

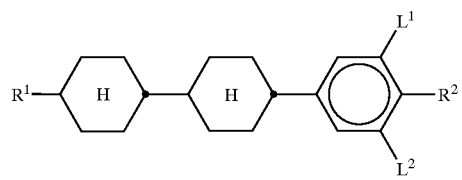

CCP

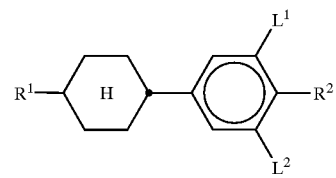

PCH

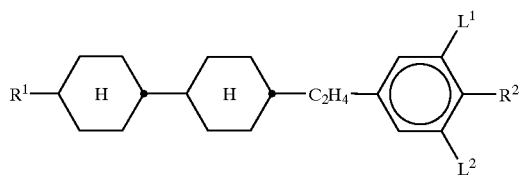

ECCP

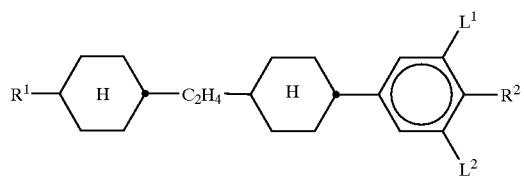

CECP

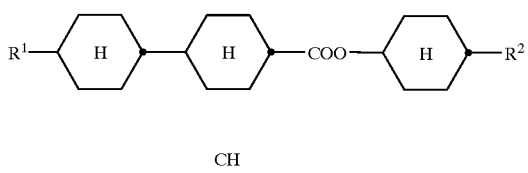

CH

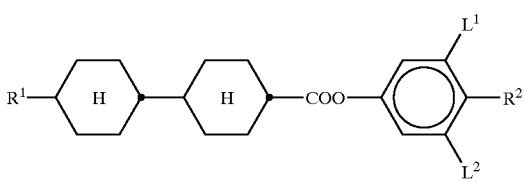

CP

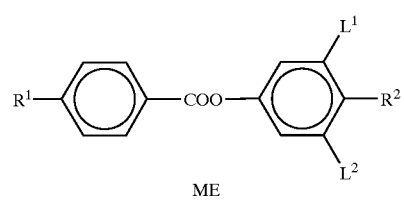

ME

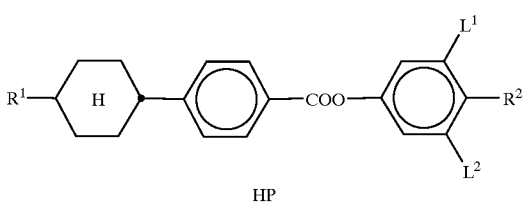

HP

TABLE A-continued
$(L^1, L^2, L^3 = H \text{ or } F)$
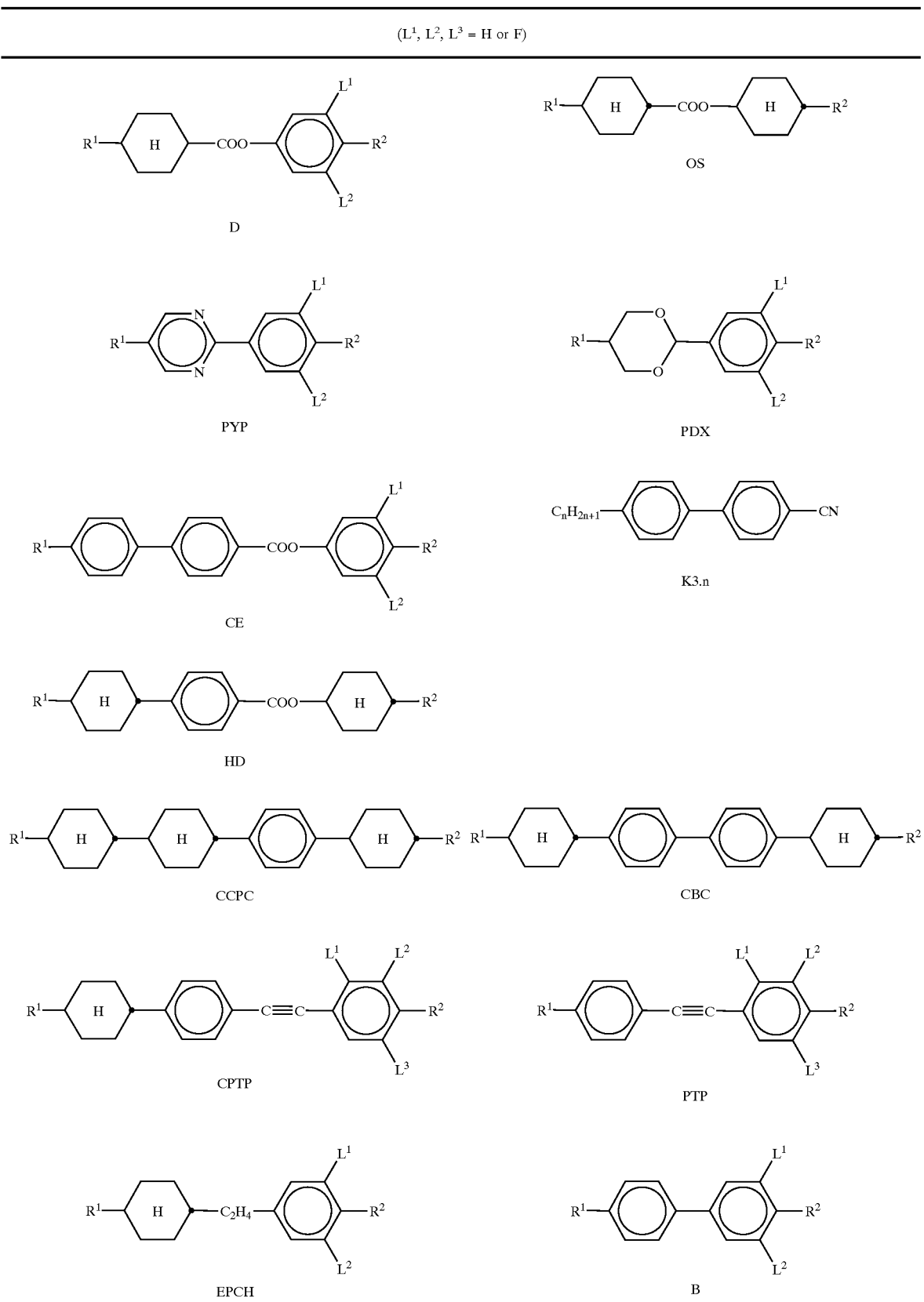

TABLE A-continued
($L^1, L^2, L^3$ = H or F)
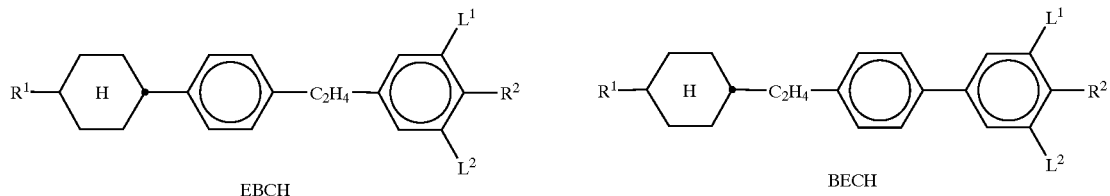
EBCH    BECH
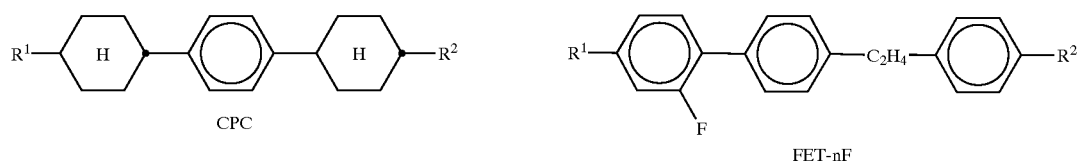
CPC    FET-nF
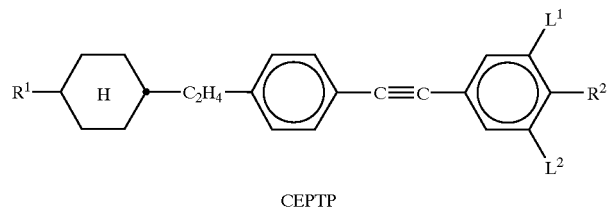
CEPTP
TABLE B
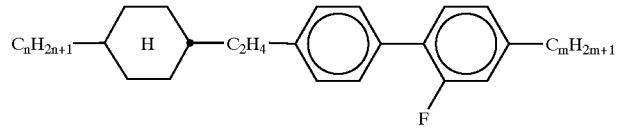
Inm
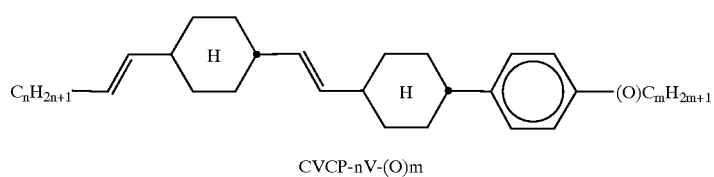
CVCP-nV-(O)m
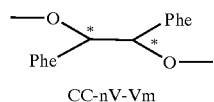
CC-nV-Vm
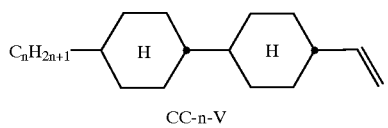
CC-n-V
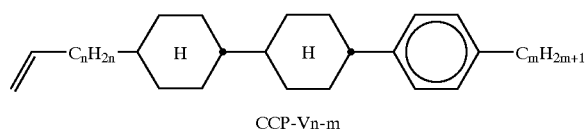
CCP-Vn-m TABLE B-continued
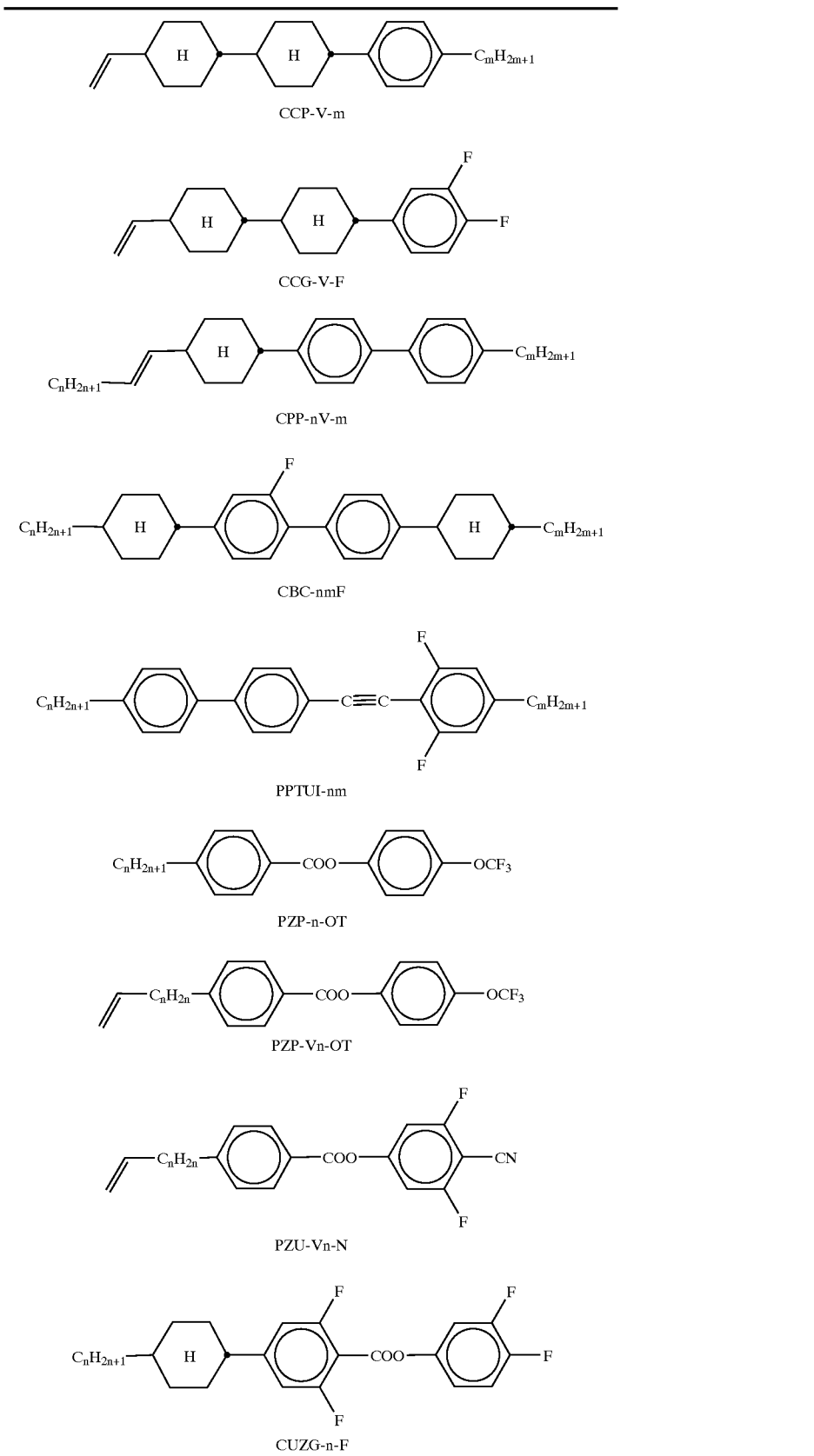

TABLE B-continued
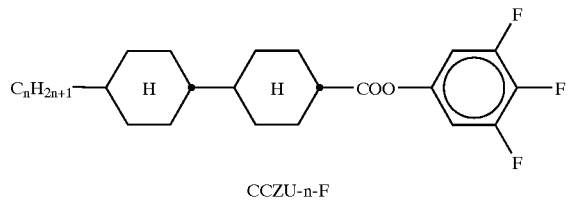
CCZU-n-F
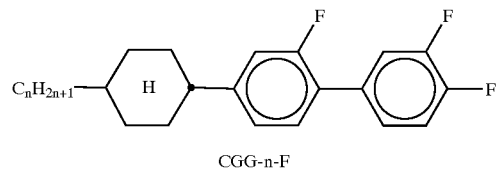
CGG-n-F
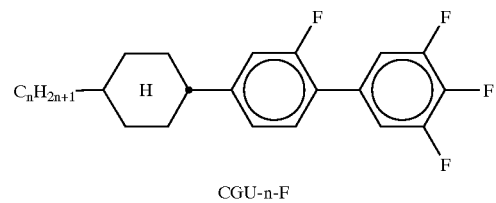
CGU-n-F
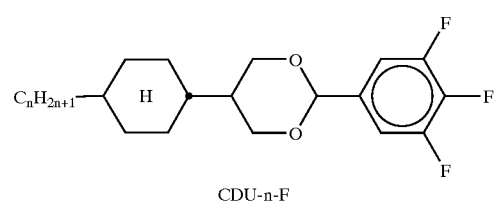
CDU-n-F
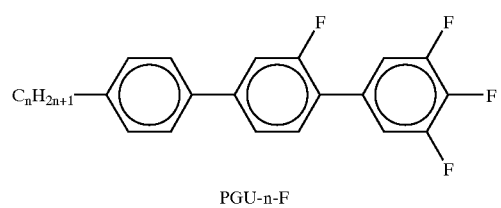
PGU-n-F
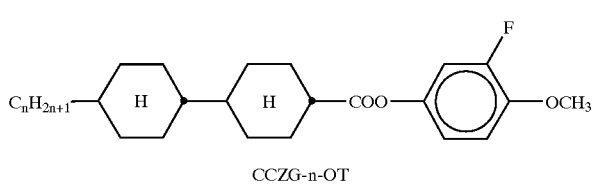
CCZG-n-OT
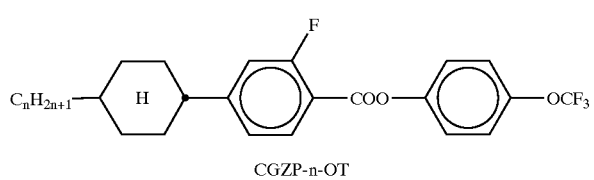
CGZP-n-OT
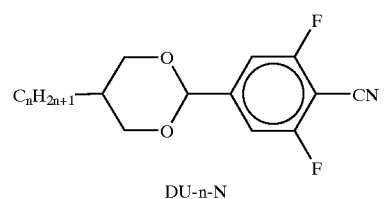
DU-n-N TABLE B-continued
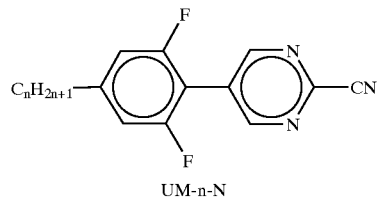
UM-n-N
TABLE C
(dopants):
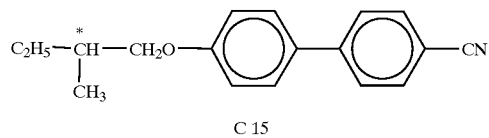
C 15
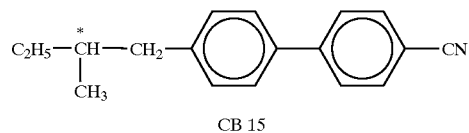
CB 15
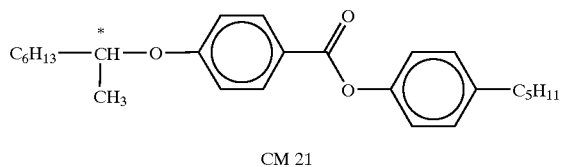
CM 21
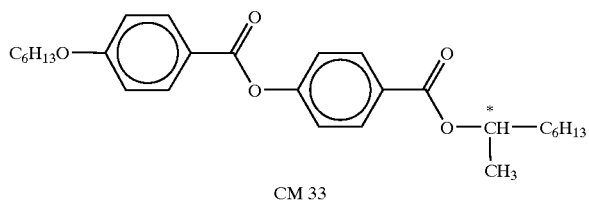
CM 33
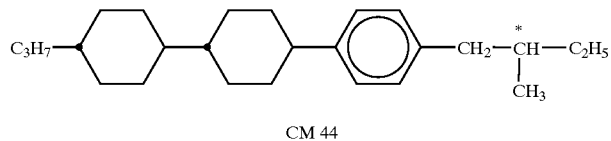
CM 44
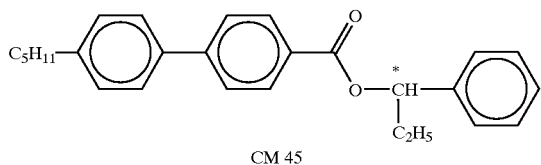
CM 45

TABLE C-continued
(dopants):
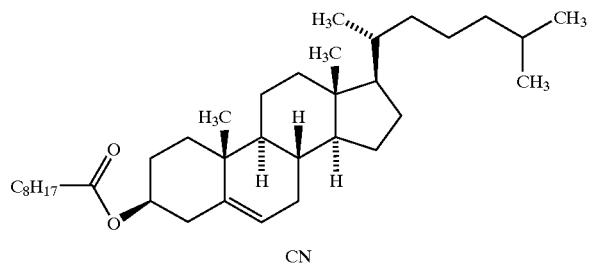
CN
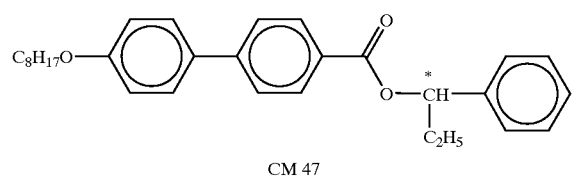
CM 47
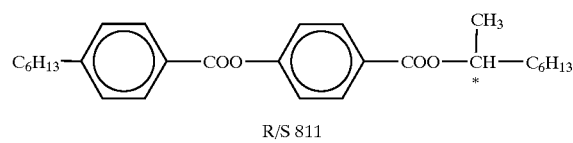
R/S 811
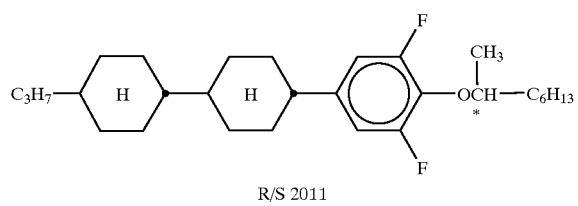
R/S 2011
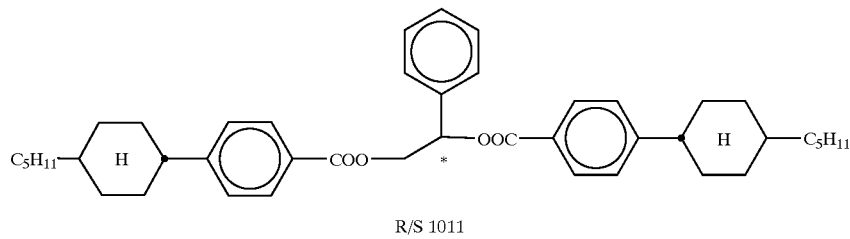
R/S 1011
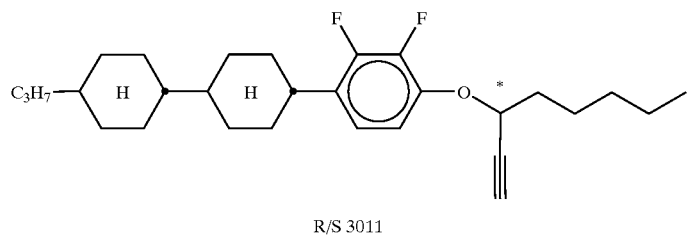
R/S 3011

TABLE D
Suitable stabilizers and antioxidants for liquid-crystalline mixtures are mentioned below
(n = 0–10, terminal methyl groups are not shown):
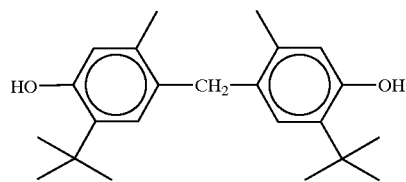
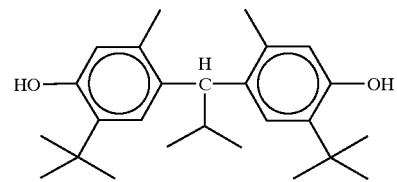
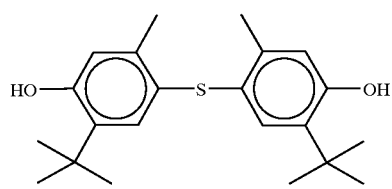
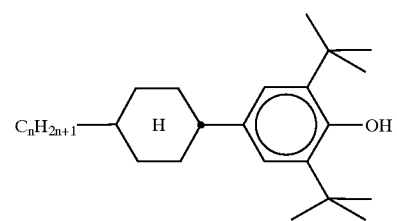
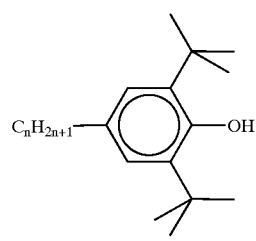
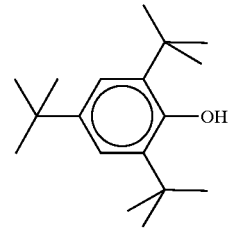
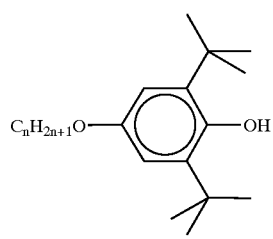
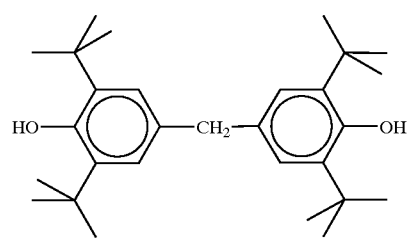
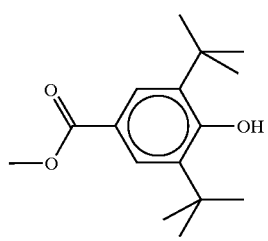
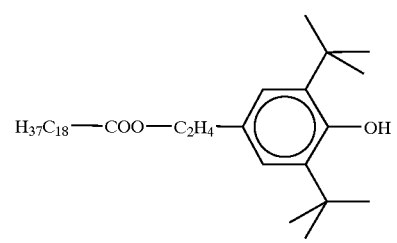

TABLE D-continued
Suitable stabilizers and antioxidants for liquid-crystalline mixtures are mentioned below
(n = 0–10, terminal methyl groups are not shown):
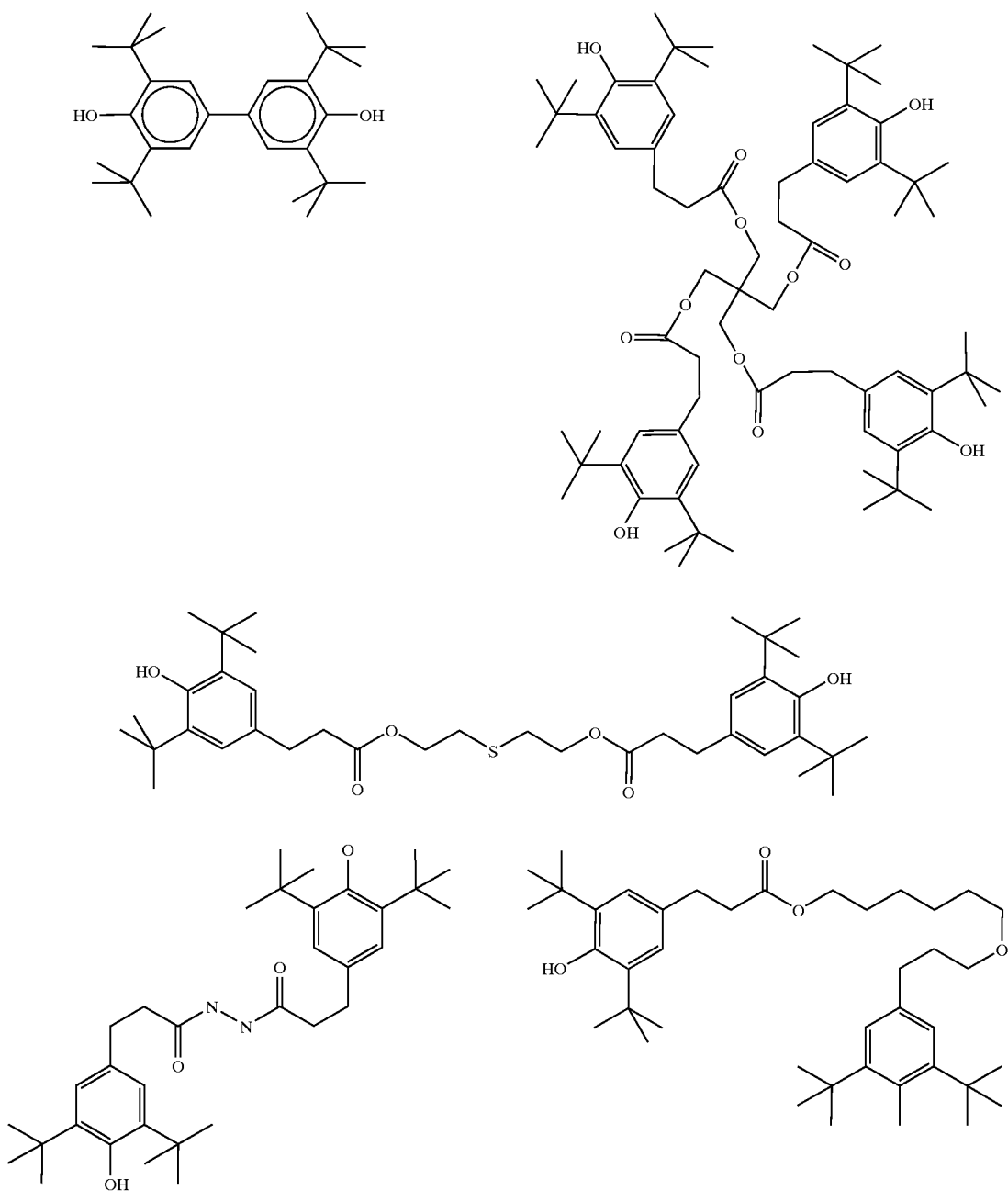

TABLE D-continued
Suitable stabilizers and antioxidants for liquid-crystalline mixtures are mentioned below
(n = 0–10, terminal methyl groups are not shown):
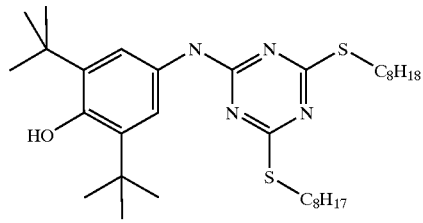
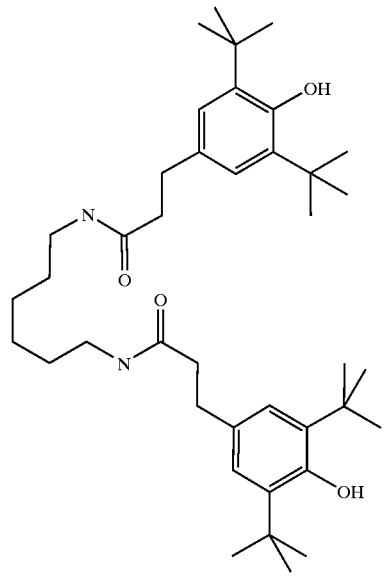
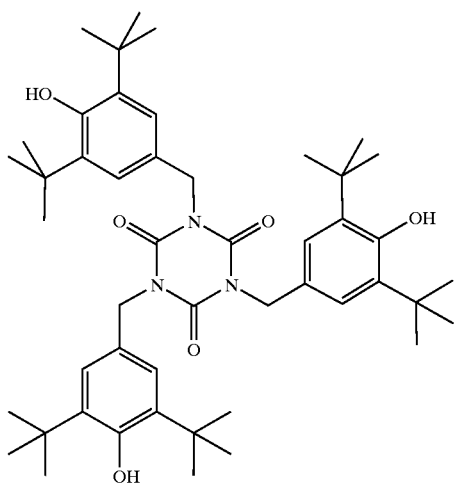
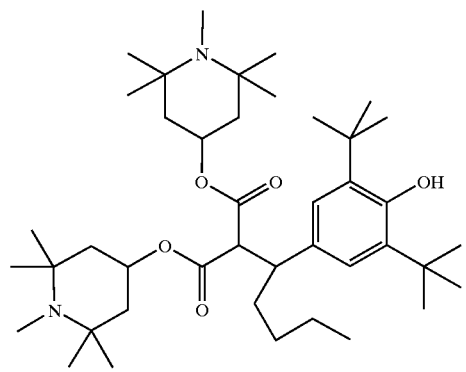
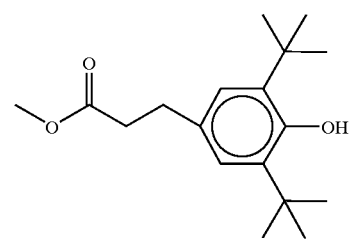
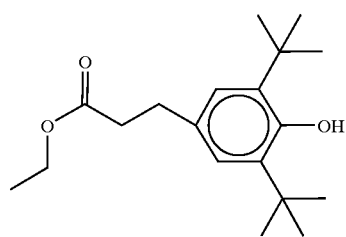
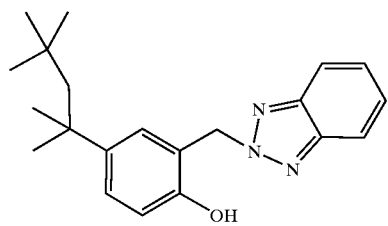
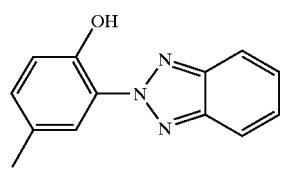

TABLE D-continued
Suitable stabilizers and antioxidants for liquid-crystalline mixtures are mentioned below
(n = 0–10, terminal methyl groups are not shown):
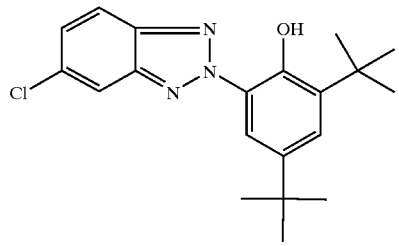
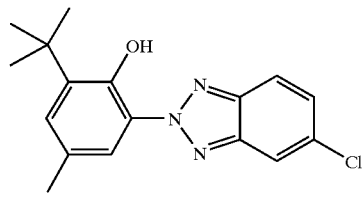
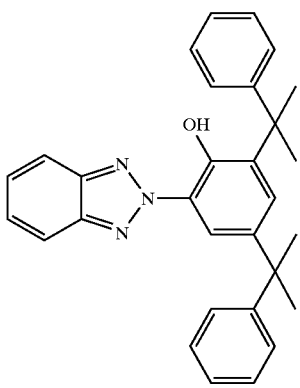
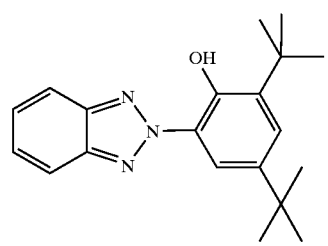
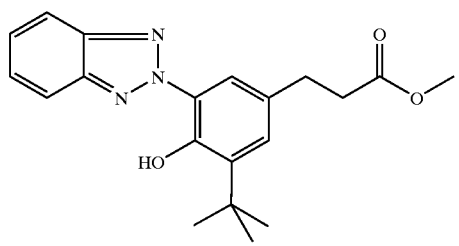
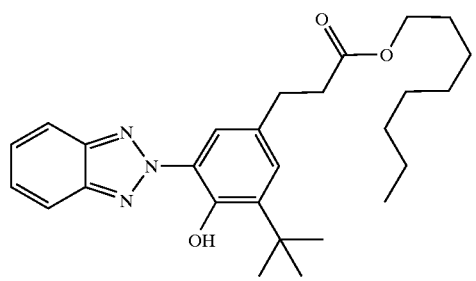
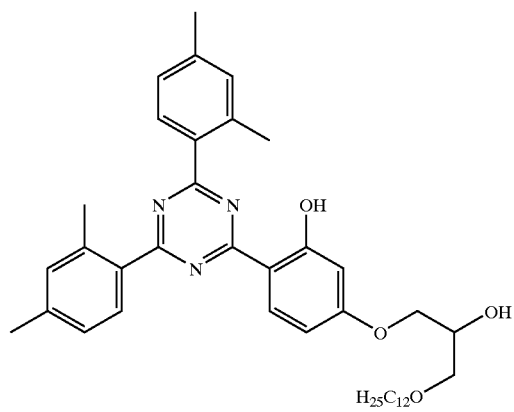
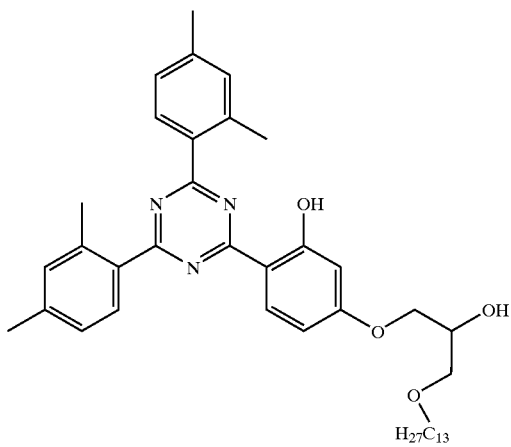

TABLE D-continued

Suitable stabilizers and antioxidants for liquid-crystalline mixtures are mentioned below
(n = 0–10, terminal methyl groups are not shown):

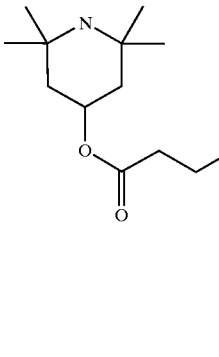

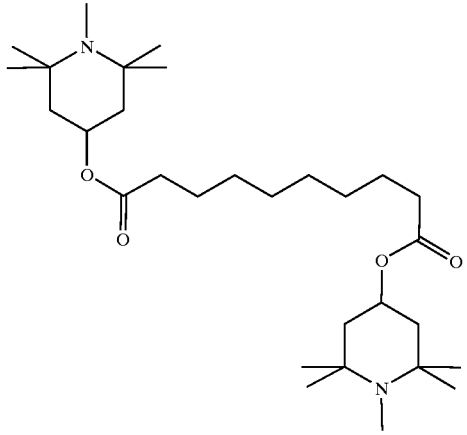

The entire disclosure[s] of all applications, patents and publications, cited herein and of corresponding German application No. 10235558.4, filed Aug. 3, 2002 is incorporated by reference herein.

EXAMPLES

The following examples are intended to explain the invention without limiting it.

Above and below, percentages are per cent by weight. All temperatures are given in degrees Celsius. m.p. denotes melting point, cl.p.=clearing point. Furthermore, C=crystalline state, S=smectic phase, N=nematic phase, Ch=cholesteric phase and I=isotropic phase. The data between these symbols represent the transition temperatures.

Furthermore, the following abbreviations are used:

Δn optical anisotropy at 589 nm and 20° C.

$n_e$ extraordinary refractive index at 589 nm and 20° C.

Δ∈ dielectric anisotropy at 20° C.

∈|| dielectric constant parallel to the longitudinal molecular axes $γ_1$ rotational viscosity [mPa·sec], at 20° C. unless indicated otherwise λ reflective wavelength [nm], at 20° C. unless indicative otherwise Δλ maximum variation of the reflection wavelength [nm] in the temperature range indicated, between −20° C. and +70° C. unless indicated otherwise The helical twisting power HTP of a chiral compound which produces a helically twisted superstructure in a liquid-crystalline mixture is given by the equation HTP=(p*c)$^{-1}$ [μm$^{-1}$], in which p denotes the helix pitch of the helically twisted phase in μm and c denotes the concentration of the chiral compound (a value of 0.01 for c corresponds, for example, to a concentration of 1% by weight). Unless stated otherwise, HTP values above and below relate to a temperature of 20° C. and the commercially available neutral nematic TN host mixture MLC-6260 (Merck KGaA, Darmstadt).

Example 1

A cholesteric mixture comprises 97.53% of a nematic component A consisting of

| PCH-3N.F.F | 13.0 | % | cl.p. | 89.5 |
|---|---|---|---|---|
| ME2N.F | 10.0 | % | Δn | 0.1293 |
| ME3N.F | 10.0 | % | $n_e$ | 1.6241 |
| ME4N.F | 13.0 | % | Δ∈ | |
| HP-3N.F | 5.0 | % | | |
| HP-4N.F | 5.0 | % | | |
| HP-5N.F | 5.0 | % | | |
| CCP-2F.F.F | 7.0 | % | | |
| CCP-3F.F.F | 7.0 | % | | |
| CCP-5F.F.F | 6.0 | % | | |
| CCG-V-F | 3.0 | % | | |
| CCPC-33 | 5.5 | % | | |
| CCPC-34 | 5.5 | % | | |
| CCPC-35 | 5.0 | % | | | and 2.47% of a chiral compound of the formula

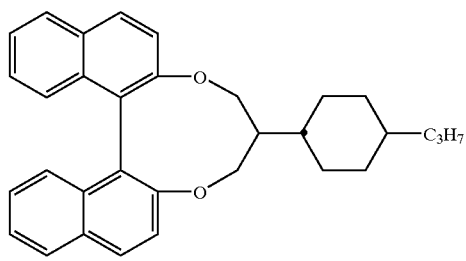

XIIb1a and has a λ of 457 nm and Δλ of 43 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium having a helically twisted structure comprising a nematic component and an optically active component, wherein:

the optically active component comprises one or more chiral compounds whose helical twisting power and concentration are selected in such a way that the helix pitch of the medium is ≦1 μm, and the medium has a birefringence Δn of ≦0.16.

2. A liquid-crystalline medium having a helically twisted structure comprising a nematic component and an optically active component, wherein:

the optically active component comprises one or more chiral compounds whose helical twisting power and concentration are selected in such a way that the helix pitch of the medium is ≦1 μm, and the nematic component comprises one or more compounds of the formula I:

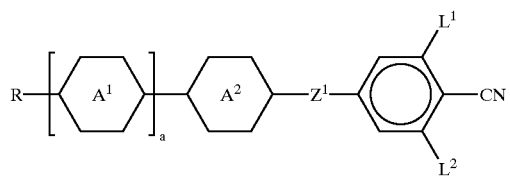

I and one or more compounds of the formula II:

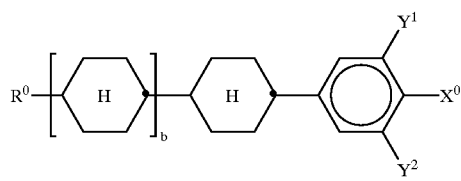

II in which

R and $R^0$ are each, independently of one another, H or an alkyl or alkenyl radical having from 1 to 15 carbon atoms which is unsubstituted, monosubstituted by CN or $CF_3$ or at least monosubstituted by halogen, where one or more $CH_2$ groups in these radicals are optionally, independently of one another, replaced by —O—, —S—,

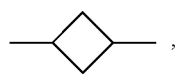

—CO—, —CO—O—, —O—CO—, —O—CO—O— or —C≡C— in such a way that O atoms are not linked directly to one another,

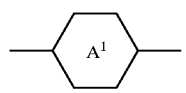

are each, independently of one another,

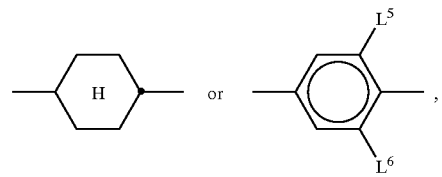

$L^1$, $L^2$, $L^5$ and $L^6$ are each, independently of one another, H or F, $Z^1$ is —COO— or, if at least one of the radicals $A^1$ and $A^2$ is trans-1,4-cyclohexylene, is alternatively —$CH_2CH_2$— or a single bond, $Y^1$ and $Y^2$ are each, independently of one another, H or F, $X^0$ is F, Cl, CN, halogenated alkyl, alkenyl or alkoxy having from 1 to 6 carbon atoms, and a and b are each, independently of one another, 0 or 1.

3. A medium according to claim 2, which additionally comprises one or more alkenyl compounds selected from the following formulae:

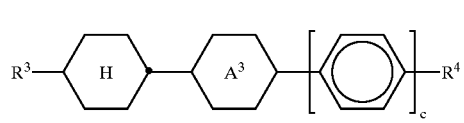

III1

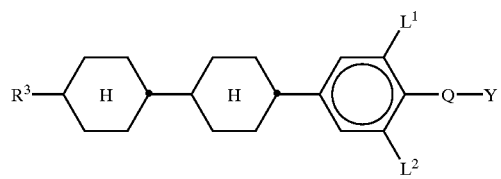

III2 in which $A^3$ is 1,4-phenylene or trans-1,4-cyclohexylene, c is 0 or 1, $R^3$ is an alkenyl group having from 2 to 7 carbon atoms, $R^4$ is an alkyl, alkoxy or alkenyl group having from 1 to 12 carbon atoms, in which one or two non-adjacent $CH_2$ groups are optionally replaced by —O—, —CH=CH—, —C≡C—, —CO—, —OCO— or —COO— in such a way that O atoms are not linked directly to one another, Q is $CF_2$, $OCF_2$, CFH, OCFH or a single bond, Y is F or Cl, and $L^1$ and $L^2$ are each, independently of one another, H or F, provided that when the compound is of formula III2, it is different from the compound of formula II in the medium.

4. A medium according to claim 2, which additionally comprises one or more compounds selected from the following formulae:

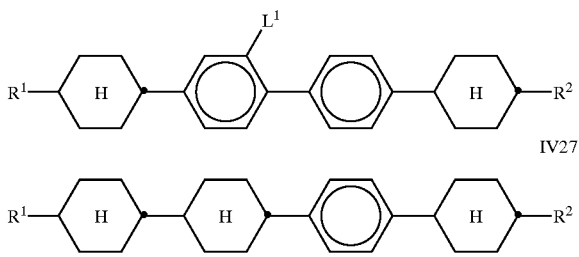

IV25

IV27 in which $R^1$ and $R^2$ have one of the meanings indicated for R in the formula I, and $L^1$ is H or F.

5. A medium according to claim 3, which additionally comprises one or more compounds selected from the following formulae:

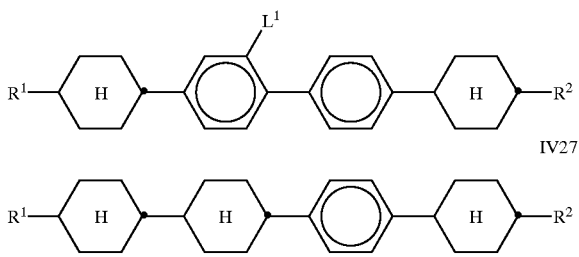

IV25

IV27 in which $R^1$ and $R^2$ have one of the meanings indicated for R in the formula I, and $L^1$ is H or F.

6. A medium according to claim 2, wherein the proportion of compounds of the formula I in the mixture as a whole is from 7 to 80% by weight.

7. A medium according to claim 2, wherein the proportion of compounds of the formula II in the mixture as a whole is from 5 to 50% by weight.

8. A medium according to claim 2, wherein the proportion of the optically active component is from 0.01 to 7%.

9. A medium according to claim 2, wherein the medium has a reflection wavelength in the range from 400 to 800 nm.

10. A medium according to claim 2, wherein the medium has a birefringence Δn of ≦0.16.

11. An electro-optical liquid-crystal display containing a liquid-crystalline medium according claim 1.

12. An electro-optical liquid-crystal display containing a liquid-crystalline medium according claim 2.

13. An electro-optical liquid-crystal display according to claim 11, which display is a cholesteric, SSCT, PSCT or flexoelectric display.

14. An electro-optical liquid-crystal display according to claim 12, which display is a cholesteric, SSCT, PSCT or flexoelectric display.

15. An electro-optical liquid-crystal display according to claim 11, wherein the display has a layer thickness of the liquid crystal cell, d, and the medium has a helix pitch, p, such that the ratio d/p is from 2 to 20.

16. An electro-optical liquid-crystal display according to claim 12, wherein the display has a layer thickness of the liquid crystal cell, d, and the medium has a helix pitch, p, such that the ratio d/p is from 2 to 20.

17. A medium according to claim 1, wherein the helix pitch of the medium is from 200 nm to 750 nm.

18. A medium according to claim 2, wherein the helix pitch of the medium is from 200 nm to 750 nm.

19. A medium according to claim 1, wherein the optically active component exhibits a helical twisting power of 20 $\mu m^{-1}$ or more.

20. A medium according to claim 2, wherein the optically active component exhibits a helical twisting power of 20 $\mu m^{-1}$ or more.

21. A medium according to claim 1, wherein the optically active component includes at least one compound of the following:

cholesteryl nonanoate, compounds of the formulae VII to IX:

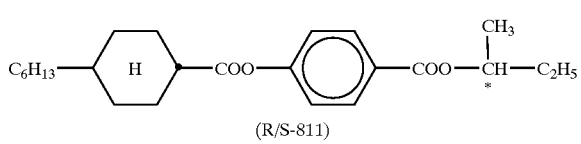

(R/S-811)

VII

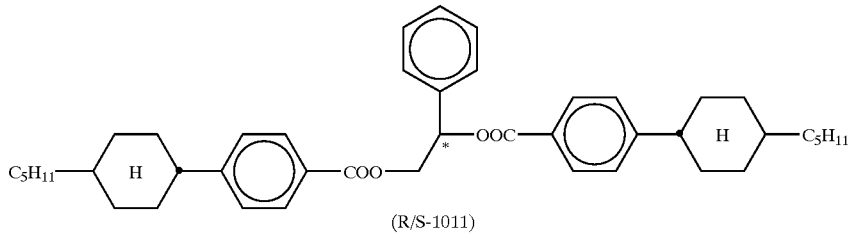

(R/S-1011)

VIII

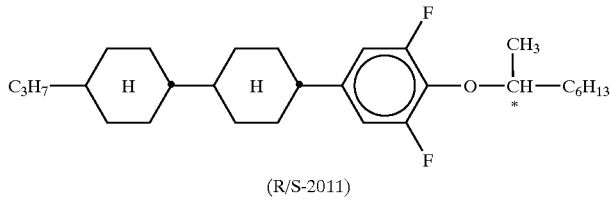

(R/S-2011)

compounds of the formula X:

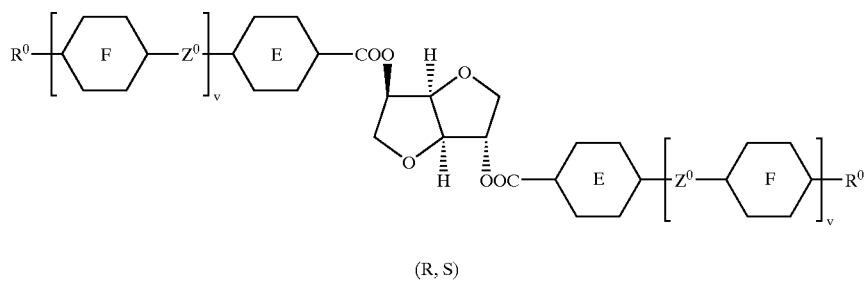

(R, S)

compounds of the formula XI:

X$^{11}$ and X$^{22}$ are each, independently of one another, —CF$_2$O—, —OCF$_2$—, —CF$_2$S—, —SCF$_2$—, —CF$_2$CH$_2$—, —CH$_2$CF$_2$—, —CF$_2$CF$_2$—, —CF=CH—, —CH=CF—, —CF=CF— or a single bond, Z$^{11}$ is in each case, independently of one another, —O—, —S—, —CO—, —COO—, —OCO—, —O—COO—, —CO—N(R$^{00}$)—, —N(R$^{00}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH— or a single bond, R$^{00}$ is H or alkyl having from 1 to 4 carbon atoms, A$^{11}$ and A$^{22}$ are each, independently of one another: 1,4-phenylene, in which, in addition, one or more CH groups are optionally replaced by N; 1,4-cyclohexylene, in which one or two non-adjacent CH$_2$ groups are optionally replaced by O and/or S; 1,3-dioxolane-4,5-diyl; cyclohexenylene; bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl, where all of these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms are optionally replaced by F or Cl, and m is 1, 2, 3, 4 or 5, provided that at least one of the radicals X$^{11}$, X$^{22}$ and Z$^{11}$ is —CF$_2$O—, —OCF$_2$—, —CF$_2$S—, —SCF$_2$—, —CF$_2$CH$_2$—, —CF$_2$CF$_2$—, —CF=CH— or —CF=CF— and at least one of the radicals R$^{11}$ and R$^{22}$ is a chiral group, compounds of the formula XVI

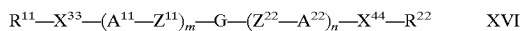

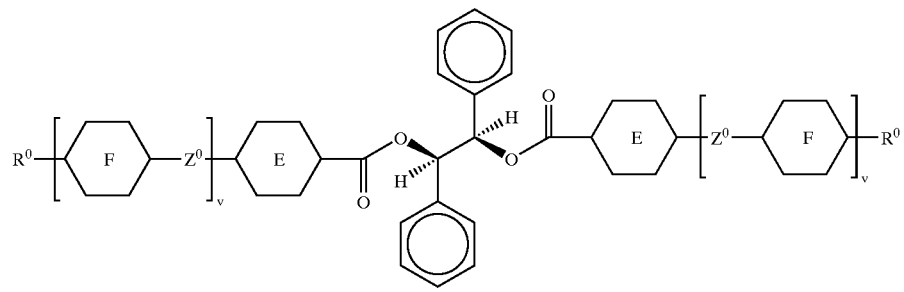

(R, R)

wherein, in formula X and XI,

E and F are each, independently of one another; 1,4-phenylene, which is optionally monosubstituted, disubstituted or trisubstituted by L; or 1,4-cyclohexylene, L is H, F, Cl, CN or optionally halogenated alkyl, alkoxy, alkylcarbonyl, alkoxycarbonyl or alkoxycarbonyloxy having 1–7 carbon atoms, v is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1–12 carbon atoms, compounds of the formula XII:

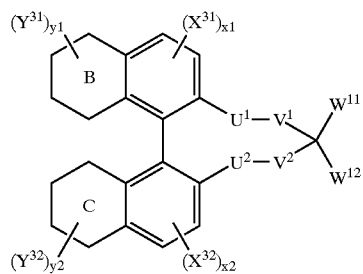

XII in which:

$X^{31}$, $X^{32}$, $Y^{31}$ and $Y^{32}$ are each, independently of one another: H; F; Cl; Br; I; CN; SCN; SF$_5$; straight-chain or branched alkyl having up to 25 carbon atoms, unsubstituted or monosubstituted or polysubstituted by F, Cl, Br, I or CN, and in which one or more non-adjacent CH$_2$ group, independently of one another, are optionally replaced by —O—, —S—, —NH—, —NR$^{00}$, —CO—, —COO—, —OCO—, —OCO—O—, —S—CO—, —CO—S—, —CH=CH— or —C≡C— in such a way that O and/or S atoms are not linked directly to one another; a polymerizable group; cycloalkyl or aryl having up to 20 carbon atoms, which are optionally monosubstituted or polysubstituted by L or a polymerizable group, $R^{00}$ is H or alkyl having from 1 to 4 carbon atoms, x1 and x2 are each, independently of one another, 0, 1 or 2, y1 and y2 are each, independently of one another, 0, 1, 2, 3 or 4, B and C are each, independently of one another, an aromatic or partially or fully saturated aliphatic six-membered ring, in which one or more CH groups are optionally replaced by N and one or more CH$_2$ groups are optionally replaced by O and/or S, one of the radicals $W^{11}$ and $W^{22}$ is —$Z^{11}$—$A^{11}$—($Z^{22}$—$A^{22}$)$_m$—$R^{31}$ and the other is $R^{32}$ or $A^{33}$, or both radicals $W^{11}$ and $W^{22}$ are —$Z^{11}$—$A^{11}$—($Z^{22}$—$A^{22}$)$_m$—$R^{31}$, where $W^1$ and $W^2$ are not simultaneously H, or

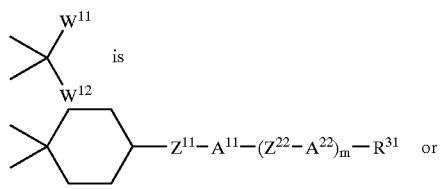

or

$U^1$ and $U^2$ are each, independently of one another, CH$_2$, O, S, CO or CS, $V^1$ and $V^2$ are each, independently of one another, (CH$_2$)$_n$, in which up to four non-adjacent CH$_2$ groups are optionally replaced by O and/or S, and one of the radicals $V^1$ and $V^2$ or, if

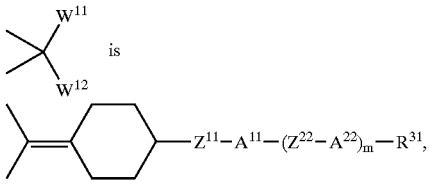

one or both radicals $V^1$ and $V^2$ are alternatively a single bond, n is an integer from 1 to 7, $Z^{11}$ and $Z^{22}$ are each, independently of one another, —O—, —S—, —CO—, —COO—, —OCO—, —O—COO—, —CO—NR$^{00}$—, —NR$^{00}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CH=N—, —N=CH—, —N=N—, —CF=CH—, —CH=CF—, —CF=CF—, —C≡C—, —CH=CH—COO—, —OCO—CH=CH— or a single bond, $A^{11}$, $A^{22}$ and $A^{33}$ are each, independently of one another: 1,4-phenylene, in which, in addition, one or more CH groups are optionally replaced by N; 1,4-cyclohexylene, in which, one or more non-adjacent CH$_2$ groups are optionally replaced by O and/or S; 1,3-dioxolane-4,5-diyl; 1,4-cyclohexenylene; 1,4-bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl; where all these groups are unsubstituted or monosubstituted or polysubstituted by L, and $A^{11}$ is alternatively a single bond, L is halogen, CN, NO$_2$ or an alkyl, alkoxy, alkylcarbonyl or alkoxycarbonyl group having from 1 to 7 carbon atoms, in which one or more H atoms are optionally replaced by F or Cl, m is in each case, independently of one another, 0, 1, 2 or 3, and $R^{31}$ and $R^{32}$ are each, independently of one another: H; F; Cl; Br; I; CN; SCN; OH; SF$_5$; straight-chain or branched alkyl having up to 25 carbon atoms, which is unsubstituted or monosubstituted or polysubstituted by F, Cl, Br, I or CN, and in which, one or more non-adjacent CH$_2$ groups, each independently of one another, are optionally replaced by —O—, —S—, —NH—, —NR$^{00}$—, —CO—, —COO—, —OCO—, —OCO—O—, —S—CO—, —CO—S—, —CH=CH— or —C≡C— in such a way that O and/or S atoms are not linked directly to one another; or a polymerizable group, compounds of the formula XIII:

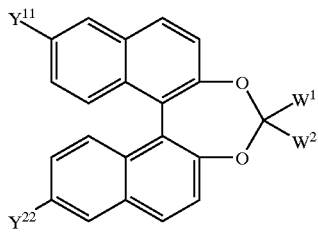

XIII in which:
$Y^{11}$ and $Y^{22}$ are each, independently of one another: H; F; Cl; Br; I; CN; SCN; $SF_5$; a chiral or achiral alkyl having up to 30 carbon atoms, which is optionally unsubstituted or monosubstituted or polysubstituted by F, Cl, Br, I or CN, and in which one or more non-adjacent $CH_2$ groups are each, independently of one another, optionally replaced by —O—, —S—, —NH—, —N($CH_3$)—, —CO—, —COO—, —OCO—, —OCO—O—, —S—CO—, —CO—S—, —CH=CH— or —C≡C— in such a way that O atoms are not linked directly to one another; or a polymerizable group,
one of the radicals $W^1$ and $W^2$ is —$Z^{11}$—$A^{11}$—($Z^{22}$—$A^{22}$)$_m$—$R^{11}$ and the other is H, $R^{22}$ or $A^{33}$, or both radicals $W^1$ and $W^2$ are —$Z^1$—$A^1$—($Z^2$—$A^2$)$_m$R, where $W^1$ and $W^2$ are not simultaneously H, or

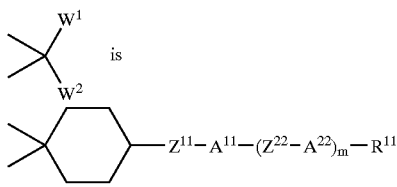 is $Z^{11}$ and $Z^{22}$ are each, independently of one another, —O—, —S—, —CO—, —COO—, —OCO—, —O—COO—, —CO—N($R^{00}$)—, —N($R^{00}$)—CO—, —O$CH_2$—, —$CH_2$O—, —S$CH_2$—, —$CH_2$S—, —$CF_2$O—, —O$CF_2$—, —$CF_2$S—, —S$CF_2$—, —$CH_2CH_2$—, —$CF_2CH_2$—, —$CH_2CF_2$—, —$CF_2CF_2$—, —CH=CH—, —CH=N—, —N=CH—, —N=N—, —CF=CH—, —CH=CF—, —CF=CF—, —C≡C—, —CH=CH—COO—, —OCO—CH=CH— or a single bond,
$R^{00}$ is H or alkyl having from 1 to 4 carbon atoms,
$A^{11}$, $A^{22}$ and $A^{33}$ are each, independently of one another: 1,4-phenylene, in which, one or more CH groups are optionally replaced by N; 1,4-cyclohexylene, in which one or more non-adjacent $CH_2$ groups are optionally replaced by O and/or S; 1,3-dioxolane-4,5-diyl; 1,4-cyclohexenylene; 1,4-bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl, where all these groups are unsubstituted or monosubstituted or polysubstituted by halogen, CN or $NO_2$ or alkyl, alkoxy, alkylcarbonyl or alkoxycarbonyl having from 1 to 7 carbon atoms, in which one or more H atoms are optionally replaced by F or Cl, and $A^{11}$ is alternatively a single bond,
m is 0, 1, 2 or 3, and $R^{11}$ and $R^{22}$ are each, independently of one another, as defined for $Y^{11}$,
compounds of formula XIV:

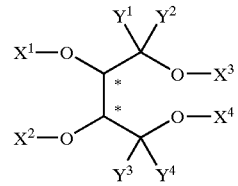

XIV in which
$X^1$ and $X^2$ are H, or together form a bivalent radical selected from the group consisting of —$CH_2$—, —$CHR^{11}$—, —$CR^{11}_2$—, —$SiR^{11}_2$— and 1,1-cycloalkylidene,
$X^3$ and $X^4$ have one of the meanings indicated for $X^1$ and $X^2$,
$Y^1$, $Y^2$, $Y^3$ and $Y^4$ may be identical or different and are each, independently of one another, $R^{11}$, A or M—$R^{22}$,
A is a cyclic group,
M is a mesogenic group, and
$R^{11}$ and $R^{22}$ are each, independently of one another: H; F; Cl; Br; CN; SCN; $SF_5$; a chiral or achiral alkyl having up to 30 carbon atoms, which is unsubstituted or monosubstituted or polysubstituted by F, Cl, Br, or CN, and in which one or more non-adjacent $CH_2$ groups are each, independently of one another, optionally replaced by —O—, —S—, —NH—, —N($CH_3$)—, —CO—, —COO—, —OCO—, —OCO—O—, —S—CO—, —CO—S—, —CH=CH— or —C≡C— in such a way that O atoms are not linked directly to one another; or are a polymerizable group,
where at least one of the radicals $Y^1$, $Y^2$, $Y^3$ and $Y^4$ is M—$R^{22}$,
compounds of the formula XV:

$$R^{11}-X^{11}-A^{11}-(Z^{11}-A^{22})_m-X^{22}-R^{22} \qquad XV$$

in which
$R^{11}$ and $R^{22}$ are each, independently of one another: H; F; Cl; Br; CN; SCN; $SF_5$; a chiral or achiral alkyl having up to 30 carbon atoms, which is unsubstituted or monosubstituted or polysubstituted by F, Cl, Br, I or CN, and in which one or more non-adjacent $CH_2$ groups are each, independently of one another, optionally replaced by —O—, —S—, —NH—, —N($CH_3$)—, —CO—, —COO—, —OCO—, —OCO—O—, —S—CO—, —CO—S—, —CH=CH— or —C≡C— in such a way that O atoms are not linked directly to one another; a chiral radical containing one or more aromatic or aliphatic ring groups, which optionally contains fused or spiro-linked rings and one or more heteroatoms; or a polymerizable group,
$X^{11}$ and $X^{22}$ are each, independently of one another, —$CF_2$O—, —O$CF_2$—, —$CF_2$S—, —S$CF_2$—, —$CF_2CH_2$—, —$CH_2CF_2$—, —$CF_2CF_2$—, —CF=CH—, —CH=CF—, —CF=CF— or a single bond,
$Z^{11}$ is in each case, independently of one another, —O—, —S—, —CO—, —COO—, —OCO—, —O—COO—, —CO—N($R^{00}$)—, —N($R^{00}$)—CO—, —O$CH_2$—, —$CH_2$O—, —S$CH_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH— or a single bond, $R^{00}$ is H or alkyl having from 1 to 4 carbon atoms, $A^{11}$ and $A^{22}$ are each, independently of one another: 1,4-phenylene, in which, in addition, one or more CH groups are optionally replaced by N; 1,4-cyclohexylene, in which one or two non-adjacent CH$_2$ groups are optionally replaced by O and/or S; 1,3-dioxolane-4,5-diyl; cyclohexenylene; bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl where all of these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms are optionally replaced by F or Cl, and m is 1, 2, 3, 4 or 5, provided that at least one of the radicals $X^{11}$, $X^{22}$ and $Z^{11}$ is —CF$_2$O—, —OCF$_2$—, —CF$_2$S—, —SCF$_2$—, —CF$_2$CH$_2$—, —CF$_2$CF$_2$—, —CF=CH— or —CF=CF— and at least one of the radicals $R^{11}$ and $R^{22}$ is a chiral group, compounds of the formula XVI:

$$R^{11}-X^{33}-(A^{11}-Z^{11})_m-G-(Z^{22}-A^{22})_n-X^{44}-R^{22} \quad \text{XVI}$$

in which $R^{11}$ and $R^{22}$ are each, independently of one another: H; F; Cl; Br; CN; SCN; SF$_5$; or a chiral or achiral alkyl having up to 30 carbon atoms, which is unsubstituted or monosubstituted or polysubstituted by F, Cl, Br, I or CN, and in which one or more non-adjacent CH$_2$ groups are each, independently of one another, optionally replaced by —O—, —S—, —NH—, —N(CH$_3$)—, —CO—, —COO—, —OCO—, —OCO—O—, —S—CO—, —CO—S—, —CH=CH— or —C≡C— in such a way that O atoms are not linked directly to one another; or a polymerizable group, $X^{33}$, $X^{44}$, $Z^{11}$ and $Z^{22}$ are each, independently of one another, —O—, —S—, —CO—, —COO—, —OCO—, —O—COO—, —CO—N($R^{00}$)—, —N($R^{00}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CF=CH—, —CH=CF—, —CF=CF—, —C≡C—, —CH=CH—COO—, —OCO—CH=CH— or a single bond, $R^{00}$ is H or alkyl having from 1 to 4 carbon atoms, $A^{11}$ and $A^{22}$ are each, independently of one another: 1,4-phenylene, in which one or more CH groups are optionally replaced by N; 1,4-cyclohexylene, in which one or two non-adjacent CH$_2$ groups are optionally replaced by O and/or S; 1,3-dioxolane-4,5-diyl; cyclohexenylene; bicyclo[2.2.2]octylene; piperidine-1,4-diyl; naphthalene-2,6-diyl; decahydronaphthalene-2,6-diyl; or 1,2,3,4-tetrahydronaphthalen-2,6-diyl; where all these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms are optionally replaced by F or Cl, m and n are each, independently of one another, 1, 2, 3 or 4, and G is a bivalent chiral group, in which at least one of the radicals $X^{33}$, $X^{44}$, $Z^{11}$ and $Z^{22}$ is —CF$_2$O—, —OCF$_2$—, —CF$_2$S—, —SCF$_2$—, —CF$_2$CH$_2$—, —CF$_2$CF$_2$—, —CF=CH— or —CF=CF—.

22. A medium according to claim 2, wherein the optically active component includes at least one compound of the following:

cholesteryl nonanoate, compounds of the formulae VII to IX:

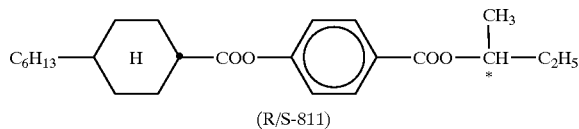

(R/S-811)

VII

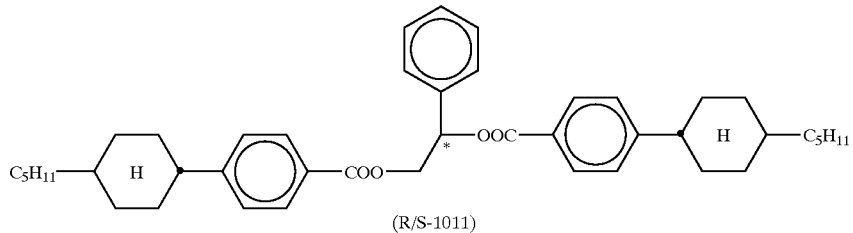

(R/S-1011)

VIII

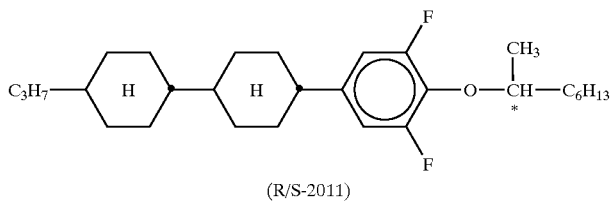

(R/S-2011)

compounds of the formula X:

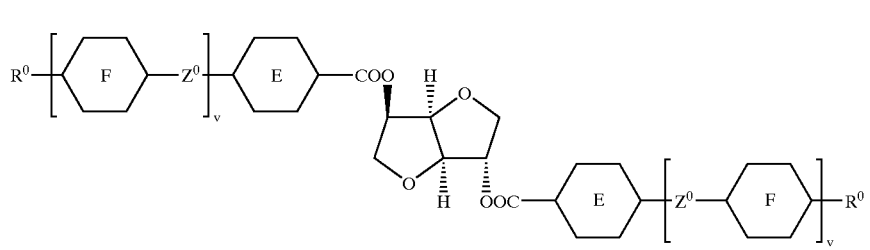

(R, S)

compounds of the formula XI:

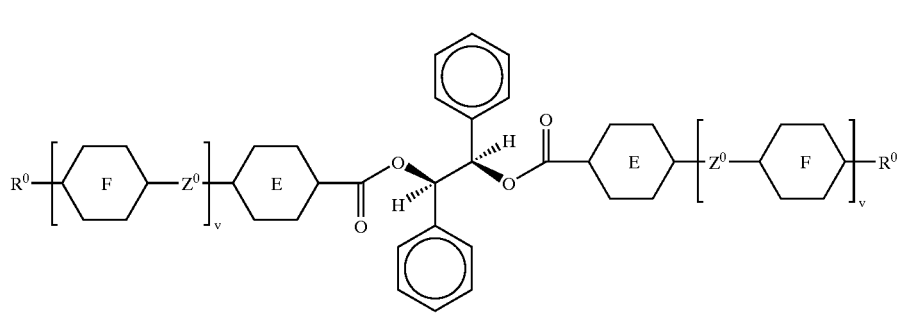

(R, R)

wherein, in formula X and XI,

E and F are each, independently of one another; 1,4-phenylene, which is optionally monosubstituted, disubstituted or trisubstituted by L; or 1,4-cyclohexylene, L is H, F, Cl, CN or optionally halogenated alkyl, alkoxy, alkylcarbonyl, alkoxycarbonyl or alkoxycarbonyloxy having 1–7 carbon atoms, v is 0 or 1, $Z^0$ is —COO—, —OCO—, —CH$_2$CH$_2$— or a single bond, and $R^0$ is alkyl, alkoxy, alkylcarbonyl, alkoxycarbonyl or alkylcarbonyloxy having 1–12 carbon atoms, compounds of the formula XII:

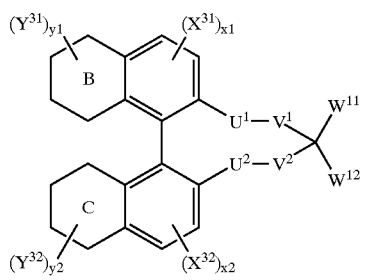

in which:

$X^{31}$, $X^{32}$, $Y^{31}$ and $Y^{32}$ are each, independently of one another: H; F; Cl; Br; I; CN; SCN; SF$_5$; straight-chain or branched alkyl having up to 25 carbon atoms, optionally unsubstituted or monosubstituted or polysubstituted by F, Cl, Br, I or CN, and in which one or more non-adjacent CH$_2$ group, independently of one another, are optionally replaced by —O—, —S—, —NH—, —NR$^{00}$—, —CO—, —COO—, —OCO—, —OCO—O—, —S—CO—, —CO—S—, —CH=CH— or —C≡C— in such a way that O and/or S atoms are not linked directly to one another; a polymerizable group; cycloalkyl or aryl having up to 20 carbon atoms, which are optionally monosubstituted or polysubstituted by L or a polymerizable group, R$^{00}$ is H or alkyl having from 1 to 4 carbon atoms, x1 and x2 are each, independently of one another, 0, 1 or 2, y1 and y2 are each, independently of one another, 0, 1, 2, 3 or 4, B and C are each, independently of one another, an aromatic or partially or fully saturated aliphatic six-membered ring, in which one or more CH groups are optionally replaced by N and one or more CH$_2$ groups are optionally replaced by O and/or S, one of the radicals W$^{11}$ and W$^{22}$ is —Z$^{11}$—A$^{11}$—(Z$^{22}$—A$^{22}$)$_m$—R$^{31}$ and the other is R$^{32}$ or A$^{33}$, or both radicals W$^{11}$ and W$^{22}$ are —Z$^{11}$—A$^{11}$—(Z$^{22}$—A$^{22}$)$_m$—R$^{31}$, where W$^1$ and W$^2$ are not simultaneously H, or

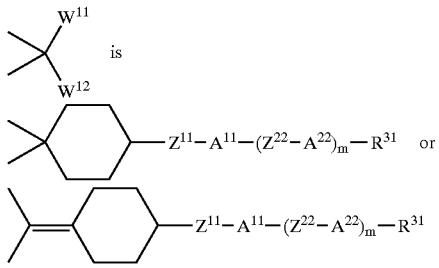

U$^1$ and U$^2$ are each, independently of one another, CH$_2$, O, S, CO, or CS, V$^1$ and V$^2$ are each, independently of one another, (CH$_2$)$_n$, in which up to four non-adjacent CH$_2$ groups are optionally replaced by O and/or S, and one of the radicals V$^1$ and V$^2$ or, if

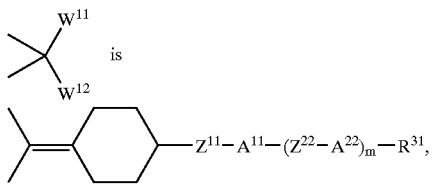

one or both radicals V$^1$ and V$^2$ are alternatively a single bond, n is an integer from 1 to 7, Z$^{11}$ and Z$^{22}$ are each, independently of one another, —O—, —S—, —CO—, —COO—, —OCO—, —O—COO—, —CO—NR$^{00}$, —NR$^{00}$—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH=CH—, —CH=N—, —N=CH—, —N=N—, —CF=CH—, —CH=CF—, —CF=CF—, —C≡C—, —CH=CH—COO—, —OCO—CH=CH— or a single bond, A$^{11}$, A$^{22}$ and A$^{33}$ are each, independently of one another: 1,4-phenylene, in which, in addition, one or more CH groups are optionally replaced by N; 1,4-cyclohexylene, in which, one or more non-adjacent CH$_2$ groups are optionally replaced by O and/or S; 1,3-dioxolane-4,5-diyl; 1,4-cyclohexenylene; 1,4-bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl; where all these groups are unsubstituted or monosubstituted or polysubstituted by L, and A$^{11}$ is alternatively a single bond, L is halogen, CN, NO$_2$ or an alkyl, alkoxy, alkylcarbonyl or alkoxycarbonyl group having from 1 to 7 carbon atoms, in which one or more H atoms are optionally replaced by F or Cl, m is in each case, independently of one another, 0, 1, 2 or 3, and R$^{31}$ and R$^{32}$ are each, independently of one another: H; F; Cl; Br; I; CN; SCN; OH; SF$_5$; straight-chain or branched alkyl having up to 25 carbon atoms, which is unsubstituted or monosubstituted or polysubstituted by F, Cl, Br, I or CN, and in which, one or more non-adjacent CH$_2$ groups, each independently of one another, are optionally replaced by —O—, —S—, —NH—, —NR$^{00}$—, —CO—, —COO—, —OCO—, —OCO—O—, —S—CO—, —CO—S—, —CH=CH— or —C≡C— in such a way that O and/or S atoms are not linked directly to one another; or a polymerizable group, compounds of the formula XIII:

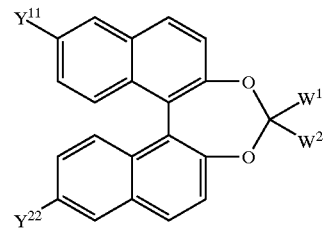

XIII in which:

Y$^{11}$ and Y$^{22}$ are each, independently of one another: H; F; Cl; Br; I; CN; SCN; SF$_5$; a chiral or achiral alkyl having up to 30 carbon atoms, which is unsubstituted or monosubstituted or polysubstituted by F, Cl, Br, I or CN, and in which one or more non-adjacent CH$_2$ groups are each, independently of one another, optionally replaced by —O—, —S—, —NH—, —N(CH$_3$)—, —CO—, —COO—, —OCO—, —OCO—O—, —S—CO—, —CO—S—, —CH=CH— or —C≡C— in such a way that O atoms are not linked directly to one another; or a polymerizable group, one of the radicals W$^1$ and W$^2$ is —Z$^{11}$—A$^{11}$—(Z$^{22}$—A$^{22}$)$_m$—R$^{11}$ and the other is H, R$^{22}$ or A$^{33}$, or both radicals W$^1$ and W$^2$ are —Z$^1$—A$^1$—(Z$^2$—A$^2$)$_m$—R, where W$^1$ and W$^2$ are not simultaneously H, or

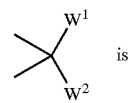

-continued

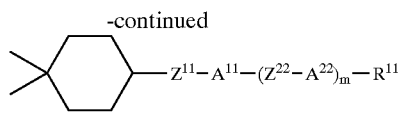

$Z^{11}$ and $Z^{22}$ are each, independently of one another, —O—, —S—, —CO—, —COO—, —OCO—, —O—COO—, —CO—N($R^{00}$)—, —N($R^{00}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═CH—, —CH═N—, —N═CH—, —N═N—, —CF═CH—, —CH═CF—, —CF═CF—, —C≡C—, —CH═CH—COO—, —OCO—CH═CH— or a single bond, $R^{00}$ is H or alkyl having from 1 to 4 carbon atoms, $A^{11}$, $A^{22}$ and $A^{33}$ are each, independently of one another: 1,4-phenylene, in which, one or more CH groups are optionally replaced by N; 1,4-cyclohexylene, in which one or more non-adjacent CH$_2$ groups are optionally replaced by O and/or S; 1,3-dioxolane-4,5-diyl; 1,4-cyclohexenylene; 1,4-bicyclo[2.2.2]octylene; piperidine-1,4-diyl; naphthalene-2,6-diyl; decahydronaphthalene-2,6-diyl; or 1,2,3,4-tetrahydronaphthalene-2,6-diyl, where all these groups are unsubstituted or mono-substituted or polysubstituted by halogen, CN or NO$_2$ or alkyl, alkoxy, alkylcarbonyl or alkoxycarbonyl having from 1 to 7 carbon atoms, in which one or more H atoms are optionally replaced by F or Cl, and $A^{11}$ is alternatively a single bond, m is 0, 1, 2 or 3, and $R^{11}$ and $R^{22}$ are each, independently of one another, as defined for $Y^{11}$, compounds of formula XIV:

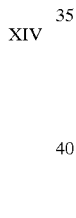 XIV in which $X^1$ and $X^2$ are H, or together form a bivalent radical selected from the group consisting of —CH$_2$—, —CHR$^{11}$—, —CR$^{11}_2$—, —SiR$^{11}_2$— and 1,1-cycloalkylidene, $X^3$ and $X^4$ have one of the meanings indicated for $X^1$ and $X^2$, $Y^1$, $Y^2$, $Y^3$ and $Y^4$ may be identical or different and are each, independently of one another, $R^{11}$, A or M—$R^{22}$, A is a cyclic group, M is a mesogenic group, and $R^{11}$ and $R^{22}$ are each, independently of one another: H; F; Cl; Br; CN; SCN; SF$_5$; a chiral or achiral alkyl having up to 30 carbon atoms, which is optionally unsubstituted or monosubstituted or polysubstituted by F, Cl, Br, I or CN, and in which one or more non-adjacent CH$_2$ groups are each, independently of one another, optionally replaced by —O—, —S—, —NH—, —N(CH$_3$)—, —CO—, —COO—, —OCO—, —OCO—O—, —S—CO—, —CO—S—, —CH═CH— or —C≡C— in such a way that O atoms are not linked directly to one another; or are a polymerizable group, where at least one of the radicals $Y^1$, $Y^2$, $Y^3$ and $Y^4$ is M—$R^{22}$, compounds of the formula XV $$R^{11}—X^{11}—A^{11}—(Z^{11}—A^{22})_m—X^{22}R^{22} \qquad XV$$

in which $R^{11}$ and $R^{22}$ are each, independently of one another: H; F; Cl; Br; CN; SCN; SF$_5$; a chiral or achiral alkyl having up to 30 carbon atoms, which is unsubstituted or monosubstituted or polysubstituted by F, Cl, Br, I or CN, and in which one or more non-adjacent CH$_2$ groups are each, independently of one another, optionally replaced by —O—, —S—, —NH—, —N(CH$_3$)—, —CO—, —COO—, —OCO—, —OCO—O—, —S—CO—, —CO—S—, —CH═CH— or —C≡C— in such a way that O atoms are not linked directly to one another; a chiral radical containing one or more aromatic or aliphatic ring groups, which optionally contains fused or spiro-linked rings and one or more heteroatoms; or a polymerizable group, in which $R^{11}$ and $R^{22}$ are each, independently of one another: H; F; Cl; Br; CN; SCN; SF$_5$; or a chiral or achiral alkyl having up to 30 carbon atoms, which is unsubstituted or monosubstituted or polysubstituted by F, Cl, Br, I or CN, and in which one or more non-adjacent CH$_2$ groups are each, independently of one another, optionally replaced by —O—, —S—, —NH—, —N(CH$_3$)—, —CO—, —COO—, —OCO—, —OCO—O—, —S—CO—, —CO—S—, —CH═CH— or —C≡C— in such a way that O atoms are not linked directly to one another; or a polymerizable group, $X^{33}$, $X^{44}$, $Z^{11}$ and $Z^{22}$ are each, independently of one another, —O—, —S—, —CO—, —COO—, —OCO—, —O—COO—, —CO—N($R^{00}$)—, —N($R^{00}$)—CO—, —OCH$_2$—, —CH$_2$O—, —SCH$_2$—, —CH$_2$S—, —CF$_2$O—, —OCF$_2$—, —CF$_2$S—, —SCF$_2$—, —CH$_2$CH$_2$—, —CF$_2$CH$_2$—, —CH$_2$CF$_2$—, —CF$_2$CF$_2$—, —CH═CH—, —CF═CH—, —CH═CF—, —CF═CF—, —C≡C—, —CH═CH—COO—, —OCO—CH═CH— or a single bond, $R^{00}$ is H or alkyl having from 1 to 4 carbon atoms, $A^{11}$ and $A^{22}$ are each, independently of one another: 1,4-phenylene, in which one or more CH groups are optionally replaced by N; 1,4-cyclohexylene, in which one or two non-adjacent CH$_2$ groups are optionally replaced by O and/or S; 1,3-dioxolane-4,5-diyl; cyclohexenylene; bicyclo[2.2.2]octylene; piperidine-1,4-diyl; naphthalene-2,6-diyl; decahydronaphthalene-2,6-diyl; or 1,2,3,4-tetrahydronaphthalen-2,6-diyl; where all these groups are unsubstituted or monosubstituted or polysubstituted by halogen, CN or NO$_2$ or alkyl, alkoxy, alkylcarbonyl or alkoxycarbonyl having from 1 to 7 carbon atoms, in which one or more H atoms are optionally replaced by F or Cl, m and n are each, independently of one another, 1, 2, 3 or 4, and G is a bivalent chiral group, in which at least one of the radicals $X^{33}$, $X^{44}$, $Z^{11}$ and $Z^{22}$ is —CF$_2$O—, —OCF$_2$—, —CF$_2$S—, —SCF$_2$—, —CF$_2$CH$_2$—, —CF$_2$CF$_2$—, —CF═CH— or —CF═CF—.

* * * * *

UNITED STATES PATENT AND TRADEMARK OFFICE
CERTIFICATE OF CORRECTION

PATENT NO. : 6,858,268 B2
APPLICATION NO. : 10/633490
DATED : February 22, 2005
INVENTOR(S) : Juliane Suermann It is certified that error appears in the above-identified patent and that said Letters Patent is hereby corrected as shown below:

Column 82, line 32, reads "$\mu m^{31}$" should read -- $\mu m^{-1}$ --
Column 82, line 35, reads "$\mu m^{31}$" should read -- $\mu m^{-1}$ --
Columns 83, lines 28-67, through Column 84, lines 1-44, reads " formula XI:
$X^{11}$ and $X^{22}$ are each, independently of one another, $-CF_2O-$, $-OCF_2-$, $-CF_2S-$, $-SCF_2-$, $-CF_2CH_2-$, $-CH_2CF_2-$, $-CF_2CF_2-$, $-CF=CH-$, $-CH=CF-$, $-CF=CF-$ or a single bond,
  $Z^{11}$ is in each case, independently of one another, $-O-$, $-S-$, $-CO-$, $-COO-$, $-OCO-$, $-O-COO-$, $-CO-N(R^{00})-$, $-N(R^{00})-CO-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-CF_2CH_2-$, $-CH_2CF_2-$, $-CF_2CF_2-$, $-CH=CH-$, $-CF=CH-$, $-CH=CF-$, $-CF=CF-$, $-C\equiv C-$, $-CH=CH-COO-$, $-OCO-CH=CH-$ or a single bond,
  $R^{00}$ is H or alkyl having from 1 to 4 carbon atoms,
  $A^{11}$ and $A^{22}$ are each, independently of one another:
1,4-phenylene, in which, in addition, one or more CH groups are optionally replaced by N; 1,4-cyclohexylene, in which one or two non-adjacent $CH_2$ groups are optionally replaced by O and/or S; 1,3-dioxolane-4,5-diyl; cyclohexenylene; bicyclo[2.2.2]-octylene; piperidine-1,4-diyl; naphthalene-2,6-diyl; decahydronaphthalene-2,6-diyl; or 1,2,3,4-tetrahydronaphthalene-2,6-diyl, where all of these groups are unsubstituted or monosubstituted or polysubstituted by halogen, CN or $NO_2$ or alkyl, alkoxy, alkylcarbonyl or alkoxycarbonyl having from 1 to 7 carbon atoms, in which one or more H atoms are optionally replaced by F or Cl, and
  m is 1, 2, 3, 4 or 5,
    provided that at least one of the radicals $X^{11}$, $X^{22}$ and $Z^{11}$ is $-CF_2O-$, $-OCF_2-$, $-CF_2S-$, $-SCF_2-$, $-CF_2CH_2-$, $-CF_2CF_2-$, $-CF=CH-$ or $-CF=CF-$ and at least one of the radicals $R^{11}$ and $R^{22}$ is a chiral group,
  -   compounds of the formula XVI
$R^{11}-X^{33}-(A^{11}-Z^{11})_m-G-(Z^{22}-A^{22})_n-X^{44}-R^{22}$" should read -- formula XI. --
Column 85, line 19, in formula XII, reads "$W^{12}$" should read -- $W^{22}$ --
Column 85, line 62, reads "$W^{12}$" should read -- $W^{22}$ --
Column 86, line 17, reads "$W^{12}$" should read -- $W^{22}$ --
Column 87, line 29, reads "$(Z^2-A^2)_m R,$" should read -- $(Z^2-A^2)_m$-R, --
Column 88, line 29, reads "F, Cl, Br, or" should read -- F, Cl, Br, I or --
Column 92, line 55, in formula XII, reads "$W^{12}$" should read -- $W^{22}$ --
Column 93, line 27, reads "$W^{12}$" should read -- $W^{22}$ --
Column 93, line 45, reads "$W^{12}$" should read -- $W^{22}$ --

UNITED STATES PATENT AND TRADEMARK OFFICE
CERTIFICATE OF CORRECTION

PATENT NO. : 6,858,268 B2
APPLICATION NO. : 10/633490
DATED : February 22, 2005
INVENTOR(S) : Juliane Suermann It is certified that error appears in the above-identified patent and that said Letters Patent is hereby corrected as shown below:

Column 96, line 22, reads "group," should read -- group,
$X^{11}$ and $X^{22}$ are each, independently of one another, $-CF_2O-$, $-OCF_2-$, $-CF_2S-$, $-SCF_2-$, $-CF_2CH_2-$, $-CH_2CF_2-$, $-CF_2CF_2-$, $-CF=CH-$, $-CH=CF-$, $-CF=CF-$ or a single bond, $Z^{11}$ is in each case, independently of one another, $-O-$, $-S-$, $-CO-$, $-COO-$, $-OCO-$, $-O-COO-$, $-CO-N(R^{00})-$, $-N(R^{00})-CO-$, $-OCH_2-$, $-CH_2O-$, $-SCH_2-$, $-CH_2S-$, $-CF_2O-$, $-OCF_2-$, $-CF_2S-$, $-SCF_2-$, $-CH_2CH_2-$, $-CF_2CH_2-$, $-CH_2CF_2-$, $-CF_2CF_2-$, $-CH=CH-$, $-CF=CH-$, $-CH=CF-$, $-CF=CF-$, $-C\equiv C-$, $-CH=CH-COO-$, $-OCO-CH=CH-$ or a single bond, $R^{00}$ is H or alkyl having from 1 to 4 carbon atoms, $A^{11}$ and $A^{22}$ are each, independently of one another:
1,4-phenylene, in which, in addition, one or more CH groups are optionally replaced by N; 1,4-cyclohexylene, in which one or two non-adjacent $CH_2$ groups are optionally replaced by O and/or S; 1,3-dioxolane-4,5-diyl; cyclohexenylene; bicyclo[2.2.2]-octylene; piperidine-1,4-diyl; naphthalene-2,6-diyl; decahydronaphthalene-2,6-diyl; or 1,2,3,4-tetrahydronaphthalene-2,6-diyl, where all of these groups are unsubstituted or monosubstituted or polysubstituted by halogen, CN or $NO_2$ or alkyl, alkoxy, alkylcarbonyl or alkoxycarbonyl having from 1 to 7 carbon atoms, in which one or more H atoms are optionally replaced by F or Cl, and m is 1, 2, 3, 4 or 5, provided that at least one of the radicals $X^{11}$, $X^{22}$ and $Z^{11}$ is $-CF_2O-$, $-OCF_2-$, $-CF_2S-$, $-SCF_2-$, $-CF_2CH_2-$, $-CF_2CF_2-$, $-CF=CH-$ or $-CF=CF-$ and at least one of the radicals $R^{11}$ and $R^{22}$ is a chiral group,

- compounds of the formula XVI
$R^{11}-X^{33}-(A^{11}-Z^{11})_m-G-(Z^{22}-A^{22})_n-X^{44}-R^{22}$ --

Signed and Sealed this

Sixth Day of January, 2009

JON W. DUDAS
*Director of the United States Patent and Trademark Office*